US012678825B2

(12) United States Patent
Tadaki et al.

(10) Patent No.: US 12,678,825 B2
(45) Date of Patent: Jul. 14, 2026

(54) ACOUSTIC ELEMENT INTEGRATED CIRCUIT, PROBE, AND DIAGNOSIS DEVICE

(71) Applicant: SILICON & SYSTEM CO., LIMITED, Hong Kong (CN)

(72) Inventors: Yoshitaka Tadaki, Hanno (JP); Kaoru Ogaya, Tokyo (JP); Yoshiaki Takemoto, Tokyo (JP); Hiroshi Kikuchi, Hidaka (JP); Shin-ichiro Umemura, Sendai (JP)

(73) Assignee: SILICON & SYSTEM CO., LIMITED, Hong Kong (CN)

( * ) Notice: Subject to any disclaimer, the term of this patent is extended or adjusted under 35 U.S.C. 154(b) by 368 days.

(21) Appl. No.: 18/414,011

(22) Filed: Jan. 16, 2024

(65) Prior Publication Data

US 2024/0157397 A1     May 16, 2024

Related U.S. Application Data

(63) Continuation of application No. PCT/JP2022/027566, filed on Jul. 13, 2022.

(30) Foreign Application Priority Data

Jul. 16, 2021     (JP) ................................. 2021-117661

(51) Int. Cl.
*B06B 1/02* (2006.01)
*G01S 7/52* (2006.01)

(52) U.S. Cl.
CPC .......... *B06B 1/0292* (2013.01); *B06B 1/0207* (2013.01); *G01S 7/5208* (2013.01); *B06B 2201/51* (2013.01)

(58) Field of Classification Search
CPC . B06B 1/0292; B06B 1/0207; B06B 2201/51; B06B 2201/20; B06B 2201/76;
(Continued)

(56) References Cited

U.S. PATENT DOCUMENTS

2004/0174773 A1     9/2004  Thomenius et al.
2007/0164632 A1     7/2007  Adachi et al.
(Continued)

FOREIGN PATENT DOCUMENTS

CN          117642121 A  *  3/2024  ........... B06B 1/0292
EP            4371500 A1 *  5/2024  ........... B06B 1/0292
(Continued)

*Primary Examiner* — Daniel Pihulic

(57)                ABSTRACT

An acoustic element integrated circuit includes cells, being arrayed two-dimensionally on a same curved surface, wherein capacitive acoustic-elements having vibration membranes are allocated by unit number in each of the cells. Each of the cells encompasses an intra-cell circuit, which includes an exciting circuit for driving collectively portions by the unit number, the portions having transmitting functions of the acoustic-elements, and a reception circuit for processing collectively received signals transferred from portions by the unit number, the portions having reception functions in the acoustic-elements. Here, the exciting circuits are sorted into a chip in which high-voltage drivers for exciting the vibration membranes are merged and a chip in which circuits operated at voltages lower than the high-voltage drivers are merged, and the cells are operated two-dimensionally, by individually controlling the intra-cell circuits so that cells can be driven independently.

20 Claims, 27 Drawing Sheets

(58) Field of Classification Search
CPC .............. G01S 7/5208; G01S 15/8913; G01S
15/8925; A61B 8/06; A61B 8/0891; A61B
8/4444; A61B 8/4488; A61B 8/488
See application file for complete search history.

(56)                    References Cited

U.S. PATENT DOCUMENTS

| | | | |
|---|---|---|---|
| 2019/0142387 A1 | 5/2019 | Chen et al. | |
| 2019/0290243 A1 | 9/2019 | Bryzek et al. | |
| 2024/0157397 A1 * | 5/2024 | Tadaki | .................. G01S 7/5208 |

FOREIGN PATENT DOCUMENTS

| | | | |
|---|---|---|---|
| JP | 2004-274756 A | 9/2004 | |
| JP | 2007-130357 A | 5/2007 | |
| JP | 2008-517736 A | 5/2008 | |
| JP | 2021-502846 A | 2/2021 | |
| JP | 2023013461 A * | 1/2023 | ........... B06B 1/0292 |
| JP | 7598118 B2 * | 12/2024 | ........... G01S 7/5208 |
| WO | 2005-120130 A1 | 12/2005 | |
| WO | 2007-086817 A1 | 8/2007 | |
| WO | 2019-099638 A1 | 5/2019 | |
| WO | 2019-182771 A1 | 9/2019 | |
| WO | WO-2023286805 A1 * | 1/2023 | ........... B06B 1/0292 |

* cited by examiner

$X_{st}$          $232_{st}$ $231_{sta}$ $231_{stb}$ $231_{(s+1)ta}$ $231_{(s+1)tb}$ $232_{(s+1)t}$          $232_{(s+2)t}$

ACOUSTIC ELEMENT INTEGRATED CIRCUIT, PROBE, AND DIAGNOSIS DEVICE

CROSS REFERENCE TO RELATED APPLICATIONS AND INCORPORATION BY REFERENCE

This is a continuation of co-pending of International Application No. PCT/JP2022/027566 with an international filing date of Jul. 13, 2022, which designated the United States. And, this application claims benefit of priority under 35 USC 119 based on JP2021-117661 filed on Jul. 16, 2021, the entire contents of which are incorporated by reference herein.

BACKGROUND OF THE INVENTION

1. Field of the Invention

The present invention relates to an acoustic element integrated circuit (AEIC) in which capacitive acoustic-elements are integrated, a probe using this AEIC, and a diagnosis device having this probe. And particularly, the present invention relates to an AEIC for imaging, in which plural acoustic-elements are arrayed, a probe using the AEIC and a diagnosis device incorporating the probe.

2. Description of the Related Art

In ultrasonic probes for medical purpose, piezoelectric acoustic-elements have been used in the past. However, in the case of the piezoelectric acoustic-element, a miss-matching in acoustic impedance between a vibrator of the acoustic-element and a human body is large, which leads to a problem as a bottle neck. In recent years, a capacitive acoustic-element having a vibration-cavity, in which micro-electro-mechanical systems (MEMS) technology is used, has been developed. The capacitive acoustic-element, which is called "capacitive micromachined ultrasonic transducer (CMUT)", has a feature that the acoustic impedance is close to that of the human body. However, up to the present, a two-dimensional (2D) phased-array architecture using the CMUT remains undeveloped. Regarding the 2D operation of the acoustic-elements, a technology is proposed by JP 2007-130357A, in which a set of transmission acoustic-elements and a set of receiving acoustic-elements are provided in separate layers in a single chip. In the separate multi-layered configuration, a direction in which ultrasonic beams are scanned is defined as a long-axis, and a direction orthogonal to the long-axis direction is defined as a short-axis direction, and the ultrasonic beams in a one-dimensional direction are controlled.

In the multi-layered configuration according to the invention recited in JP 2007-130357A, in which the ultrasonic beams are divided along the long-axis direction component and the short-axis direction component orthogonal to the long-axis direction, and the set of transmission acoustic-elements and the set of receiving acoustic-elements are stacked in a multi-level structure, ultrasonic waves arriving to a second level layer are decreased, and therefore, a reception sensitivity will be reduced. Also, a technology that collectively operates a plurality of acoustic-elements connected to a column bus-line in a lump, among 2D arrayed acoustic-elements, is described in JP 2008-517736A. Horizontal bus-lines or vertical bus-lines are disclosed in FIG. 15 and FIG. 16 in JP 2008-517736A. Because each of acoustic-elements is connected to either the horizontal bus-lines or vertical bus-lines, the invention recited in JP 2008-517736A does not relate to the 2D phased-array architecture for independently controlling the acoustic-elements, each of which is disposed at intersections in a 2D matrix.

The 2D phased-array architecture requires a technique of independent operation of the 2D arrayed acoustic-elements. Recently, a technology is proposed for stacking a plurality of chips (refer to JP 2021-502846A). In JP 2021-502846A, a chip in which plural acoustic-elements are arrayed, a chip of application specific integrated circuit (ASIC) in which exciting circuits for exciting the respective acoustic-elements are arrayed corresponding to the array of the acoustic-elements, and a digital ASIC chip in which reception circuits of the respective acoustic-elements are arrayed corresponding to the array of the acoustic-elements are stacked. However, although JP 2021-502846A describes that the acoustic-elements can be arranged one-dimensionally or two-dimensionally, the timing of the mutual operation of the adjacent acoustic-elements in the 2D arrayed acoustic-elements and the concrete means as to how each of the 2D arrayed acoustic-elements is operated as the 2D array are not disclosed at all.

In the meanwhile, the capacitive acoustic-element includes a vibration membrane that can be vibrated through a vibration-cavity depressurized to a pressure near vacuum. And, a high voltage is required to vibrate the vibration membrane when ultrasonic waves are transmitted.

However, the conditions of layout designs of integrated circuits and semiconductor substrates to be used are different between the exciting circuits requiring the high voltages of, for example, about 100 volts or more and the reception circuits that do not require the high voltages. Thus, issues on manufacturing technique and reliability problems after manufacturing are generated. For example, high-voltage circuits and low-voltage circuits differ from each other in the design rules, such as the impurity concentrations (specific resistivities) of substrates used in integrated circuits, the minimum line widths, the thicknesses and structures of surface interconnections, the heat dissipation designs, etc. Especially, in the high-voltage circuits, there are problems pertaining to the structures such as guard-rings peculiar to high voltage operations, and the deterioration and reaction progression in alloys etc., in metallurgical junctions. In a case that the high-voltage circuits and the low-voltage circuits are mixed in the same chip, because a high-voltage circuit process and a low-voltage circuit process cannot be executed by a single procedure is included, there is a problem that manufacturing procedures becomes long.

Moreover, it is necessary to consider a problem of the mutual interference caused by the electric field intensity and electrostatic induction effect in which the low-voltage circuits are affected by the high-voltage circuits, as well as problems of the leakage current generation caused by electric field crowding and the operation of parasitic transistors. On the foregoing problems, the invention described in JP 2021-502846A is directed to a scheme in which circuits of analog digital converters (ADCs) are merged in the chip of the analog ASIC, and therefore, the high-voltage circuits and the low-voltage circuits are mixed, the high and low voltage circuits differ from each other in the design rules. In paragraphs [0023], [0030], etc., JP 2021-502846A states that the chip of analog ASIC can merge one or more analog amplifiers, one or more analog filters, an analog beam forming circuit, an analog de-chirp circuit, an analog quadrature demodulation (AQDM) circuit, an analog time delay circuit, an analog phase shifter circuit, an analog adder, an analog gain compensation circuit, an analog averaging circuit, and/or one or more analog digital converters.

According to the descriptions of paragraphs [0035], [0060], etc., of JP 2021-502846A, the chip of analog ASIC further merges a clocking circuit 224, a controller 226, a sequence circuit 228, etc. As described in the invention of JP 2021-502846A, in a case that the high-voltage circuits and the low-voltage circuits which differ from each other in voltage levels are mixed in the same chip, manufacturing issues, problems of performance and reliability are generated. In addition, even in the invention described in JP 2007-130357A as mentioned above, since the high-voltage circuits and the low-voltage circuits which differ from each other in voltage levels are mixed in the same chip, there are the manufacturing issues, the problems of performance and reliability. Also, even in the invention described in JP 2008-517736A, since the high-voltage circuits and the low-voltage circuits are mixed in the single chip of ASIC array, there is the problems of performance and reliability.

SUMMARY OF THE INVENTION

A first aspect of the present invention inheres in an acoustic element integrated circuit including a plurality of cells, being arrayed two-dimensionally on a same curved surface, wherein capacitive acoustic-elements having vibration membranes are allocated by unit number in each of the cells. Here, the "curved surface" defining the "same curved surface" is a curved surface in Euclidean plane, and a case in which both Gaussian and mean curvatures are zero shall correspond to the Euclidean plane. In the acoustic element integrated circuit pertaining to the first aspect of the present invention, each of the cells encompassing an intra-cell circuit, which includes (a) an exciting circuit configured to drive collectively portions by a set of the unit number, each of the portions having a transmitting function of each of the capacitive acoustic-elements, and (b) a reception circuit configured to process collectively received signals transferred from portions by a set of the unit number, each of the portions having a reception function in each of the capacitive acoustic-elements. In the acoustic element integrated circuit according to the first aspect of the present invention, the exciting circuits are sorted into a chip in which high-voltage drivers for exciting the vibration membranes are merged and a chip in which circuits operated at voltages lower than the high-voltage drivers are merged, and the plurality of the cells are operated two-dimensionally, by individually controlling the intra-cell circuits so that the plurality of cells can be driven independently from each other.

A second aspect of the present invention inheres in a probe encompassing the acoustic element integrated circuit pertaining to the first aspect of the present invention. A third aspect of the present invention inheres in a diagnosis device encompassing a display for displaying an image based upon signals transferred from the probe pertaining to the second aspect of the present invention.

BRIEF DESCRIPTION OF THE DRAWINGS

FIG. 4 is a conceptual diagram illustrating an example in which a functional block is allocated when the intra-cell circuit in FIG. 3 is integrated into a three-dimensional (3D) structure;

FIG. 7 is a view illustrating another example of the diagnosis device pertaining to the first embodiment;

FIG. 10 is a stepped cross-sectional view explaining a structure of a first chip of the AEIC pertaining to the second embodiment, taken from an X-X direction in FIG. 9;

FIG. 13 is a schematic view including a block diagram to concretely realize the conceptual image illustrated in FIG. 12;

DETAILED DESCRIPTION OF THE EMBODIMENTS

Figure 1:
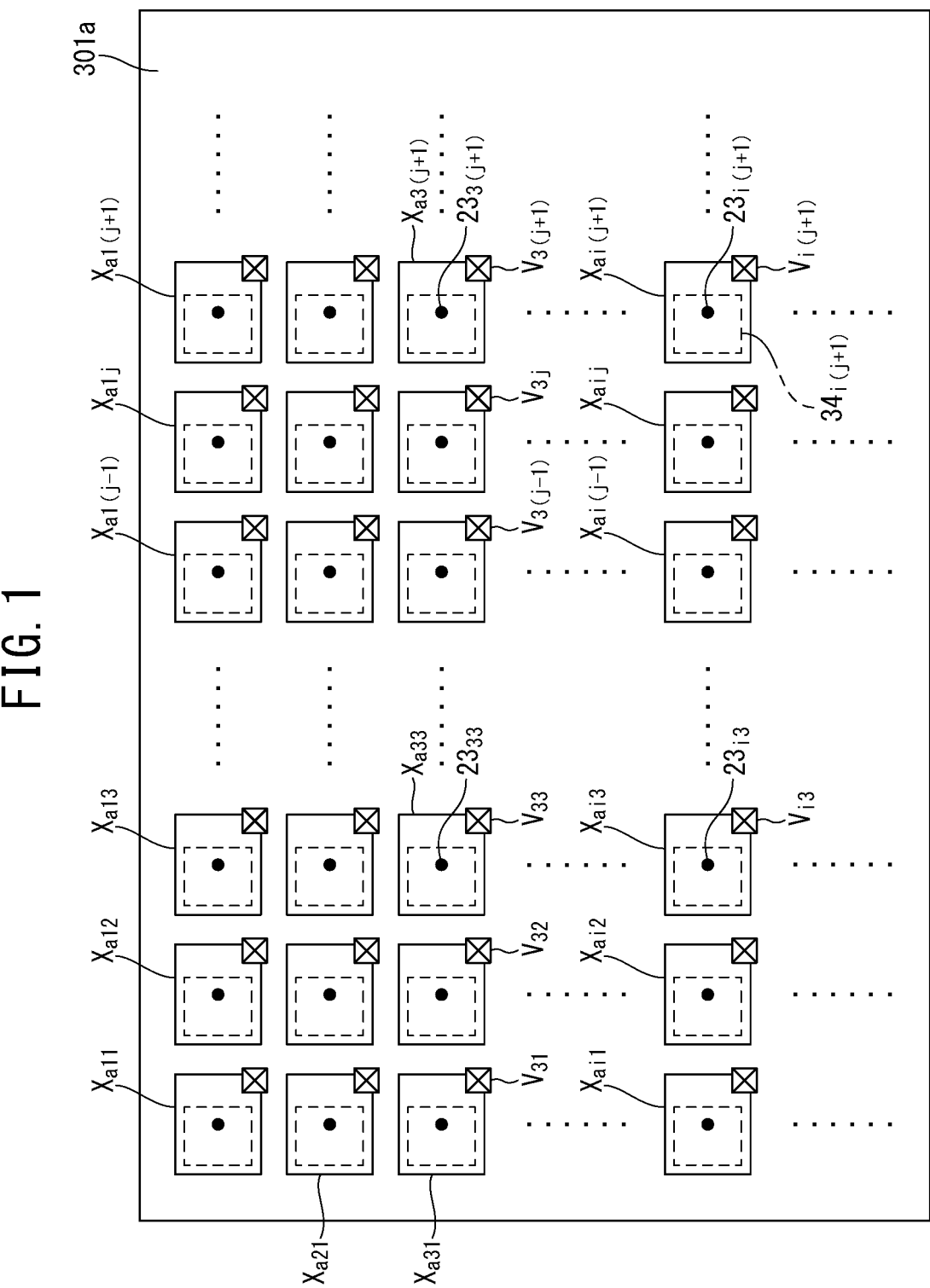
FIG. 1 is a plan view illustrating an outline of a planar pattern of an element array of an acoustic element integrated circuit (AEIC) pertaining to a first embodiment of the present invention.

Hereinafter, first to third embodiments of the present invention will be described with reference to the drawings. In the following description of the drawings for the first to third embodiments, the same or similar parts are denoted by the same or similar reference numerals. However, it should be noted that the drawings are schematic, the relationship between the thickness and the planar dimension, the ratio of the size of each member, and the like may be different from the practical one. Therefore, specific thicknesses, dimensions, sizes, and the like should be determined more variously by considering the gist of the technical ideas that can be understood from the following description. In addition, it should also be understood that the respective drawings are illustrated with the dimensional relationships and proportions different from each other.

In an isotropic and uniform two-dimensional (2D) surface in Euclidean space, the Gaussian curvature is constant independently of portion. In the following explanations of acoustic element integrated circuits (AEICs), etc., pertaining to the first to third embodiments, for convenience, "coplanar plane" is taken up as a curved surface in which both Gaussian and mean curvatures are zero (curvature radius is infinite), and a case is exemplified in which a plurality of acoustic-elements are 2D arrayed on the coplanar plane. However, the curved surface meant by the technical idea explained in the AEIC pertaining to the first to third embodiments is not limited to "the plane". A case in which both Gaussian and mean curvatures are zero means the Euclidean plane. However, the technical idea explained in the AEIC pertaining to the first to third embodiments can be similarly applied even to an architecture in which plural acoustic-elements are 2D arrayed on various same curved surfaces, such as cylindrical surfaces, spherical surfaces, ellipsoidal surfaces, parabolic surfaces, etc.

In addition, it should be noted that because the following first to third embodiments each illustrate a device or method embodying the technical ideas of the present invention, the technical idea of the present invention does not specify the material, shape, structure, arrangement and order of process procedures, and others to the followings. The technical ideas of the present invention are not intended to be limited to the following contents disclosed in the following first to third embodiments, and various changes can be performed within the technical scopes prescribed by features specifying the invention recited in the claims.

First Embodiment

As illustrated in FIG. 1, an acoustic element integrated circuit (AEIC) pertaining to a first embodiment of the present invention exhibits a planar layout constructing a two-dimensional (2D) matrix on a coplanar surface (a same curved surface). Cells $X_{ai1}$, $X_{ai2}$, $X_{ai3}$, . . . , $X_{ai(j-1)}$, $X_{aij}$, $X_{ai(j+1)}$, . . . , in each of which a unit number of acoustic-elements are allocated internally as a set, are arrayed in an element-array area 301$a$ on the planar layout illustrated in FIG. 1. Although FIG. 1 exemplifies a case in which the planar patterns of the cells $X_{ai1}$, $X_{ai2}$, $X_{ai3}$, etc., are rectangular, the planar patterns of the cells $X_{ai1}$, $X_{ai2}$, $X_{ai3}$, etc., are not limited to be rectangular, and various planar patterns such as hexagons, octagons, etc. can be employed. An element schematically illustrated by a filled circle in the cell $X_{ai(j+1)}$ on the i-th row and (j+1)-th column, which is arranged at the lower right in FIG. 1 is the capacitive acoustic-element 23$_{i(j+1)}$ with bidirectional characteristics, which converts an electric signal into an ultrasonic signal, transmits the ultrasonic signals towards a target, receives ultrasonic reflection signals from the target and converts into electric signals.

Although FIG. 1 illustrates a case in which only a single filled circle exists in the cell $X_{ai(j+1)}$, the configuration is merely an exemplification. The number of the filled circles is not limited to single, and double or more filled circles as a set are allowed to exist in the cell $X_{ai(j+1)}$. That is, in the AEIC pertaining to the first embodiment, generalization is possible such that a unit number n (the n is a positive integer of one or more) of acoustic-elements are allocated in each of the cells as a set, and the set of unit number n of acoustic-elements are collectively driven by an intra-cell circuit disposed in each of cells, in an array of cells constructing a 2D matrix deployed on the coplanar surface. However, in the AEIC pertaining to the first embodiment, a case of the unit number n=1 is exemplified for the sake of simplification. The technical idea of the AEIC pertaining to the first embodiment can be enlarged in a case that a single cell is built by one set of n acoustic-elements. And corresponding to the single cell built by n acoustic-elements, one set of intra-cell circuits is provided in the single cell, so that the unit number of n acoustic-elements are driven by the intra-cell circuits, respectively and collectively. Thus, the configuration illustrated in FIG. 1 can be enlarged to architectures in which sets of double, triple, quadruple, . . . filled circles are arranged respectively in each of the cells.

The capacitive acoustic-element $23_{i(j+1)}$ includes a vibration-cavity to generate ultrasonic waves. When a unit number n of acoustic-elements are arranged, n vibration cavities are included in the cell $X_{ai(j+1)}$. Although labeling of reference numerals to all acoustic-elements, constructing the 2D matrix deployed on the coplanar surface, are omitted, the reference numeral is labeled to an acoustic-element $23_{3(j-1)}$, which includes a vibration-cavity, as a representative of the other acoustic-elements in the cell $X_{a3(j+1)}$ on the third row and (j+1)-th column. Similarly, the reference numeral is labeled to an acoustic-element $23_{3(j-1)}$, which includes a vibration-cavity, in the cell $X_{a33}$ on the third row and third column, and the reference numeral is labeled to an acoustic-element $23_{i3}$, which includes a vibration-cavity, in the cell $X_{ai3}$ is on the i-th row and third column.

Figure 4:
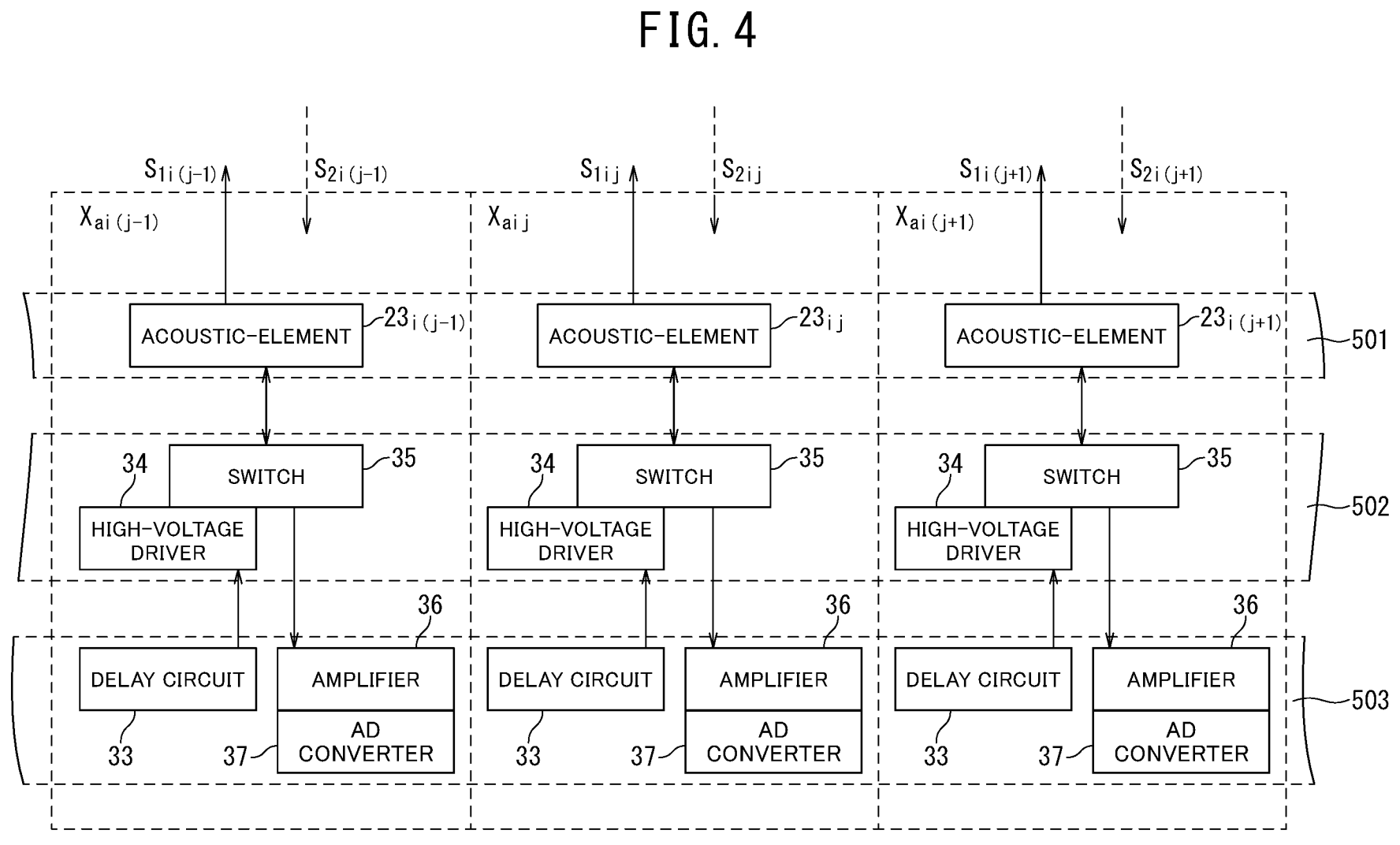
Figure 5:
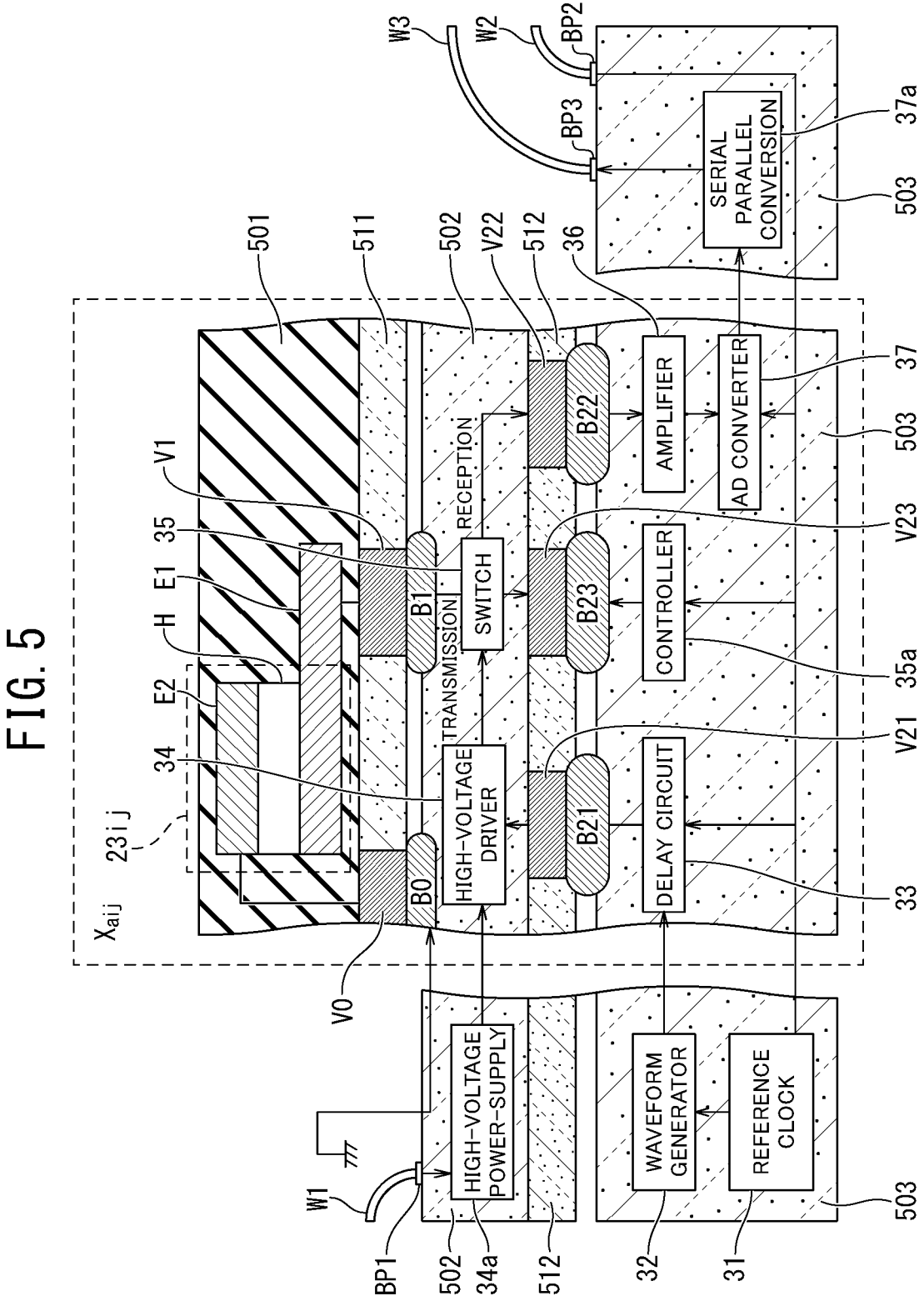
FIG. 5 is a schematic view including a block diagram to concretely realize the conceptual diagram of FIG. 4.

Since the capacitive acoustic-element $23_{i(j-1)}$ schematically illustrated in FIG. 1 does not require the acoustic impedance matching with a human body, the acoustic-element $23_{i(j-1)}$ is preferable for medical purpose than a piezoelectric acoustic-element. However, because the membrane of the acoustic-element $23_{i(j-1)}$ is required to be vibrated by electrostatic force to generate the ultrasonic waves, for example, higher voltages of about 200 volts are required. For achieving a high resolution in the AEIC pertaining to the first embodiment, the membrane shall be vibrated with the higher voltages, while miniaturizing the structure of the AEIC, and therefore, a three-dimensional (3D) integrated circuit structure constructed by a stacked architecture, is proposed. FIG. 4 and FIG. 5, etc., which will be described later, illustrate the unit structures of the cells $X_{ai(j-1)}$, $X_{aij}$, $X_{ai(j+1)}$, etc., which are 2D arrayed on the coplanar surface. The unit structures of the cells $X_{ai(j-1)}$, $X_{aij}$, $X_{ai(j+1)}$ are represented as a part of a 3D integrated circuit structure constructed by the stacked architecture of a first chip 501, a second chip 502 and a third chip 503. In addition, in the explanations of the AEICs pertaining to the first to third embodiments of the present invention, an array of the Descartes coordinate system (X-Y orthogonal coordinate system) is exemplified as a 2D array. However, the 2D array is not limited to the Descartes coordinate system (Cartesian coordinate system). The 2D array may include an array such as a concentric pattern, or an array of a polar coordinate system expressed by radius r and deviation angle θ. Moreover, the 2D array may include an array in various orthogonal coordinate systems in which a 3D Helmholtz Eq. can be decomposed into two components.

In order that the vibration membrane of the capacitive acoustic-element having the vibration-cavity is vibrated by the high voltages, a high-voltage driver (vibration-membrane driver) is required. The "high-voltage driver (vibration-membrane driver)" means a circuit of large-signal levels of 20 volts or more, concretely, 50 volts or more, or 100 volts or more for exciting the vibration membrane. FIG. 1 schematically illustrate a planar pattern of a high-voltage driver $34_{i(j+1)}$ which is integrated on the second chip 502 with a dashed line (hidden outline) inside the low-right cell $X_{ai(j+1)}$. When a unit number n of acoustic-elements are arranged in the cell $X_{ai(j+1)}$, etc., the high-voltage driver $34_{i(j+1)}$ collectively drives the n acoustic-elements merged as the unit number in the cell $X_{ai(j+1)}$. Although reference numerals are omitted to be labeled, inside the planar patterns of the cells $X_{ai1}$, $X_{ai2}$, $X_{ai3}$, etc., which are illustrated as approximate squares, rectangles illustrated with dashed lines which are smaller than the planar patterns of the cells $X_{ai1}$, $X_{ai2}$, $X_{ai3}$, etc., mean the planar patterns of the high-voltage drivers merged on the second chip 502 of the respective cells $X_{ai1}$, $X_{ai2}$, $X_{ai3}$, . . . , $X_{ai(j-1)}$, $X_{aij}$, $X_{ai(j+1)}$, . . . .

The unit structure for each cell such as the cells $X_{ai(j-1)}$, $X_{aij}$, $X_{ai(j+1)}$, etc., is built by the 3D integrated circuit structure in which the first chip 501, the second chip 502 and the third chip 503 are stacked. Thus, a jointing means for electrically connecting the first chip 501 and the second chip 502 and a jointing means for electrically connecting the second chip 502 and the third chip 503 are required. A plug schematically illustrated as a small rectangle to which a christcross is labeled at a lower-right corner of the rectangle of the cell $X_{ai(j+1)}$ on the low-right i-th row and (j+1) column in FIG. 1 is a connection via-plug (hereafter, referred to as "a connection-plug") $V_{i(j-1)}$ provided on the bottom surface side of the second chip 502 when the second chip 502 and the third chip 503 are electrically connected. Although reference numerals are omitted to be labeled to all connection-plugs, the connection-plug Vis is illustrated even at the lower-right corner of the cell $X_{ai3}$ is on the i-th row and third column. Similarly, the connection-plug $V_{31}$ is illustrated at the lower-right corner of the cell $X_{a31}$ on the third row and first column, the connection-plug $V_{32}$ is illustrated at the lower-right corner of the cell on the third row and second column, and the connection-plug $V_{33}$ is illustrated at the lower-right corner of the cell $X_{a33}$ on the third row and third column. Moreover, the connection-plug $V_{3(j-1)}$ is illustrated at the lower-right corner of the cell $X_{a3(j-1)}$ on the third row and (j−1)-th column, the connection-plug $V_{3j}$ is illustrated at the lower-right corner of the cell $X_{a3j}$ on the third row and j-th column, and the connection-plug $V_{3(j+1)}$ is illustrated at the lower-right corner of the cell $X_{a3(j+1)}$ on the third row and (j+1)-th column.

Although FIG. 1 illustrates a simplified model in which only one connection-plug exists at the lower-right corner of each cell, practically, a plurality of connection-plugs may exist in each cell, as can be understood from FIG. 5, etc., which will be described later. When a set of unit number n of acoustic-elements are arranged in each cell, a single connection-plug can commonly act for the set of n acoustic-elements. Thus, when the set of unit number n of acoustic-elements are arranged in each cell, the total number of connection-plugs can be decreased, because the connection-plug can serve as the common electric member for the set of n acoustic-elements, which are merged as the unit number in each cell.

In FIG. 1, although the explanation is carried out by focusing to one connection-plug $V_{i(j+1)}$ in each cell $X_{a3(j+1)}$, a pitch in an X-direction and a pitch in a Y-direction of the array of the connection-plug $V_{i(j+1)}$ provided in each of the plurality of cells $X_{a3(j+1)}$ may be shifted by about half a pitch with respect to the X-direction-pitch and the Y-direction-pitch of the array in each of the plurality of cells $X_{a3(j+1)}$. Even regarding the other plural connection-plugs which may practically exist in each cell $X_{a3(j+1)}$, a periodic structure may be designed in which the above pitch is similarly shifted by about half a pitch. That is, in accordance with the technical idea illustrated in FIG. 1, the vibration-cavity in each of the acoustic-elements $23_{i(j+1)}$ and the corresponding high-voltage driver $34_{i(j+1)}$, which is merged in different chip from the chip of the acoustic-elements $23_{i(j+1)}$ for constructing the 3D integrated circuit structure, shall be arranged at a position at which both overlap with each other, even in a case that there are plural connection-plugs. And the acoustic-element $23_{i(j+1)}$ and the connection-plug $V_{i(j+1)}$ are arranged at positions at which both do not overlap with each other.

Figure 2:
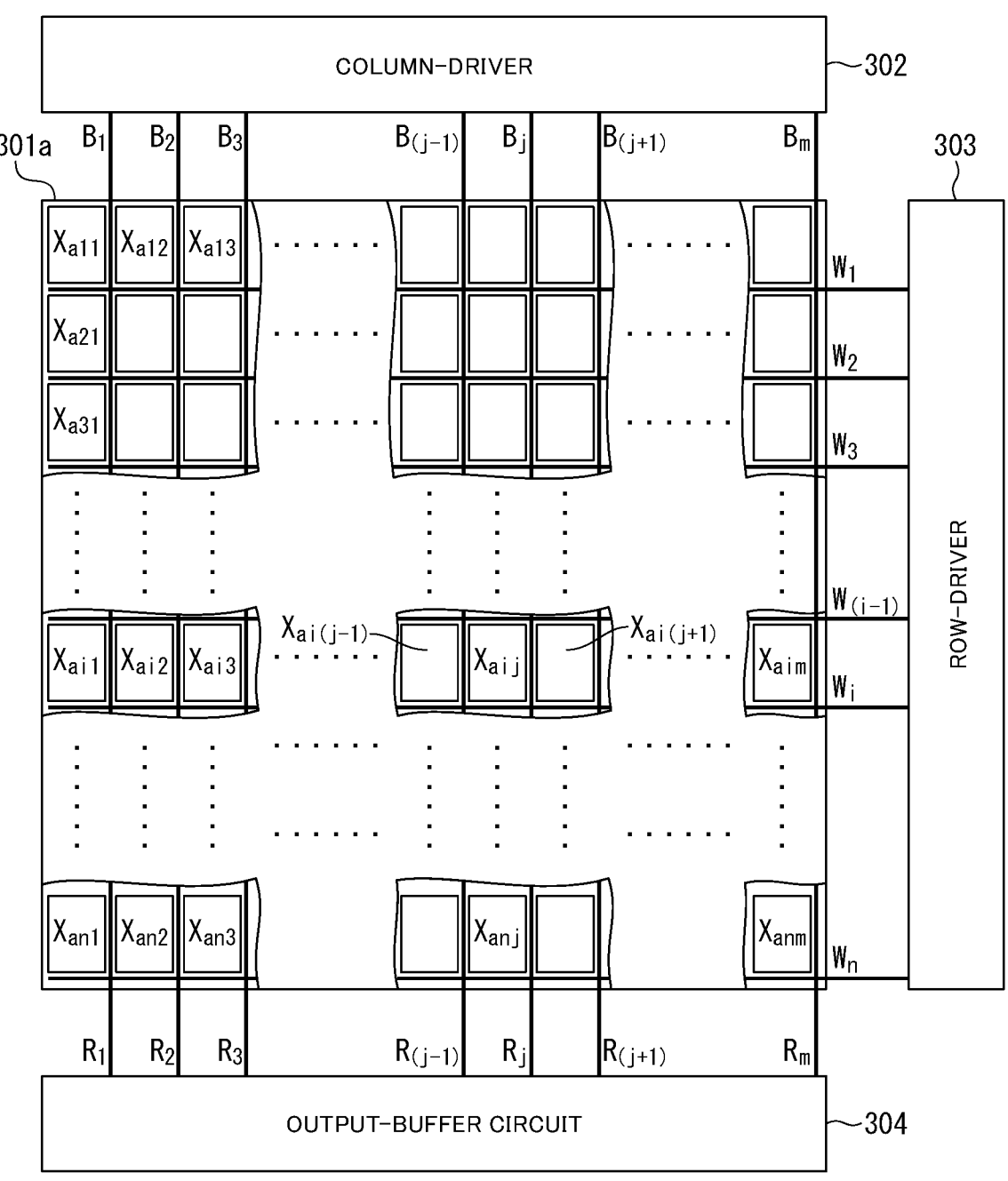
FIG. 2 is a block diagram illustrating a peripheral circuit for driving the element array of the AEIC pertaining to the first embodiment.

As illustrated in FIG. 2, a column-driver 302 is arranged on an upper side of a top latus of the element-array area 301*a*, and a row-driver 303 is arranged on a right of a right latus of the element-array area 301*a*. Moreover, an output-buffer circuit 304 is arranged on a lower side of a bottom latus of the element-array area 301*a*. In the element-array area 301*a*, many cells $X_{aij}$ (i=1 to m and j=1 to n, and each of the m and the n is a positive integer of two or more) are arrayed in the shape of 2D matrix, and a rectangular trans-mitting-and-imaging region is organized, which enables 2D phased-array architecture.

Each cell-row inside the element-array area 301*a* is scanned at a unit of cell-row by word lines $W_1$, $W_2$, $W_3$, . . . , $W_{(i-1)}$, $W_i$, . . . $W_n$, which are delivered from the row-driver 303. That is, cell-rows $X_{a11}$, $X_{a12}$, $X_{a13}$, . . . , $X_{a1(j-1)}$, $X_{a1j}$, $X_{a1(j+1)}$, . . . on the first row are scanned by the word line $W_1$ on the first row. Also, cell-rows $X_{a21}$, . . . on the second row are scanned by the word line $W_2$ on the second row, and cell-rows $X_{a31}$, . . . on the third row are scanned by the word line $W_3$ on the third row. Moreover, cell-rows $X_{ai1}$, $X_{ai2}$, $X_{ai3}$, . . . , $X_{ai(j-1)}$, $X_{aij}$, $X_{ai(j+1)}$, . . . on the i-th row are scanned by the word line $W_i$ on the i-th row.

On the other hand, the respective cell-columns inside the element-array area 301*a* are sequentially scanned at a unit of cell-column by bit lines $B_1$, $B_2$, $B_3$, . . . , $B_{(j-1)}$, $B_j$, $B_{(j+1)}$, . . . $B_m$ which are delivered from the column-driver 302. For example, the cell-columns $X_{a11}$, $X_{a21}$, $X_{a23}$, . . . , $X_{ai1}$, . . . $X_{an1}$ on the first column are scanned by the bit line $B_1$ on the first column. Also, the cell-columns $X_{a12}$, . . . , $X_{ai2}$, . . . $X_{an2}$ on the second column are scanned by the bit line $B_2$ on the second column, and the cell-columns $X_{a31}$, . . . , $X_{ai3}$, . . . $X_{an3}$; . . . on the third column are scanned by the bit line $B_3$ on the third column. Moreover, the cell-columns . . . , $X_{ai(j-1)}$, . . . on the (j−1)-th column are scanned by the bit line $B_{(j-1)}$ on the (j−1)-th column, the cell-columns . . . , $X_{aij}$, . . . , $X_{anj}$, . . . , on the j-th column are scanned by the bit line $B_j$ on the j-th column, the cell-columns . . . , $X_{ai(j+1)}$, . . . on the (j+1)-th column are scanned by the bit line $B_{(j+1)}$ on the (j+1)-th column, and the cell-columns . . . , $X_{aim}$, . . . $X_{anm}$ on the m-th column are scanned by the bit line $B_m$ on the m-th column.

As just described, the respective cell-rows inside the element-array area 301*a* are scanned at a unit of cell-row by the word lines $W_1$, $W_2$, $W_3$, . . . , $W_{(i-1)}$, $W_i$, . . . $W_n$, the respective cell-columns are sequentially scanned at a unit of cell-column by the bit lines $B_1$, $B_2$, $B_3$, . . . , $B_{(j-1)}$, $B_j$, $B_{(j+1)}$, . . . $B_m$, and the 2D array radiation of ultrasonic signals and the reading operation for cell signals are per-formed. That is, the AEIC pertaining to the first embodiment of the present invention is organized such that, since the element-array area 301*a* is sequentially scanned along a vertical direction at the unit of the respective cell-rows $X_{a11}$, $X_{a12}$, $X_{a13}$, . . . , $X_{ai(j-1)}$, $X_{aij}$, $X_{ai(j+1)}$, . . . , the cell signals of the respective cell-rows $X_{a11}$, $X_{a12}$, $X_{a13}$, . . . , $X_{ai(j-1)}$, $X_{aij}$, $X_{ai(j+1)}$, . . . are read out by vertical-output signal-lines $R_1$, $R_2$, $R_3$, . . . , $R_{(j-1)}$, $R_j$, $R_{(j+1)}$, . . . provided for the respective cell-columns $X_{a11}$, $X_{a12}$, $X_{a13}$, . . . , $X_{ai1}$, $X_{ai2}$, $X_{ai3}$, . . . .

Figure 3:
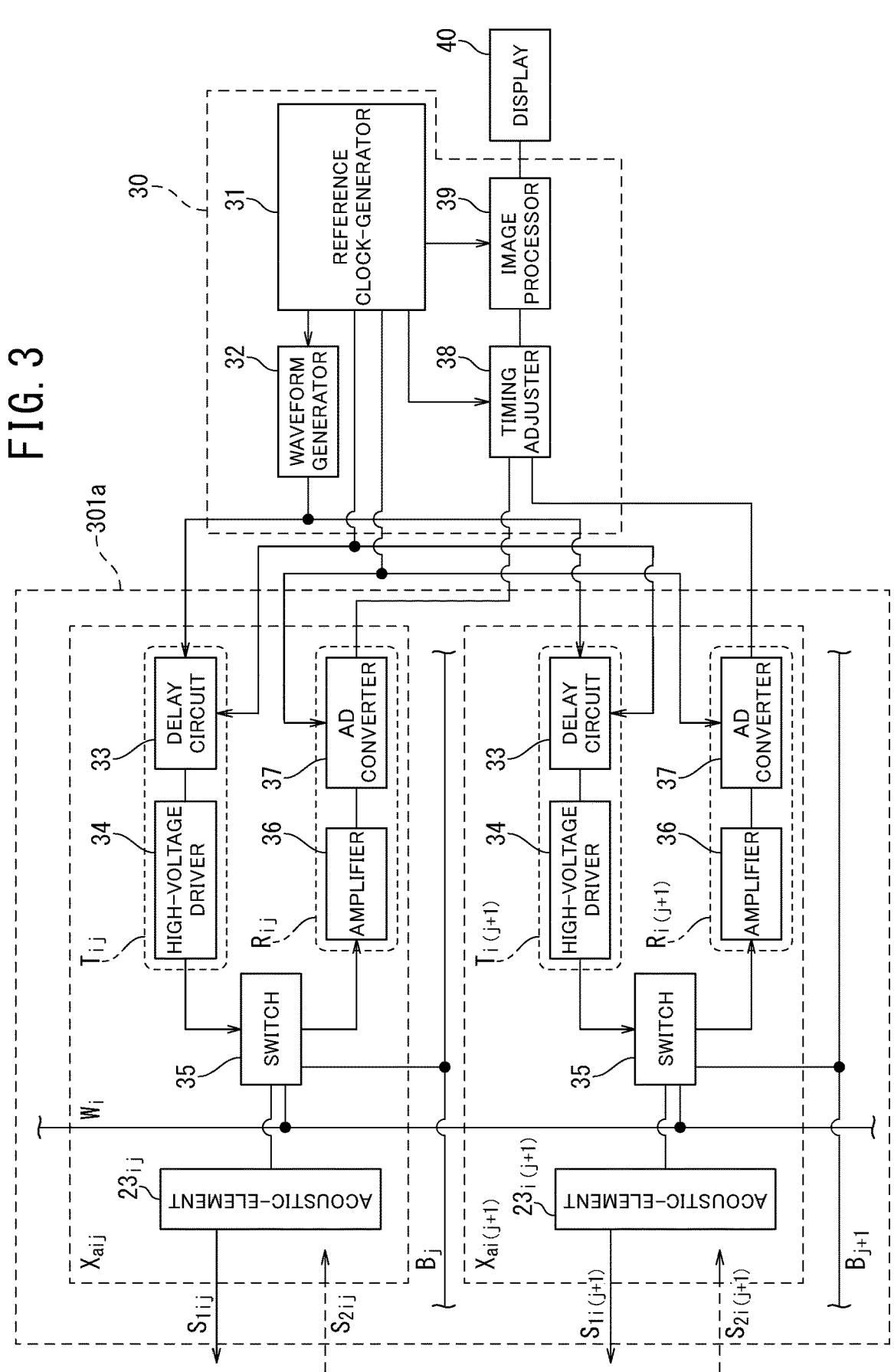
FIG. 3 is a view illustrating a cell constructing the AEIC pertaining to the first embodiment, and an example of an intra-cell circuit merged in the cell.

FIG. 3 illustrates the configuration encompassing the cell $X_{aij}$ and the cell $X_{ai(j+1)}$ which are arrayed on the i-th row of the element-array area 301*a* illustrated in FIG. 1 and FIG. 2, a transmission/reception controller 30 for drive-controlling the cells $X_{aij}$ and $X_{ai(j+1)}$ and a display 40 connected to the transmission/reception controller 30, by using a block dia-gram. The cell $X_{aij}$ on the upper space in FIG. 3 is the cell positioned at the i-th row and j-th column of the matrix constructing the element-array area 301*a*. The cell $X_{aij}$ has a bidirectional acoustic-element $23_{aij}$ having transmitting and reception functions and a switch 35 which is electrically connected to the acoustic-element $23_{aij}$. The switch 35 changes the connection of excitation signals transmitted to the acoustic-element $23_{aij}$ and reception signals transmitted from the acoustic-element $23_{aij}$. As is indicated by arrow marks on the upper space in FIG. 3, the acoustic-element $23_{aij}$ of the cell $X_{aij}$ has a bidirectional function for gener-ating ultrasonic signals $s_{1ij}$, transmitting the ultrasonic sig-nals $s_{1ij}$ to a target and receiving reflection signals $s_{2ij}$ from the target, and also converting into electric signals.

The word line $W_i$ on the i-th row and the bit line $B_j$ on the j-th column are connected to double input-terminals of the switch 35 of the cell $X_{aij}$, respectively, and the operation of the acoustic-element $23_{aij}$ is controlled by the word line $W_i$ and the bit line $B_j$. For example, if an AND gate of double inputs is provided in the switch 35 of the cell $X_{aij}$, and the AND gate is designed to be operated only when signals of the word line $W_i$ are high level and signals of the bit line $B_j$ are high level, selective operations of desired switches of the cells, which are disposed at any intersecting point in the matrix, constructing the element-array area 301*a*.

An exciting circuit $T_{ij}$ for generating excitation signals configured to excite the vibration-cavity of the acoustic-element $23_{aij}$ and a reception circuit $R_{ij}$ for processing reception signals from the acoustic-element $23_{aij}$ are con-nected to the switch 35 of the cell $X_{aij}$. And, the exciting circuit $T_{ij}$ of the cell $X_{aij}$ includes a delay circuit 33 and a high-voltage driver (vibration-membrane driver) 34, and the reception circuit $R_{ij}$ includes an amplifier 36 and an AD converter 37. That is, the delay circuit 33, the high-voltage driver 34, the switch 35, the amplifier 36 and the AD converter 37 are compactly integrated by 3D structure as intra-cell circuits with respect to the acoustic-element $23_{aij}$ constructing the cell $X_{aij}$ on the i-th row and the j-th column. Since the exciting circuit $T_{ij}$ has the delay circuit 33, the signals of the bit line $B_j$ to be entered to the switch 35 is not essential when the 2D phased-array architecture is intended. The reason is because a phase difference is generated in the excitation signals of each of the acoustic-element $23_{ij}$, $23_{i(j+1)}$, . . . , a phased array operation for each row, by carry out a sequential driving for each row, can be operated, even when all acoustic-elements $23_{ij}$, $23_{i(j+1)}$, . . . connected to an excitation row-selection line $SW_i$ on the i-th row are excited.

On the other hand, the cell $X_{ai(j+1)}$ on a lower space in FIG. 3 is positioned at the i-th row and the (j+1)-th column. Similarly to the cell $X_{aij}$ on the i-th row and the j-th column, the cell $X_{ai(j+1)}$ has the bidirectional acoustic-element $23_{ai(j+1)}$ including the transmitting/reception function, and the switch 35 which is electrically connected to the acoustic-element $23_{ai(j+1)}$. And the switch 35 changes the connection of the excitation signals transmitted to the acoustic-element $23_{ai(j+1)}$ and the reception signals transmitted from the acoustic-element $23_{ai(j+1)}$. As indicated on the lower space in FIG. 3, the acoustic-element $23_{ai(j+1)}$ has a bidirectional function for generating ultrasonic signals $s_{1i(j+1)}$, transmitting the ultrasonic signals $s_{1i(j+1)}$ to a target, and receiving reflection signals $s_{2i(j+1)}$ from the target, and also converting into electric signals. In the switch 35 of the cell $X_{ai(j+1)}$ on the lower space in FIG. 3, the word line $W_i$ on the i-th row and the bit line $B_{(j+1)}$ on the (j+1)-th column are connected to double input-terminals of the switch 35 of the cell $X_{ai(j+1)}$, respectively, and the operation of the acoustic-element $23_{ai(j+1)}$ is controlled by the word line $W_i$ and the bit line $B_{(j+1)}$. In the same way to the switch 35 in the cell $X_{aij}$, the AND gate of double inputs can be provided even in the switch 35 of the cell $X_{ai(j+1)}$. And the switch 35 is operated only when signals of the word line $W_i$ are high level and signals of the bit line $B_{(j+1)}$ are high level.

The exciting circuit $T_{i(j+1)}$ for generating excitation signals, configured to exciting the vibration membrane of the acoustic-element $23_{ai(j+1)}$, and the reception circuit $R_{i(j+1)}$ for processing reception signals transmitted from the acoustic-element $23_{ai(j+1)}$ are connected even to the switch 35 of the cell $X_{ai(j+1)}$. And, the exciting circuit $T_{i(j+1)}$ includes a delay circuit 33 and a high-voltage driver 34, and the reception circuit $R_{i(j+1)}$ includes an amplifier 36 and an AD converter 37. In the same way to the case of the acoustic-element $23_{aij}$ on the i-th row and the j-th column, since the exciting circuit $T_{i(j+1)}$ has the delay circuit 33, the signals of the bit line $B_{(j+1)}$ is not essential when the 2D phased-array architecture is intended. The reason is because the phase difference is generated in the excitation signals of each of the acoustic-element $23_{ij}$, $23_{i(j+1)}$, . . . , the phased array operation for each row by carrying out the sequential driving for each row can be operated, even when all acoustic-elements $23_{ij}$, $23_{i(j+1)}$, . . . connected to the excitation row-selection line $SW_i$ on the i-th row are excited. In the same way to the acoustic-element $23_{aij}$ on the i-th row and the j-th column, the delay circuit 33, the high-voltage driver 34, the switch 35, the amplifier 36 and the AD converter 37 are compactly merged in the 3D structure as the intra-cell circuit, with respect to the acoustic-element $23_{ai(j+1)}$ constructing the cell $X_{ai(j+1)}$ on the i-th row and the (j+1)-column.

A reference clock-generator 31 is connected to the delay circuit 33 and the AD converter 37 in the cell $X_{aij}$ on the upper space in FIG. 3, and the reference clock-generator 31 is connected even to the delay circuit 33 and the AD converter 37 in the cell $X_{ai(j+1)}$ on the lower space. Moreover, a waveform generator 32 is connected to the delay circuit 33 in the cell $X_{aij}$ and the delay circuit 33 in the cell $X_{ai(j+1)}$, and the waveform generator 32 is connected even to the reference clock-generator 31. Moreover, a timing adjuster 38 is connected to the AD converter 37 in the cell $X_{aij}$ and the AD converter 37 in the cell $X_{ai(j+1)}$, and the timing adjuster 38 is connected even to the reference clock-generator 31. An image processor 39 is connected to the reference clock-generator 31 and the timing adjuster 38, and the display 40 is connected to the image processor 39.

As exemplified in FIG. 3, the reference clock-generator 31, the waveform generator 32, the timing adjuster 38, the image processor 39 and the display 40 are commonly provided in the cell $X_{aij}$ on the upper space and the cell $X_{ai(j+1)}$ on the lower space. In a case of a small matrix of about 32×32 or less, if the waveform generator 32 is made to have a function for performing selections for each row and sequentially generating the excitation signals, the acoustic-elements $23_{aij}$, $23_{i(j+1)}$, . . . for each cell-row can be sequentially driven, even if a circuit configuration is omitted for feeding the signals of the word line $W_i$ to each switch 35 in the cells $X_{aij}$, $X_{ai(j+1)}$, . . . , with regard to the generation (transmission) of ultrasonic waves. The reference clock-generator 31, the waveform generator 32, the timing adjuster 38 and the image processor 39 implement a transmission/reception controller 30 later illustrated in FIG. 6A and FIG. 7. Regarding the processing of the reception signals from the respective cells $X_{aij}$, $X_{ai(j+1)}$, . . . of ultrasonic signals, the respective rows arranged . . . , which are arrayed in the 2D matrix can be selected, by applying the signals of the word line $W_i$ to the amplifier 36. As the data of the reception signals for ultrasonic wave imaging, a single spatial information is included in a half-wavelength of the ultrasonic wave. Therefore, when the reception signals for imaging is processed, clock signals which are about one order of magnitude faster (higher) than an ultrasonic frequency may be used as the signals for the word line $W_i$, and each row may be selected by sampling the ultrasonic signals.

The image processor 39 can hold and supply 3D or 2D data by properly holding and calculating the signals entered from the timing adjuster 38. The cell $X_{aij}$ and the cell $X_{ai(j+1)}$ exemplified in FIG. 3 represent two cells corresponding to a part of the element-array area 301a illustrated in FIG. 6A and FIG. 7. The respective functional blocks, each of which merges the transmission/reception controller 30 and the display 40 connected to the transmission/reception controller 30, are commonly provided in all cells $X_{aij}$, $X_{ai(j+1)}$, . . . in the element-array area 301a constructing the 2D matrix.

As illustrated in FIG. 3, the AEIC pertaining to the first embodiment encompasses the element-array area 301a deploying the cells $X_{aij}$, $X_{ai(j+1)}$, . . . , and the transmission/reception controller 30 common in all cells $X_{aij}$, $X_{ai(j+1)}$, . . . , etc., and the display 40 connected to the AEIC. The exciting circuit $T_{ij}$ and the reception circuit $R_{ij}$ are provided as intra-cell circuits in the cell $X_{aij}$, and the exciting circuit $T_{i(j+1)}$ and the reception circuit $R_{i(j+1)}$ are provided as intra-cell circuits in the cell $X_{ai(j+1)}$, respectively and individually. Thus, the cell $X_{ai(j+1)}$ can be controlled independently from the cell $X_{aij}$. If expressed in comprehensive representation meaning all cells, namely, in a generalized expression using the representative cell $X_{aij}$, the exciting circuit TA and the reception circuit $R_{ij}$ are individually provided for all cells $X_{aij}$ implementing the element-array area 301a. Thus, the respective cells $X_{aij}$, $X_{ai(j+1)}$, . . . positioned at intersections of the 2D matrix can be randomly accessed via the switch 35, and the respective cells $X_{aij}$, $X_{ai(j+1)}$, . . . can be individually controlled. If the operations of the respective cells $X_{aij}$, $X_{ai(j+1)}$, . . . arranged in the shape of 2D matrix can be randomly access-controlled individually, for example, when the ultrasonic waves are transmitted, the 2D phased-array in which the wave surfaces of the ultrasonic waves to be transmitted can be freely changed within a 2D surface can be constructed.

The reference clock-generator 31 serving as a partial circuit of the transmission/reception controller 30 illustrated on the right space in FIG. 3 generates reference clock signals to determine a timing of an operation of each of the functional blocks, which are provided independently from each other in the respective cells $X_{aij}$, $X_{ai(j+1)}$, . . . constructing the 2D matrix deployed on the coplanar surface. The waveform generator 32 in the transmission/reception controller 30 generates excitation signals to generate ultrasonic pulses, in the acoustic-element $23_{aij}$ in the cell $X_{aij}$, on the basis of the reference clock signals delivered from the reference clock-generator 31. The delay circuit 33 provided in each of the cells $X_{aij}$, $X_{ai(j+1)}$, . . . generates phase-delays different for each of the cells $X_{aij}$, $X_{ai(j+1)}$, . . . , with respect to the excitation signals delivered from the waveform generator 32, to perform the phased-array architecture. By generating the phase-delays different for each of the cells $X_{aij}$, $X_{ai(j+1)}$, . . . with respect to the excitation signals and performing the phased-array architecture, various scan schemes to carry out ultrasonic diagnosis can be achieved, for example, oblique scanning, electronic sector scanning, etc.

The high-voltage driver 34 provided in the cell $X_{aij}$ on the upper space in FIG. 3 converts the excitation signals from the waveform generator 32 in the transmission/reception controller 30 into high-voltage signals of, for example, about 200 volts. When, by the switch 35 provided in the cell $X_{aij}$, the acoustic-element $23_{aij}$ and the amplifier 36 are disconnected from each other and the high-voltage driver 34 and the acoustic-element $23_{aij}$ are electrically connected to each other, the high-voltage signals are applied between a lower electrode of the acoustic-element $23_{ij}$ and an upper electrode of a grounded potential, and the acoustic-element $23_{ij}$ is driven. On the other hand, when by the switch 35, the acoustic-element $23_{aij}$ and the high-voltage driver 34 are disconnected from each other and the acoustic-element $23_{aij}$ and the amplifier 36 are electrically connected to each other, the reception signals detected by the acoustic-element $23_{ij}$ are transmitted to the amplifier 36. As just described, by the switch 35 in the acoustic-element $23_{aij}$, the exciting circuit $T_{ij}$ is electrically connected to the acoustic-element $23_{ij}$ when the ultrasonic waves are transmitted, and the reception circuit $R_{ij}$ is electrically connected to the acoustic-element $23_{ij}$ when the ultrasonic waves are received. The amplifier 36 provided in the cell $X_{aij}$ amplifies the reception signals detected by the acoustic-element $23_{ij}$ in the cell $X_{aij}$. Since the amplifier 36 is integrated and arranged as intra-cell circuit near the acoustic-element $23_{ij}$, the SN ratio of the reception signals can be improved. The AD converter 37 connected to the amplifier 36 converts the reception signals, which are analog signals transferred from the amplifier 36, into digital signals.

The high-voltage driver 34 provided in the cell $X_{ai(j+1)}$ on the lower space in FIG. 3 converts the excitation signals from the waveform generator 32 in the transmission/reception controller 30 into high-voltage signals. When the acoustic-element $23_{ai(j+1)}$ and the amplifier 36 are disconnected from each other by the switch 35 provided in the cell $X_{ai(j+1)}$, and the high-voltage driver 34 and the acoustic-element $23_{ai(j+1)}$ are electrically connected to each other, the high-voltage signals are applied between a lower electrode of the acoustic-element $23_{ai(j+1)}$ and the upper electrode of the grounded potential, and the acoustic-element $23_{i(j+1)}$ is driven. In the same way to the switch 35 in the cell $X_{aij}$, by the switch 35 in the acoustic-element $23_{ai(j+1)}$, the exciting circuit $T_{i(j+1)}$ is electrically connected to the acoustic-element $23_{i(j+1)}$ when the ultrasonic waves are transmitted, and the reception circuit $R_{i(j+1)}$ is electrically connected to the acoustic-element $23_{i(j+1)}$ when the ultrasonic waves are received. When the acoustic-element $23_{ai(j+1)}$ and the high-voltage driver 34 are disconnected from each other by the switch 35 in the acoustic-element $23_{ai(j+1)}$, and the acoustic-element $23_{ai(j+1)}$ and the amplifier 36 are electrically connected to each other, the reception signals detected by the acoustic-element $23_{i(j+1)}$ are transferred to the amplifier 36 in the cell $X_{ai(j+1)}$. The amplifier 36 provided in the cell $X_{ai(j+1)}$ amplifies the reception signals detected by the acoustic-element $23_{i(j+1)}$ in the cell $X_{ai(j+1)}$. Since the amplifier 36 is integrated and arranged as intra-cell circuit near the acoustic-element $23_{ai(j+1)}$, the SN ratio of the reception signals can be improved. The AD converter 37 connected to the amplifier 36 converts the reception signals, which are analog signals transferred from the amplifier 36, into digital signals.

The transmission/reception controller 30 that is the common circuit illustrated on the right space in FIG. 3 includes the timing adjuster 38. The timing adjuster 38 is connected to the respective cells $X_{aij}$, $X_{ai(j+1)}$, . . . constructing the 2D matrix, as the common circuit of the respective cells $X_{aij}$, $X_{ai(j+1)}$, . . . constructing the element-array area 301a, and receives the respective reception signals from the respective cells $X_{aij}$, $X_{ai(j+1)}$, . . . . The timing adjuster 38 adjusts the timings of the digital signals from the AD converters 37 in the respective cells $X_{aij}$, $X_{ai(j+1)}$, . . . and transfers the digital signals to the image processor 39 in the transmission/reception controller 30. After necessary processes are performed on the digital signals from the AD converters 37, the image processor 39 connected to the timing adjuster 38 transfers the digital signals, on which the necessary processes are performed, to the display 40.

In addition, a DC bias voltage is preliminarily applied between the lower and upper electrodes of the capacitive acoustic-elements $23_{ij}$, $23_{i(j+1)}$, . . . each of which has the vibration-cavity. When the ultrasonic waves are transmitted, electrostatic force between the lower and upper electrodes is varied by the transmission pulse as the excitation signals, and the vibration membranes of the acoustic-elements $23_{ij}$, $23_{i(j+1)}$, . . . are displaced, thereby transmitting the ultrasonic waves. Also, when the ultrasonic waves are received, the vibration membranes are displaced by the ultrasonic waves, and the displacements result in the changes in the electrostatic capacitances between the lower and upper electrodes. Then, since the foregoing changes are extracted as electric signals, the ultrasonic waves are received.

As illustrated in FIG. 4, the AEIC pertaining to the first embodiment is the 3D integrated circuit built by a stacked body embracing the first chip 501, the second chip 502 in which high-voltage circuits of 20 volts or more are integrated, and the third chip 503 in which circuits of small-signal levels of less than 20 volts are integrated. The "circuits of small levels of less than 20 volts" practically includes an electronic circuit operating at voltages of 3.3 volts or less. FIG. 4 exemplifies the schematic structure of the triple cells $X_{ai(j-1)}$, $X_{aij}$ and $X_{ai(j+1)}$ arrayed on the i-th row of the 2D matrix constructing the element-array area 301a illustrated in FIG. 1 and FIG. 2. The first chip 501, the second chip 502 and the third chip 503 can be made by semiconductor chips that are mainly implemented by semiconductor substrates made of, for example, silicon (Si), silicon carbide (SiC), gallium nitride (GaN), etc. The semiconductor chips, which implement the first chip 501, the second chip 502, and the third chip 503, may be compositely built by semiconductor substrates and insulating layers, such as silicon-on-insulator (SOD) structure, etc. In particular, the semiconductor chips, which implement the second chip 502 and the third chip 503, may be structured in which semiconductor integrated circuits, such as ASIC, etc., are integrated.

The first chip 501 has the 2D array of the capacitive acoustic-elements $23_{i(j-1)}$, $23_{ij}$, $23_{i(j+1)}$, . . . that can be used for both of transmission and reception. The acoustic-elements $23_{i(j-1)}$, $23_{ij}$, $23_{i(j+1)}$, . . . provided in the first chip 501 implement a part of the cells $X_{ai(j-1)}$, $X_{aij}$, $X_{ai(j+1)}$, . . . arrayed on the i-th row of the matrix, respectively. In the cell $X_{ai(j+1)}$ illustrated on the left space in FIG. 4, the high-voltage driver (vibration-membrane driver) 34 and the switch 35, which implement the exciting circuit $T_{i(j-1)}$ of the cell $X_{ai(j-1)}$, are merged in the second chip 502. For convenience of arranging the higher-voltage operating-devices such as the high-voltage driver 34, the switch 35, etc., the semiconductor substrate of materials made of wide-bandgap semiconductor, which is excellent in high-breakdown-voltage characteristics, such as SiC, diamond, GaN, etc., may be used in the second chip 502. Although an expression that "the high-voltage circuits of 20 volts or more are integrated" in the second chip 502 is used in the above explanation, the above explanation is merely a representation to differentiate the second chip 502 from the third chip 503.

Figure 20:
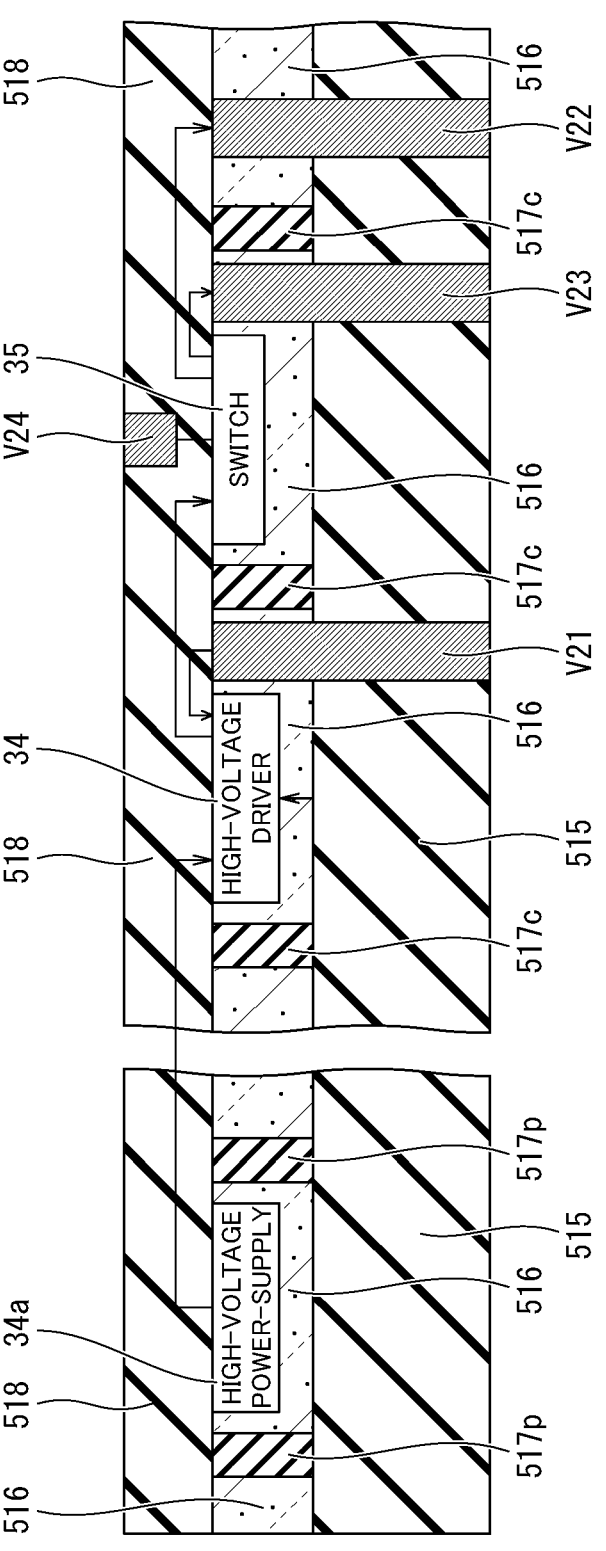
FIG. 20 is a cross-sectional view explaining an outline of a structural example of a second chip of the AEIC pertaining to the first embodiment, focusing to a structure of element isolation regions.
Figure 21:
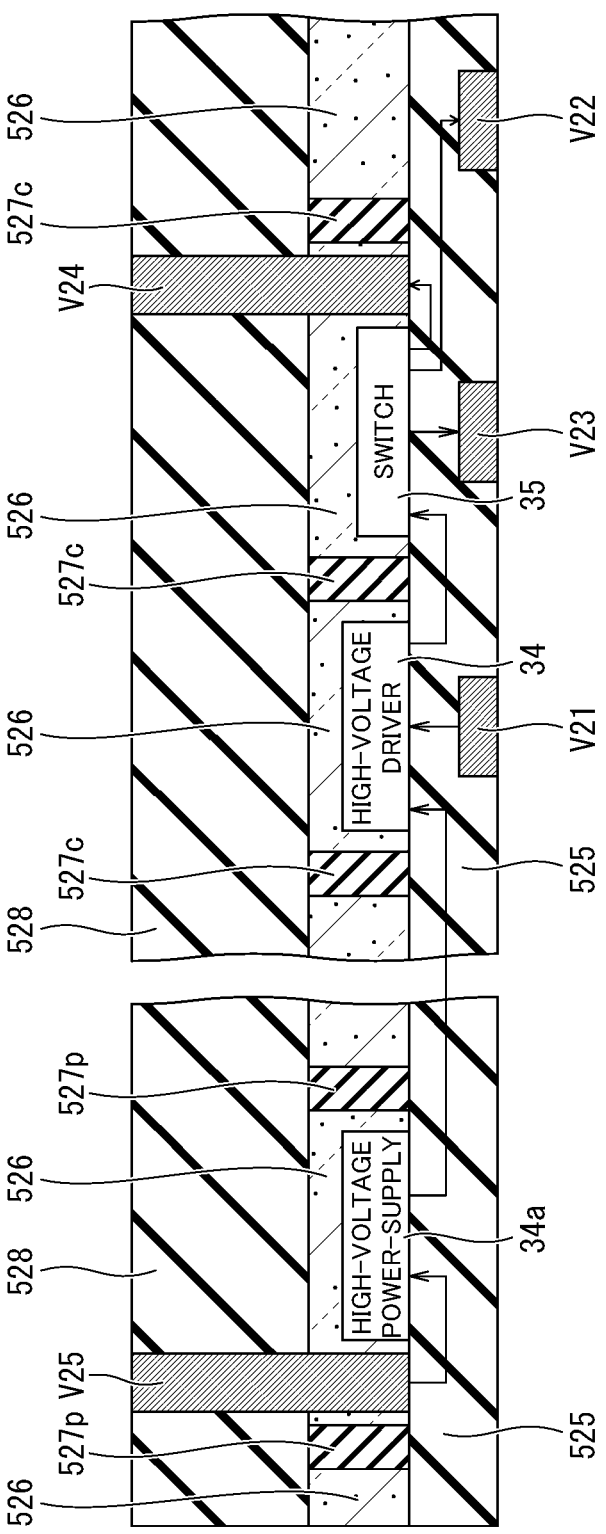
FIG. 21 is a cross-sectional view explaining an outline of another structural example of the second chip of the AEIC pertaining to the first embodiment, focusing to a structure of element isolation regions.

Regarding the second chip 502, by using high breakdown-voltage structures, such as a dielectric isolated structure with SOI structure and U-groove or a guard-ring structure, which will be exemplified in FIG. 20 and FIG. 21, or by using wide-bandgap semiconductors such as SiC, the second chip 502 facilitates the integration of high-voltage circuits at voltage levels of 40 volts or more. Namely, for example, the second chip 502 facilitates the integration of high-voltage circuits at voltage levels of about 100 volts to 200 volts or more. Although the wide-bandgap semiconductor, such as SiC, etc., has the feature that it is easy to construct the semiconductor integrated circuits of higher breakdown-voltages, on the other hand, there are technical issues on manufacturing process, such as a difficulty of growing a low specific-resistivity region (high-impurity concentration region) and a difficulty of providing electrodes with low contact-resistance. By specializing the second chip 502 as the chip dedicated to the high-voltage circuits, and by integrating the circuit of small-signal levels into the third chip 503 using the Si which is sophisticated in manufacturing technique, the manufacturing yield can be improved, and the percent of goods having required performance as the entire AEIC ca be achieved, and therefore, high reliability can be achieved. The high-voltage driver 34 in the cell $X_{ai(j-1)}$ converts low-voltage driving-signals at voltage levels of 3.3 volts or less from the third chip 503 into high-voltage signals, and the high-voltage driver 34 applies to the lower electrode of the acoustic-element $23_{i(j-1)}$.

The high-voltage driver 34 in the cell $X_{ai(j-1)}$ may be built by, for example, a CMOS circuit embracing power MOS transistors, or may be built by insulated gate bipolar transistor (IGBT), static induction (SI) thyristor, etc. A level shifter, and a high-side circuit connected to the level shifter may be provided on the front stage (input side) of the high-voltage driver 34. The high-side circuit will operate by signals, whose level is shifted to high-potential levels by the level shifter. By the switch 35 in the cell $X_{ai(j-1)}$, one of the high-voltage driver 34 and the amplifier 36 is electrically connected to the lower electrode of the acoustic-element $23_{i(j-1)}$ selectively, through the operation of an AND gate. The AND gate operates only when the signals of the word line $W_i$ on the i-th row are high level and the signals of the bit line $B_{j-1}$ on the (j−1)-th column are high level.

As indicated on the left space in FIG. 4, the switch 35 in the cell $X_{ai(j-1)}$ switches an operation of the acoustic-element $23_{ai(j-1)}$, which generates ultrasonic signals $s_{1i(j-1)}$ and transmits the ultrasonic signals $s_{1i(j-1)}$ to a target and an operation of the acoustic-element $23_{ai(j-1)}$, which receives reflection signal $s_{2(j-1)}$ from the target and converts into electric signals. The ultrasonic signals $s_{1i(j-1)}$ and the reflection signals $s_{2i(j-1)}$ are represented by arrow marks. For the switch 35 in the cell $X_{ai(j-1)}$, use a diode employing a voltage difference between transmitting and reception signals, a power MOS transistor, an IGBT, a SI thyristor, etc.

can be used. The third chip 503 has the delay circuit 33 in the exciting circuit $T_{i(j-1)}$, and the amplifier 36 and AD converter 37 in the reception circuit $R_{i(j-1)}$. Small-signal outputs of a low-side circuit constructing the delay circuit 33 integrated in the third chip 503 are transmitted to a high-side circuit by the level shifter, which constructs the front stage of the high-voltage driver 34 merged in the second chip 502. The high-voltage driver 34 is merged in the second chip 502 because the high-voltage driver 34 is the circuit of large-signal levels of 50 volts or more, or 100 volts or more, further about 200 volts, for exciting the vibration membrane of a transmission element $23_{i(j-1)}$. On the contrary, the delay circuit 33 is merged in the third chip 503 because the delay circuit 33 is the circuit operated at a low voltage of less than 20 volts, concretely, five volts or less, for example, 3.3 volts or less. The delay circuit 33 is a circuit for determining phases of the output signals from the high-voltage driver 34 and the operational timing.

In the cell $X_{aij}$ on the i-th row illustrated in the center space in FIG. 4, the high-voltage driver 34 and the switch 35, which implement the exciting circuit $T_{ij}$ in the cell $X_{aij}$, are merged in the second chip 502. The high-voltage driver 34 in the cell $X_{aij}$ converts low-voltage driving-signals at voltage levels of 3.3 volts or less from the third chip 503 into high-voltage signals, and applies to the lower electrode of the acoustic-element $23_{ij}$. The high-voltage driver 34 in the cell $X_{aij}$ is merged in the second chip 502 because the high-voltage driver 34 is a circuit of the large-signal levels of 50 volts or more, or 100 volts or more, further about 200 volts to vibrate the vibration membrane of the transmission element $231_{ij}$. On the contrary, the delay circuit 33 in the cell $X_{aij}$ is merged in the third chip 503 because the delay circuit 33 is a circuit operated at lower voltages of less than 20 volts, concretely, five volts or less, for example, 3.3 volts or less. The delay circuit 33 in the cell $X_{aij}$ is the circuit for determining phases of the output signals from the high-voltage driver 34 in the cell $X_{aij}$ and the operational timing.

In the switch 35 in the cell $X_{aij}$, one of the high-voltage driver 34 and the amplifier 36 is selectively and electrically connected to the lower electrode of the acoustic-element $23_{ij}$ by selection at an intersection point in the matrix, which is operated only when the signals of the word line $W_i$ are high level and the signals of the bit line $B_j$ are high level. In the central region corresponding to the cell $X_{aij}$ in the third chip 503, there are the delay circuit 33 in the exciting circuit $T_{ij}$ necessary for the cell $X_{aij}$, and the amplifier 36 and the AD converter 37 in the reception circuit $R_{ij}$. As indicated by arrow marks a top of the center space in FIG. 4, the switch 35 in the cell $X_{aij}$ switches an operation of the acoustic-element $23_{aij}$, which generates the ultrasonic signals $s_{1ij}$ and transmits the ultrasonic signals $s_{1ij}$ into the target and an operation of the acoustic-element $23_{aij}$, which receives the reflection signals $s_{2j}$ from the target and converts into electric signals.

In the second chip 502 in the cell $X_{ai(j+1)}$ on the i-th row illustrated on the right space in FIG. 4, the high-voltage driver 34 and the switch 35 are provided which implement the exciting circuit $T_{i(j+1)}$ in the cell $X_{ai(j+1)}$. The high-voltage driver 34 in the cell $X_{ai(j+1)}$ converts the low-voltage driving-signals at levels of 3.3 volts or less from the third chip 503 into high-voltage signals, and applies to the lower electrode of the acoustic-element $23_{ai(j+1)}$. In the switch 35 in the cell $X_{ai(j+1)}$, one of the high-voltage driver 34 and the amplifier 36 is selectively and electrically connected to the lower electrode of the acoustic-element $23_{ai(j+1)}$ by selection at an intersection point in the matrix, which is operated only when the signals of the word line $W_i$ are high level and the signals of the bit line $B_{j+1}$ are high level. As illustrated on the right space in FIG. 4, the switch 35 in the cell $X_{ai(j+1)}$ switches an operation of the acoustic-element $23_{ai(j+1)}$, which generates ultrasonic signals $s_{1i(j+1)}$ and transmits the ultrasonic signals $s_{1i(j+1)}$ to a target and an operation of the acoustic-element $23_{ai(j+1)}$, which receives the target and converts into electric signals. The ultrasonic signals $s_{1i(j+1)}$ and the reflection signals $_{s2i(j+1)}$ are represented by arrow marks in FIG. 4.

In the third chip 503, the delay circuit 33 in the exciting circuit $T_{i(j+1)}$ necessary for the cell $X_{ai(j+1)}$, and the amplifier 36 and the AD converter 37 in the reception circuit $R_{i(j+1)}$ are merged in the region on the right space corresponding to the cell $X_{ai(j+1)}$. The high-voltage driver 34 in the cell $X_{ai(j+1)}$ is merged in the second chip 502 because the high-voltage driver 34 is the circuit of the large-signal levels of 50 volts or more, or 100 volts or more, further about 200 volts to vibrate the vibration membrane of the transmission element $23_{i(j+1)}$. On the contrary, the delay circuit 33 in the cell $X_{ai(j+1)}$ is merged in the third chip 503 because the delay circuit 33 is a circuit operated at lower voltages of less than 20 volts, concretely, five volts or less, for example, 3.3 volts or less. The delay circuit 33 in the cell $X_{ai(j+1)}$ is the circuit for determining phases of the output signals from the high-voltage driver 34 in the cell $X_{ai(j+1)}$ and the operational timing.

Figures 24A, 24B:
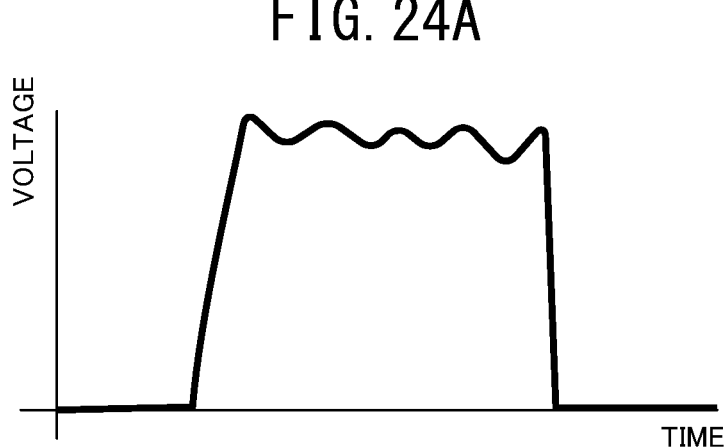
FIG. 24A is a schematic view explaining characteristics of a high-voltage driver for driving an earlier capacitive acoustic-element.
FIG. 24B is a schematic view explaining a vibration of a vibration membrane corresponding to the characteristics illustrated in FIG. 24A.

In an earlier capacitive acoustic-element, as illustrated in FIG. 24A, an operation is carried out in which a bias voltage is applied between the upper and lower electrodes of the acoustic-element, signal voltages of, for example, ±20 volts are superimposed, and a vibration of a small amplitude within a range of the signal voltages is accordingly performed. That is, a vibration membrane of the earlier capacitive acoustic-element is vibrated, for example, between 80 volts and 120 volts or between 160 volts and 200 volts, as illustrated in FIG. 24B. Thus, the above vibration membrane is not driven under a full-span swing-voltage. In the AEIC pertaining to the first embodiment, since the circuit merged in the second chip 502 and the circuit merged in the third chip 503 are sorted to the respective operation-voltage levels, the circuit of the large-signal levels can be stably operated without any influence on the circuit of the small-signal levels.

Figure 22A:
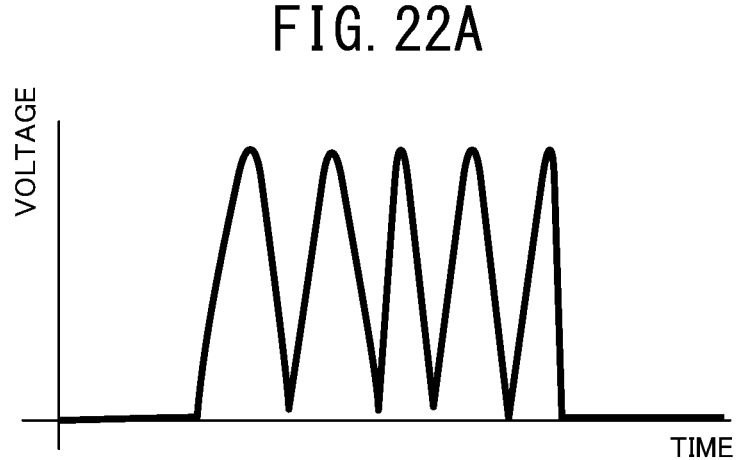
FIG. 22A is a schematic view explaining characteristics of a high-voltage driver of the acoustic-elements pertaining to the first to third embodiments.
Figure 22B:
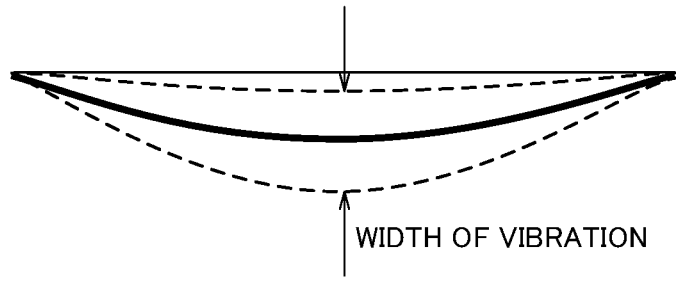
FIG. 22B is a schematic view explaining a vibration of a vibration membrane corresponding to the characteristics illustrated in FIG. 22A.

Therefore, the high-voltage driver 34 in the AEIC pertaining to the first embodiment can stably apply the high-voltage signals vibrated at a large amplitude, for example, between zero volt and 100 volts, zero volt and 140 volts, or zero volt and 200 volts, as illustrated in FIG. 22A, between the upper and lower electrodes of each of the 2D arrayed acoustic-elements $23_{i(j-1)}$, $23_{ij}$, $23_{i(j+1)}$, . . . . As a result, the vibration membrane of each of the acoustic-elements $23_{i(j-1)}$, $23_{ij}$, $23_{i(j+1)}$, . . . can be vibrated closely to the full-span swing, for example, between zero volt and 100 volts, zero volt and 140 volts, or zero volt and 200 volts, as illustrated in FIG. 22B.

A force $F_{mem}$ applied to the vibration membrane of the capacitive acoustic-element is divided into a mechanical force $F_{mech}$ and an electrostatic force $F_{elec}$:

$$F_{mem} = F_{mech} + F_{elec} \qquad (1)$$

The electrostatic force $F_{elec}$ is determined by differentiating a potential energy of a vibration membrane in an acoustic-element as indicated by Eq. (2). That is, when a voltage applied between the upper and lower electrodes of the acoustic-element is represented by "V" and a capacitance between the upper and lower electrodes of the acoustic-element is represented by "C", the electrostatic force $F_{elec}$ applied to the vibration membrane of the capacitive acoustic-element is represented by the following Eq. (2):

$$F_{elec} = -(d/dx)(CV^2/2) \qquad (2)$$

On the other hand, the mechanical force $F_{mech}$ is represented by the following Eq. (3), when a constant of a spring of a vibration membrane of an acoustic-element is represented by "k" and a displacement amount of the vibration membrane of the acoustic-element is represented by "x":

$$F_{mech} = -kx \qquad (3)$$

Figure 23A:
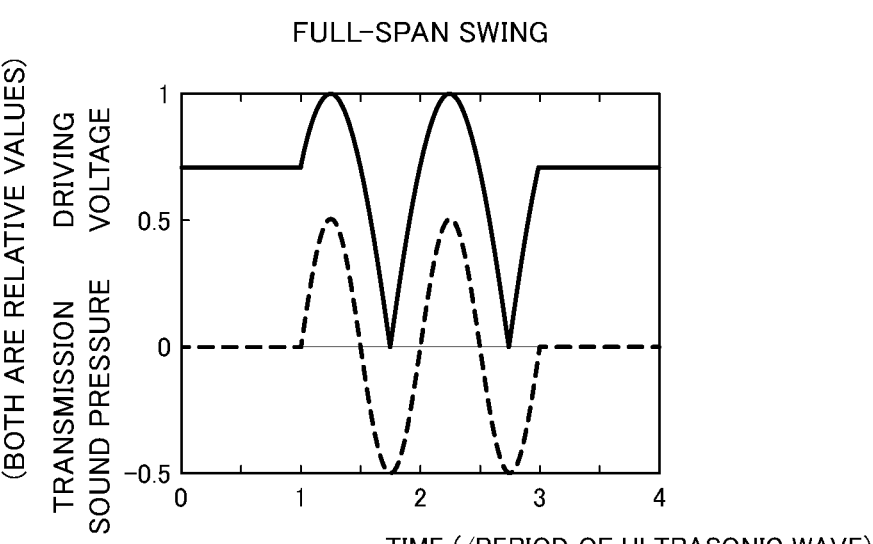
FIG. 23A is an enlarged view schematically illustrating in more detail a drive-voltage waveform and a sound-pressure waveform of an ultrasonic wave in a case of full span swing exemplified in FIG. 22.
Figure 23B:
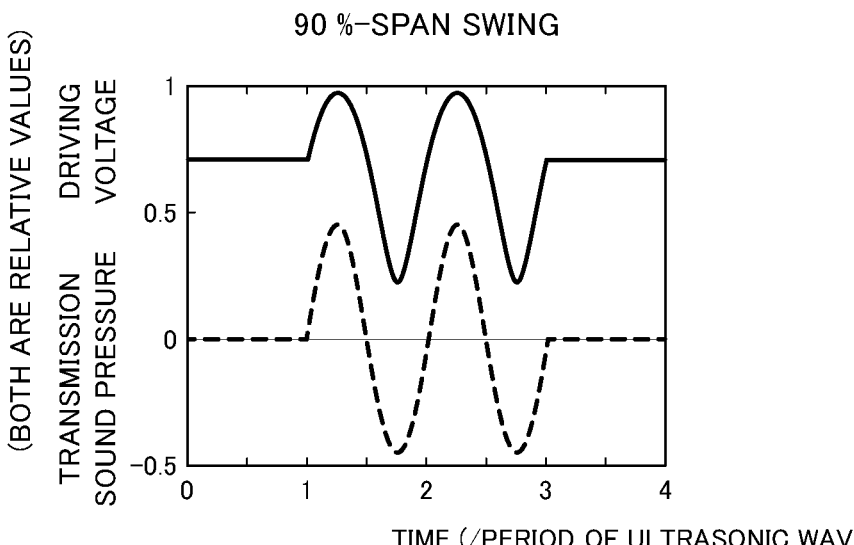
FIG. 23B is an enlarged view schematically illustrating a drive-voltage waveform and a sound-pressure waveform of the ultrasonic wave in a case of 90%-span swing.

A solid line on the upper space in FIG. 23A corresponds to a voltage waveform exemplified in FIG. 22A, and when a driving voltage of the capacitive acoustic-element is under a condition of the full-span swing, a drive-voltage waveform is indicated by a relative value. A dashed line on the lower space in FIG. 23A indicates the relative values of the sound-pressure waveform of a transmitting ultrasonic wave, which is driven by a voltage waveform represented at the upper space in FIG. 23A. When the sound-pressure waveform of the ultrasonic waves is assumed to be a waveform of sine-wave indicated by the dashed line, as indicated by Eq. (2), the maximum-value sides of the drive-voltage waveform are represented as shapes of rounded smooth change, as indicated by the solid line. However, the minimum-value sides (zero-volt sides) of the drive-voltage waveform are represented as shapes of acute downward convex, as indicated by the solid line. That is, right-hand and left-hand limits of the derivative values of the functional value indicating the drive-voltage waveform at zero volt are discontinuous. The solid line on the upper space in FIG. 23B indicates relative value of the drive-voltage waveform, in a case of 90%-span-swing regarding the driving voltage of the capacitive acoustic-element. The dashed line on the lower space in FIG. 23B indicates relative value of the sound-pressure waveform of the transmitting ultrasonic wave driven by the voltage illustrated on the upper space. As indicated by the solid line on the upper space in FIG. 23B, in the case of the 90%-span-swing, both of the maximum and minimum-value sides of the drive-voltage waveform are indicated as shapes of rounded smooth changes.

Although illustration is omitted in FIG. 4, one or more circuits among the circuits constructing the functional blocks of the reference clock-generator 31, the waveform generator 32, the timing adjuster 38 and the image processor 39 in the transmission/reception controller 30 illustrated on the right space in FIG. 3 may be merged in the third chip 503. In the AEIC pertaining to the first embodiment, the electronic circuits driven by higher voltages are installed inside the second chip 502, and the electronic circuits driven by lower voltages are merged in the third chip 503. As just described, since depending on drive-voltage levels, the circuits constructing the respective functional blocks are sorted to the respective chips, the electronic circuits to be driven by higher voltages are integrated into the wide-bandgap semiconductor substrate such as SiC, and the electronic circuits to be driven by lower voltages are integrated into the Si substrate, in which circuit-integration process is easy and well refined, and it is accordingly possible to select semiconductor materials. Also, since the electronic circuits to be driven by higher voltages are merged in the second chip 502 and the electronic circuits to be driven by lower voltages are merged in the third chip 503, the free degree in the layouts of circuits is improved which implement the respective functional blocks exemplified in FIG. 3. Although not clearly illustrated in FIG. 3, as illustrated in FIG. 5, a serial-to-parallel converter 37a, which is difficult to be merged in a device structure of a process node in which high-voltage driving is possible, can be merged in the third chip 503, which is driven by lower voltages.

Among the cells $X_{ai(j-1)}$, $X_{aij}$ and $X_{ai(j+1)}$ on the i-th row exemplified in FIG. 4, by focusing to the cell $X_{aij}$, the concept of the schematic structure of the cell $X_{aij}$ is concretely exemplified by using the configuration illustrated in FIG. 5. That is, in the cell $X_{aij}$ constructing the AEIC pertaining to the first embodiment, similarly to FIG. 4, the second chip 502 is stacked on the third chip 503, and the first chip 501 is stacked on the second chip 502. The first chip 501 is arranged on the main surface of a semiconductor substrate 511 and creates the structure of the capacitive acoustic-element $23_{ij}$ usable for both transmitting and receiving, which carries out the transmitting/receiving operation of ultrasonic waves, together with the semiconductor substrate 511. A ground plug V0 and an excitation plug V1 which are via-plugs as through-silicon vias (TSVs) penetrating from the main surface to the bottom surface of the semiconductor substrate 511 are provided in the semiconductor substrate 511. In the AEIC pertaining to the first embodiment, the ground plug V0 and the excitation plug V1 are collectively and generically called as "connection-plugs (V0, V1)" of upper-layer.

The acoustic-element $23_{ij}$ has a lower electrode E1 connected to the excitation plug V1 and an upper electrode E2 arranged through a vibration-cavity H in reduced pressure state, which can be considered as substantially vacuum, on the lower electrode E1. The upper electrode E2 is connected through the ground plug V0 to a ground terminal. The excitation plug V1 is allocated at a position at which the excitation plug V1 does not overlap with the vibration-cavity H. Due to the planar layout exemplified in FIG. 1, a crushing problem is solved. Namely, the crushing problem such that the vibration-cavity H is crushed, when the first chip 501, the second chip 502 and the third chip 503 are stacked, and electrical inter-chip connections using jointing members such as bumps or the like are made by pressure welding etc. can be solved.

Although the second chip 502 is exemplified as a composite structure of a semiconductor substrate 512 and a semiconductor layer, the composite structure is merely a schematic model, and the second chip 502 is not limited to the structure illustrated in FIG. 5. In the semiconductor layer, the high-voltage driver 34 and switch 35, connected to the main surface of the semiconductor substrate 512, are integrated. For example, the second chip 502 may be implemented by integrated semiconductor substrate, and not as the composite structure of the semiconductor substrate 512 and the semiconductor layer provided on the main surface of the semiconductor substrate 512. Or, as illustrated in FIG. 20, the second chip 502 may be made by a SOI substrate (515 and 516) and a multi-level insulator structure 518. Regarding the structure of the second chip 502 illustrated in FIG. 20, in the SOI substrate (515 and 516), the SOI silicon layer 516 is stacked on the SOI insulator 515, and by digging U-grooves in the SOI silicon layer 516, and patterns of dielectric isolation regions 517p and 517c are delineated in a shape of grids, and the SOI silicon layer 516 is divided into a plurality of island-shaped regions. The multi-level insulator structure 518 is built by a field insulator formed on the surface (top surface) of the SOI silicon layer 516, a plurality of inter-layer insulators laminated on the field insulator, and a passivation film laminated on the top layer of the inter-layer insulator.

A circuit of a high-voltage power-supply 34a is integrated on the surface of the island-shaped SOI silicon layer 516 surrounded by the dielectric isolation region 517p and the SOI insulator 515 on the left space in FIG. 20. Also, a circuit of the high-voltage driver 34 is integrated on the surface of the island-shaped SOI silicon layer 516 surrounded by the dielectric isolation region 517c and the SOI insulator 515 in the center space in FIG. 20, and a circuit of the switch 35 is integrated on the surface of the island-shaped SOI silicon layer 516 surrounded by the dielectric isolation region 517c and the SOI insulator 515 on the right space in FIG. 20. Although illustration is omitted, by using the upper portion of the field insulator and the portion between the inter-layer insulators which implement the multi-level insulator structure 518, electric wirings required to construct the circuit of the high-voltage power-supply 34a are deployed in 3D space as the multi-level interconnection, and through the electric wirings, the portions between circuit elements such as transistors, etc., which implement the high-voltage power-supply 34a, are coupled to each other. Similarly, through electric wirings required to construct the respective circuits of the high-voltage driver 34 and the switch 35, circuit elements such as transistors, etc., are coupled to each other, due to the layout of 3D configuration using the multi-level interconnection in the multi-level insulator structure 518.

Although the illustration of physical practical wirings is omitted in FIG. 20, so as to extend over the dielectric isolation region 517p and the dielectric isolation region 517c, which surround each of the high-voltage power-supply 34a and the high-voltage driver 34 as the island-shaped regions, by using the global intra-cell wiring via multi-level interconnection structure on the field insulator or between the inter-layer insulators or by via-plugs, the high-voltage power-supply 34a and the high-voltage driver 34 in each cell are electrically connected. Similarly, to extend over the dielectric isolation region 517c, which surrounds each of the high-voltage driver 34 and the switch 35 as the island-shaped regions, by using the intra-cell wiring via multi-level interconnection structure on the field insulator or between the inter-layer insulators or by via-plugs, the high-voltage driver 34 and the switch 35 are electrically connected. However, in FIG. 20, the internal-structure is illustrated by simplified arrow marks such that the uniform multi-level insulator structure 518 coats on the surfaces of the circuits of the high-voltage power-supply 34a, the high-voltage driver 34 and the switch 35.

As described already, if the second chip 502 is made of the wide-bandgap semiconductor such as SiC, etc., the circuits operating at higher voltages can be merged in the second chip 502. In the exemplification illustrated in FIG. 5, an exciting-circuit plug V21, a receiving-circuit plug V22 and a switching plug V23 are represented as TSVs penetrating from the main surface to the bottom surface of the semiconductor substrate 512. However, when the second chip 502 is made of the monolithic semiconductor substrate such as the wide-bandgap semiconductor etc., there is a case that the exciting-circuit plug V21, the receiving-circuit plug V22 and the switching plug V23 are not the TSV. In the configuration of the second chip 502 exemplified in FIG. 20, the exciting-circuit plug V21, the receiving-circuit plug V22 and the switching plug V23 are provided as TSVs penetrating the SOI insulator 515 and the SOI silicon layer 516.

In the center space in FIG. 20, although an example of establishing TSV structure is illustrated, in which the exciting-circuit plug V21 penetrates the island-shaped SOI silicon layer 516 surrounded by the dielectric isolation region 517c and arrives at the top surface of the SOI silicon layer 516, the structure of the SOI silicon layer 516 is not limited to the structure in FIG. 20. In the example illustrated n FIG.

20, an upper end of the exciting-circuit plug V21 and the high-voltage driver 34 are connected by using the multi-level interconnection structure on the field insulator or between the inter-layer insulators, or via-plugs connecting the multi-level interconnection structures, above the SOI silicon layer 516. Similarly, adjacently to the islanded-shaped SOI silicon layer 516 in which the high-voltage driver 34 is arranged, and on the right space in FIG. 20, an upper end of the switching plug V23 serving as TSV which penetrates the islanded-shaped SOI silicon layer 516 surrounded by the dielectric isolation region 517c and arrives at the top surface of the SOI silicon layer 516, and the switch 35 are connected by using the multi-level interconnection structure on the field insulator or between the inter-layer insulator, or via-plugs connecting the multi-level interconnection structures.

Moreover, the switch 35 and the receiving-circuit plug V22, whose upper end is exposed to the top surface of the SOI silicon layer 516, are electrically connected, extending over the dielectric isolation region 517c surrounding the island-shaped SOI silicon layer 516. The switch 35 and the upper end of the receiving-circuit plug V22 that is TSV are connected by using the intra-cell wiring via multi-level interconnection structure above the SOI silicon layer 516. In addition, FIG. 20 is merely an exemplifying view to explain schematic cross-sectional structure, and therefore, the positions which the exciting-circuit plug V21, the receiving-circuit plug V22 and the switching plug V23 penetrate practically are not limited to the layout illustrated in FIG. 20. For example, the positions on the planar pattern which the exciting-circuit plug V21, the receiving-circuit plug V22 and the switching plug V23 penetrate the SOI insulator 515 and the SOI silicon layer 516 as TSVs may be the peripheral areas of the cell, as explained in FIG. 1. Also, at the positions outside the island-shaped SOI silicon layer 516 surrounded by the dielectric isolation region 517c, the exciting-circuit plug V21, the receiving-circuit plug V22 and the switching plug V23 may penetrate the SOI insulator 515 and the SOI silicon layer 516.

As illustrated in FIG. 5, on the main surface of the semiconductor substrate 512, an upper inter-chip connector (connection mechanism) B0 connected to the ground plug V0 of the first chip 501 and an upper inter-chip connector (connection mechanism) B1 connected to the excitation plug V1 are arranged respectively on connection lands whose illustrations are omitted. For the upper inter-chip connectors B0 and B1, bumps made of gold (Au) or copper (Cu) can be employed. Or alternatively, bumps made of Au alloys or mixtures of Au, which contain cobalt (Co), nickel (Ni), iridium (Ir), chromium (Cr), tungsten (W), titanium (Ti), titanium tungsten (TiW), alumina (Al$_2$O$_3$), silicon (Si), etc., can be employed as the upper inter-chip connectors B0 and B1. Furthermore, bumps implemented by Cu alloys or mixtures of Cu can be employed as the upper inter-chip connectors B0 and B1. The upper inter-chip connectors B0 and B1 are not limited to the bumps, and various jointing conductors can be employed if conductors serving as the upper inter-chip connectors have functions for electrically connecting the circuit of the first chip 501 and the circuit of the second chip 502 such as solder, solder ball, etc.

Epoxy resin or epoxy resin containing filler, etc. is filled around the upper inter-chip connectors B0 and B1. The epoxy resin, etc. may be provided before the first chip 501 and the second chip 502 are connected by the upper inter-chip connectors B0 and B1 or after the connection. As the connection-member between the substrates, instead of the bump, hybrid bonding technique for simultaneously jointing connecting conductors embedded in an insulating film and the insulating film may be used for the upper inter-chip connectors B0 and B1. In re the hybrid bonding, insulating material is filled around the upper inter-chip connectors B0 and B1, and silicon oxide film, multi-level insulator structure composed of one of silicon, oxygen, nitrogen and carbon or multi-level insulator structure composed of a plurality of materials is filled, and the upper inter-chip connectors B0 and B1 are buried in the multi-level insulator structure.

The upper inter-chip connector is not limited to the connection by bumps, the hybrid bonding etc., and the bottom surface of the first chip 501 whose surface is mirror polished and the top surface of the second chip 502 whose surface is mirror polished may be directly bonded to each other by using inter-molecule force of direct silicon bonding (DSB) method or van-der-Waals' force. When the first chip 501 and the second chip 502 are bonded to each other by the DSB method, it is natural that the epoxy resin does not exist between the first chip 501 and the second chip 502. Moreover, the upper inter-chip connector may include a layer of interposer for converting a pitch of a cell array of the first chip 501 and a pitch of a cell array of the second chip 502. That is, if there is a correspondence relationship such that the pattern of the cell array of the first chip 501 can be projected onto the pattern of the cell array of the second chip 502, the first chip 501 and the second chip 502 can be connected through the interposer. Thus, by making the pitch of the cell array of the first chip 501 finer than the pitch of the cell array of the second chip 502, the resolution of a 2D image, which is obtained by ultrasonic signals, can be improved. Inversely, similarly to a telescope network in astronomical observation, the array of the acoustic-elements in the first chip 501 may be enlarged to become coarser. Namely, the pitch of the cell array of the first chip 501 may be made larger than the pitch cell array of the second chip 502, and the first chip 501 and the second chip 502 may be connected by the interposer.

As illustrated on the left space in FIG. 5, the high-voltage power-supply 34a is arranged in a region on the left of the element-array area in which the cells $X_{ai(j-1)}$, $X_{aij}$, $X_{ai(j+1)}$, . . . in the second chip 502 are arranged in the shape of matrix. And, a bonding pad BP1 as illustrated on the left space in FIG. 5 is provided on the top surface of the second chip 502, in the peripheral-circuit area in which the high-voltage power-supply 34a is arranged. A wire W1 is bonding-connected to the bonding pad BP1 on the top surface of the second chip 502. From the high-voltage power-supply 34a to which electric source is supplied through the wire W1, a high voltage is supplied to the high-voltage driver (vibration-membrane driver) 34 of each of the cells $X_{ai(j-1)}$, $X_{aij}$, $X_{ai(j+1)}$, . . . arranged in the element-array area. The high-voltage driver 34 can supply the high-voltage signals of the full-span swing for vibrating the vibration-cavity of the capacitive element in each of the cells $X_{ai(j-1)}$, $X_{aij}$, $X_{ai(j+1)}$, . . . as exemplified in FIG. 22A, FIG. 22B and FIG. 23A, from the second chip 502.

Although illustration of the bonding pad is omitted, a grounding bonding pad is also provided on the top surface of the second chip 502 in the peripheral-circuit area. A grounding wire is bonding-connected to the grounding bonding pad. A ground potential though the grounding wire is connected through the upper inter-chip connector B0 to a grounding plug V0 in the first chip 501, and the upper electrode E2 of the first chip 501 in each of the cells $X_{ai(j-1)}$, $X_{aij}$, $X_{ai(j+1)}$, . . . arranged in the element-array area is grounded. The exciting-circuit plug V21 in the second chip 502 is electrically connected to the high-voltage driver 34 through an intra-chip wiring such as connection-plug whose illustration is omitted. The receiving-circuit plug V22 is electrically connected to the switch 35 through an intra-chip wiring such as a connection-plug whose illustration is omitted.

Also, the switching plug V23 is electrically connected to the switch 35 through an intra-chip wiring independent of the intra-chip wiring of the receiving-circuit plug V22. The switch 35 and a connection land mounting the upper inter-chip connector B1 on the main surface of the semiconductor substrate 512 are electrically connected to each other, through an intra-chip wiring such as a connection-plug whose illustration is omitted. In the configuration example of the second chip 502 exemplified in FIG. 20, a case is schematically illustrated in which the connection land (whose illustration is omitted) mounting the upper inter-chip connector B1 in FIG. 5 and the switch 35 are connected by using a buried plug for connecting the multi-level interconnection structures. The schematic view in FIG. 20 illustrates a connection-plug (buried plug) V24 buried in the upper portion of the multi-level insulator structure 518 to be connected to the connection land mounting the upper inter-chip connector B1. However, a portion between the connection-plug V24 and the switch 35 is simply indicated with one line, and the physical illustration of practical wiring structure is omitted. It is natural that the connection-plug V24 and the switch 35 can be connected by the multi-level interconnection structure, or via-plugs connecting the multi-level interconnection structures, in the various layouts.

As illustrated in FIG. 5, the high-voltage driver 34 is arranged in the second chip 502 corresponding to a position of the cell $X_{aij}$ and connected to both the high-voltage power-supply 34a and the third chip 503. Thus, the high-voltage driver 34 can shift levels of the low-voltage driving-signals at levels of 3.3 volts or less, which are received from the third chip 503 to high-voltage signals. A delay circuit 33, an amplifier 36, an AD converter 37 and a controller 35a in the cell $X_{aij}$ are provided in the region of the third chip 503 corresponding to a position of the cell $X_{aij}$. Although the controller 35a is a circuit that is not illustrated as a block diagram illustrated in FIG. 3, the double-input AND gate in the switch 35 explained as being included in the controller 35a in FIG. 3 corresponds to the controller 35a. The controller 35a can assist the switching control of the switch 35, by carrying out the matrix selection process that is operated only when the signals of the word line $W_i$ are high level and the signals of the bit line B; are high level.

Although illustration is omitted in FIG. 5, in the peripheral-circuit area close to a chip peripheral-edge of the third chip 503, the column-driver 302 and the row-driver 303 which are illustrated as the peripheral circuits in FIG. 2 are arranged to surround the element-array area 301a. Although the illustrations of the word line $W_i$ and the bit line $B_j$ are omitted, the word line $W_i$ on the i-th row delivered from the row-driver 303 and the bit line $B_j$ on the j-th column delivered from the column-driver 302 are connected to the double-input AND gate constructing the controller 35a, and the controller 35a executes assistance operations of the switching controls for the switch 35 in the second chip 502. The word line $W_i$ and the bit line $B_j$ can be made of surface wirings or buried wirings in the third chip 503. Although illustration is omitted in FIG. 5, for example, the multi-level interconnection structure is established as a plurality of inter-layer insulators on the top surface of the third chip 503, and the word line $W_i$ and the bit line $B_j$, which are orthogonal to each other, can be provided.

In the configuration illustrated in FIG. 5, the electronic circuits corresponding to the high-voltage circuits of the high-voltage driver 34 and switch 35 which are driven by higher voltages are merged in the second chip 502 that is the wide-bandgap semiconductor. And, the controller 35a as the portion of the electronic circuit driven by lower voltages in the switch 35 is merged in the third chip 503 using the Si substrate, and the sorting of chips by operation voltages in the electronic circuit is performed. In the peripheral circuit on the left of the element-array area in which the cells $X_{ai(j-1)}$, $X_{aij}$, $X_{ai(j+1)}$, . . . in the third chip 503 are arranged in the shape of matrix, a reference clock-generator 31 and a waveform generator 32 are provided as circuits in a common circuit portion.

In the peripheral-circuit area illustrated on the right of the element-array area in FIG. 5, a serial-to-parallel converter 37a is provided as a circuit in another common circuit portion. The serial-to-parallel converter 37a corresponds to the output-buffer circuit 304 illustrated as the peripheral circuit in FIG. 2, and for example, a serial-to-parallel converter 37a may be included as an intra-cell circuit of the output-buffer circuit 304. The serial-to-parallel converter 37a converts many parallel signals, which are read out by the vertical-output signal-lines $R_1$, $R_2$, $R_3$, . . . , $R_{(j-1)}$, $R_j$, $R_{(j+1)}$, . . . in FIG. 2, into serial signals. Since the serial-to-parallel converter 37a converts into the serial signals, signal-lines from all cells arrayed in the shape of array can be collected to a single point, which can reduce the number of connection wirings from a probe.

On the top surface of the third chip 503 corresponding to the position of the cell $X_{aij}$, as illustrated in FIG. 5, lower inter-chip connectors (connection mechanisms) B21, B22 and B23 are mounted on connection lands whose illustration is omitted, respectively. In the same way to the upper inter-chip connectors B0 and B1, for the lower inter-chip connectors B21, B22 and B23, bumps made of Au or Cu, or bumps made of Au alloys or Au mixtures such as Au—Co, Au—Ni, Au—Ir, Au—Cr, Au—W, Au—Ti, Au—Si etc., or furthermore, bumps made of Cu alloys or Cu mixtures can be employed. However, the lower inter-chip connectors B21, B22 and B23 may be solders or solder balls. In the same way to the upper inter-chip connector, the lower inter-chip connector is not limited to the connection using the jointing members such as bumps, or the hybrid bonding. Then, the bottom surface of the second chip 502 whose surface is mirror polished and a top surface of the third chip 503 whose surface is mirror polished may be directly bonded to each other by using the inter-molecule force Moreover, the lower inter-chip connector may include the layer of the interposer which converts the pitch of the cell array in the second chip 502 and the pitch of the cell array in the third chip 503. That is, it is enough that there is a correspondence relationship such that the pattern of the cell array of the second chip 502 can be projected onto the pattern of the cell array of the third chip 503. Therefore, when the pitches of the cell arrays of each of the first chip 501 and the second chip 502 are made finer for improving the resolution, a stack of the first chip 501 and the second chip 502 may be connected to the third chip 503, whose cell areas are large, through the interposer serving as the lower inter-chip connector. Or alternatively, the first chip 501 and the second chip 502 are connected through an interposer serving as an upper inter-chip connector, and the pitch conversion is performed, and the second chip 502 and the third chip 503 are connected through the interposer serving as a lower inter-chip connector so that double-stage pitch conversion can be performed, and the array of the acoustic-elements in the first chip 501 may be made finer. Inversely, double interposers to perform the double-stage pitch conversion may be inserted such that the pitch of the cell array in the first chip 501 is larger than the pitch of the cell array in the second chip 502 and the pitch of the cell array in the second chip 502 is larger than the pitch of the cell array in the third chip 503.

A connection land mounting the lower inter-chip connector B21 is connected to the delay circuit 33 through an intra-chip wiring such as a connection-plug whose illustration is omitted. A connection land mounting the lower inter-chip connector B22 is connected to the amplifier 36 through an intra-chip wiring such as a connection-plug whose illustration is omitted, and a connection land mounting the lower inter-chip connector B23 is connected to the controller 35a through an intra-chip wiring such as a connection-plug whose illustration is omitted. As illustrated in FIG. 5, the lower inter-chip connectors B21, B22 and B23 are connected to the exciting-circuit plug V21, the receiving-circuit plug V22 and the switching plug V23, respectively, which are provided in the bottom surface of the second chip 502. In addition, in the AEIC pertaining to the first embodiment, the exciting-circuit plug V21, the receiving-circuit plug V22 and the switching plug V23 are collectively and generically called lower-layer "connection-plugs (V21, V22 and V33)".

As a result, the delay circuit 33 in the third chip 503 is electrically connected to the high-voltage driver 34 constructing the cell $X_{aij}$ in the corresponding second chip 502, when the jointing members are inter-chip-connected by pressure-welding. The amplifier 36 in the third chip 503 is electrically connected to the switch 35 constructing the cell $X_{aij}$ in the corresponding second chip 502, by the inter-chip connection by the jointing member, and the controller 35a in the third chip 503 is electrically connected to the switch 35 constructing the cell $X_{aij}$ in the corresponding second chip 502 through an independent circuit, by the inter-chip connection by the jointing member.

And, the bonding pads BP1 and BP2 are provided on the top surface of the third chip 503 corresponding to the right peripheral-circuit area in which the serial-to-parallel converter 37a is arranged. A wire W2 is bonding-connected to the bonding pad BP2, and a wire W3 is bonding-connected to the bonding pad BP3. Although the physical illustration of concrete wiring structure is omitted, the bonding pad BP2 is connected to the reference clock-generator 31, the delay circuit 33, the controller 35a and the AD converter 37 through surface wirings and inner-buried wirings. Thus, the operations of the respective electronic circuits in the reference clock-generator 31, the delay circuit 33, the controller 35a and the AD converter 37 are controlled by control signals entered to the third chip 503 through the wire W2. The parallel signals read out by the vertical-output signal-lines $R_1$, $R_2$, $R_3$, . . . , $R_{(j-1)}$, $R_j$, $R_{(j+1)}$, . . . in FIG. 2 are converted into serial signals by the serial-to-parallel converter 37a, and delivered to the image processor 39 through the timing adjuster 38 illustrated in FIG. 3 by the wire W3, and imaging process is performed thereon.

In addition, as illustrated in FIG. 21, the second chip 502 may be made by a SOI substrate (526 and 528) and a multi-level insulator structure 525, and flip-chip arrangement may be designed such that the SOI substrates (526 and 528) is located at above position. In the SOI substrates (526 and 528) illustrated in FIG. 21, by laminating the SOI silicon layer 526 on the SOI insulator 528 and digging U-groove in the SOI silicon layer 526, the dielectric isolation regions 517p and 517c are provided so that the side of the SOI insulator 528 is located on the highest portion. The multi-level insulator structure 525, arranged in the lowest portion by the flip-chip arrangement, encompasses a field insulator laminated on the surface of the SOI silicon layer 526 (the bottom surface in the flip-chip arrangement in FIG. 21), a plurality of inter-layer insulators provided under the field insulator, and a passivation film provided under the lowest layer of the inter-layer insulator.

The circuit of the high-voltage power-supply 34a is merged at a side of a surface (bottom surface) of the island-shaped SOI silicon layer 526 surrounded by the SOI insulator 528 and a dielectric isolation region 527p on the left of the second chip 502 illustrated in FIG. 21. Also, the circuit of the high-voltage driver 34 is merged at the surface side of the island-shaped SOI silicon layer 526 surrounded by the SOI insulator 528 and a dielectric isolation region 527c on the center space in FIG. 21, and the circuit of the switch 35 is merged at the surface side of the island-shaped SOI silicon layer 526 surrounded by the SOI insulator 528 and the dielectric isolation region 527c on the right space in FIG. 21. And, the surface of the circuits of the high-voltage power-supply 34a, the high-voltage driver 34 and the switch 35 is coated by the multi-level insulator structure 525, and the flip-chip arrangement is established.

The multi-level insulator structure 528 constructing the second chip 502 encompasses the field insulator stacked on the surface (bottom surface) of the SOI silicon layer 526, the plurality of inter-layer insulators provided under the field insulator, and the passivation film provided under the lowest layer of the inter-layer insulator. Although illustration is omitted, by using the lower portion of the field insulator constructing the multi-level insulator structure 528 and the portion between the field insulators, the electric wirings required to construct the respective circuits of the high-voltage power-supply 34a, the high-voltage driver 34 and the switch 35 are deployed in 3D space as multi-level interconnection structure, and circuit elements such as transistors, etc., are coupled to each other.

In the configuration of the second chip 502 exemplified in FIG. 21, double TSVs of a power-supply plug V25 and an acoustic-element plug V24 are provided as TSVs penetrating the SOI insulator 528 and the SOI silicon layer 526. In the configuration of the second chip 502 exemplified in FIG. 20, triple TSVs of the exciting-circuit plug V21, the receiving-circuit plug V22 and the switching plug V23 which penetrate the SOI insulator 515 and the SOI silicon layer 516 are provided in pitch finer than the configuration illustrated in FIG. 21. That is, by arranging the SOI substrates constructing the second chip 502 as flip-chip, the number of TSVs penetrating the SOI insulator 528 and the SOI silicon layer 526 can be decreased, and therefore, the flip-chip arrangement can widen the pitch of TSV arrangement.

A power-supply plug V25 penetrates the SOI insulator 528 and the SOI silicon layer 526, and the bottom end of the power-supply plug V25 exposed to the bottom surface of the SOI silicon layer 526 is connected to the high-voltage power-supply 34a through an upper wiring embedded in the multi-level insulator structure 525. Similarly, the acoustic-element plug V24 penetrates the SOI insulator 528 and the SOI silicon layer 526, and the bottom end of the acoustic-element plug V24 exposed to the bottom surface of the SOI silicon layer 526 is connected to the switch 35 through an upper wiring embedded in the multi-level insulator structure 525. In addition, FIG. 21 is merely an exemplification to explain a concept, and practically, positions on the planar pattern at which the power-supply plug V25 and the acoustic-element plug V24 penetrate the SOI insulator 528 and the SOI silicon layer 526 may be allocated in the peripheral area of the cell, as explained in FIG. 1. For example, at positions outside the island-shaped SOI silicon layer 526 surrounded by the dielectric isolation region 527c, various layouts such as a layout in which the power-supply plug V25 and the acoustic-element plug V24 penetrate the SOI insulator 528 and the SOI silicon layer 526 can be employed.

On the other hand, as connection-plugs arriving at any wiring layer (metallic layer) constructing the multi-level interconnection of the multi-level insulator structure 528, the exciting-circuit plug V21, the receiving-circuit plug V22 and the switching plug V23 are provided in the positions beneath the multi-level insulator structure 528. At a top end of the exciting-circuit plug V21, a connection-plug (which is indicated by an arrow mark and whose illustration is omitted) penetrating the upper portion of the multi-level insulator structure 528 is provided and connected to the high-voltage driver 34. At a top end of the receiving-circuit plug V22, a connection-plug (which is indicated by an arrow mark and whose illustration is omitted) penetrating the upper portion of the multi-level insulator structure 528 is provided and connected to the switch 35.

Although the physical illustrations of practical wirings are omitted in FIG. 21, to extend over the dielectric isolation region 527p and the dielectric isolation region 527c between the high-voltage power-supply 34a and the high-voltage driver 34, by using the multi-level interconnection structure under the field insulator or between the inter-layer insulators or using the global wiring by via-plugs (buried plug), etc., the high-voltage power-supply 34a and the high-voltage driver 34 in each cell are electrically connected. Similarly, to extend over the dielectric isolation region 527c between the high-voltage driver 34 and the switch 35, by using the multi-level interconnection structure under the field insulator or between the inter-layer insulators or using the intra-cell wiring by the via-plugs etc., the high-voltage driver 34 and the switch 35 are electrically connected. Moreover, to extend over the dielectric isolation region 527c surrounding the switch 35, by using the multi-level interconnection structure under the field insulator or between the inter-layer insulators or using the intra-cell wiring by the via-plugs etc., the switch 35 and the top end of the switching plug V23 are electrically connected.

FIG. 5 is a view focusing to the cell $X_{aij}$ among the cells $X_{ai(j-1)}$, $X_{aij}$, $X_{ai(j+1)}$, . . . constructing the element-array area 301a illustrated in FIG. 1 and FIG. 2. That is, FIG. 5 illustrates an example in which the functional blocks corresponding to the acoustic-element 23$_{ij}$ in the cell $X_{aij}$ are integrated as the intra-cell circuits in the second chip 502 and the third chip 503 to exhibit a stacked structure. According to the AEIC pertaining to the first embodiment, for the respective acoustic-elements 23$_{i(j-1)}$, 23$_{ij}$, 23$_{i(j+1)}$, . . . in the cells $X_{ai(j-1)}$, $X_{aij}$, $X_{ai(j+1)}$, . . . inside the 2D matrix, the exciting circuits $T_{i(j-1)}$, $T_{ij}$, $T_{i(j+1)}$, . . . and the reception circuits $R_{i(j-1)}$, $R_{ij}$, $R_{i(j+1)}$, . . . are individually merged in the second chip 502 and the third chip 503 as the respective intra-cell circuits, and it is accordingly possible to control the transmission-and-reception operations as the 2D phased-array for each of the acoustic-elements 23$_{i(j-1)}$, 23$_{ij}$, 23$_{ai(j+1)}$, . . . . As just described, in the AEIC pertaining to the first embodiment, 2D phased-array architecture is possible, which enables the diagnosis with high precision and high resolution. In addition, in the case of 2D phased-array architecture, the upper electrode E2 can be used commonly in all acoustic-elements. However, instead of the 2D phased array operation, at least one of the lower electrode E1 and the upper electrode E2 can be changed to be driven at a unit of row or column unit.

<Diagnosis Device>

Because an earlier ultrasonic probe has problems in which the earlier ultrasonic probe cannot realize a 2D phased-array wavefront in strict meaning, and the earlier ultrasonic probe carries out an operation made approximate to the 2D phased-array. Also, most of the earlier ultrasonic probes use piezo-electric acoustic-elements. The piezoelectric acoustic-element has problems that, since the difference in the acoustic impedance from human body is large, a structure of thick substrate using a packing architecture is required, thereby disabling the creation of an image that is high in resolution and quality. In the structure of thick substrate, it is difficult to arrange circuitry just under the acoustic-element and individually connect a large number of 2D arrayed acoustic-elements. The AEIC pertaining to the first embodiment exemplified in FIG. 1 to FIG. 5 provides the structures in which, since the capacitive acoustic-elements having the vibration cavities are 2D arrayed on the coplanar surface, the acoustic impedance is close to that of the human body, and all acoustic-elements can perform transmissions to and receptions from each other. Thus, the AEIC pertaining to the first embodiment is preferable for the diagnosis device for medical purpose, because a 2D image of high resolution can be acquired.

Figure 6A:
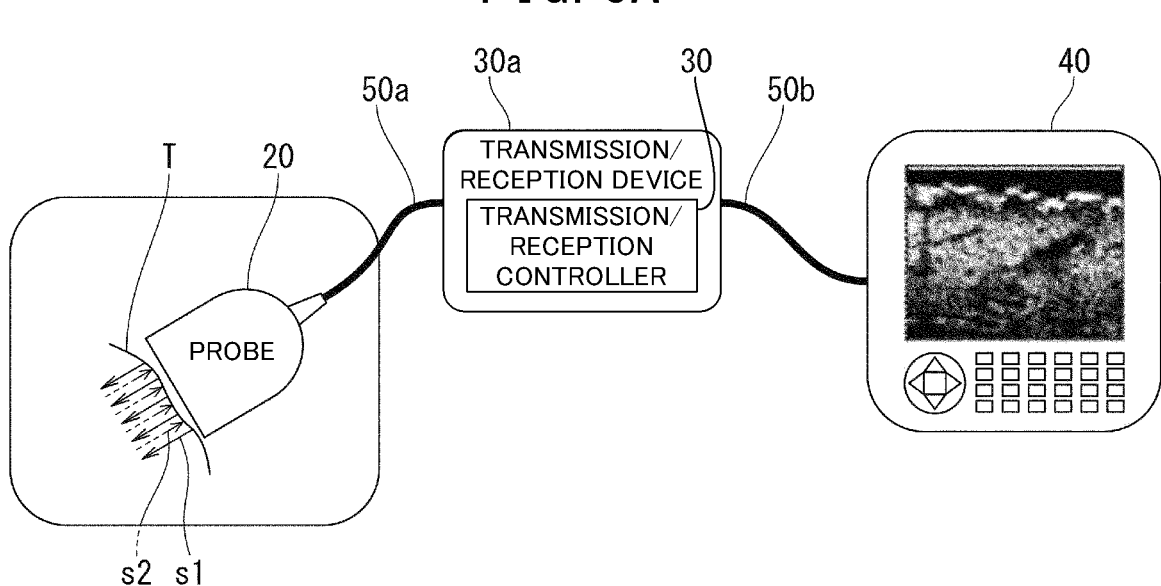
FIG. 6A is a view illustrating an example of a diagnosis device pertaining to the first embodiment.

As illustrated in FIG. 6A, a diagnosis device pertaining to the first embodiment includes a probe having capacitive acoustic-elements for generating ultrasonic signals B1, transmitting the ultrasonic signals B1 to a target T and receiving reflection signals (ultrasonic echoes) s2 from the target T. In the probe, the AEIC pertaining to the first embodiment, which encompasses the array of the capacitive acoustic-elements as mentioned above, is accommodated in a probe enclosure 20. The diagnosis device pertaining to the first embodiment further includes a transmission/reception device 30a having a transmission/reception controller 30 for controlling the transmitting/receiving operation for ultra-sonic waves by the probe and processing signals received by the probe, and a display 40 for displaying an image ascribable to the signals processed by the transmission/reception controller 30. The transmission/reception controller 30 includes the reference clock-generator 31, the waveform generator 32, the timing adjuster 38 and the image processor 39, which are illustrated in FIG. 3. However, as exemplified in FIG. 5, when the reference clock-generator 31 and the waveform generator 32 are merged in the third chip 503, the transmission/reception controller 30 in FIG. 6A is configured to include the timing adjuster 38 and the image processor 39.

The probe and the transmission/reception controller 30 are connected by a transmitting means 50a such as a cable, and the transmission/reception controller 30 and the display 40 are connected by a transmitting means 50b. The transmission/reception device 30a may be a dedicated device or a general part of personal computer system. The transmission/reception device 30a includes a Doppler circuit, a digital scan converter (DSC), a memory device, etc., other than the transmission/reception controller 30. However, their explanations are omitted here. Also, in the diagnosis device pertaining to the first embodiment, the probe and the transmission/reception controller 30 are wired by the transmitting means 50a, and the transmission/reception controller 30 and the display 40 are wired by the transmitting means 50b. However, the transmitting means 50a and 50b can be replaced with wireless connections, by omitting the transmitting means 50a and 50b.

In addition, although FIG. 6A illustrates the probe 20, the transmission/reception controller 30 and the display 40, which are separately disposed each other, the probe 20, the transmission/reception controller 30 and the display 40 may assembled in a single body to achieve an ultrasonic diagnosis device of handy type. Even in a case of the ultrasonic diagnosis device of handy type, the structure of handy type may encompass components, which have respectively the functions corresponding to the probe 20, the transmission/reception controller 30 and the display 40, and the components may be assembled in a single body as an enclosure. Or alternatively, a part of the probe 20, the transmission/reception controller 30 and the display 40, or the corresponding components may be assembled in a single body. Also, existing smartphone and tablet can be used for displaying, after using processors in the smartphone and the tablet as circuits for carrying out a part of the signals processing.

Figure 6B:
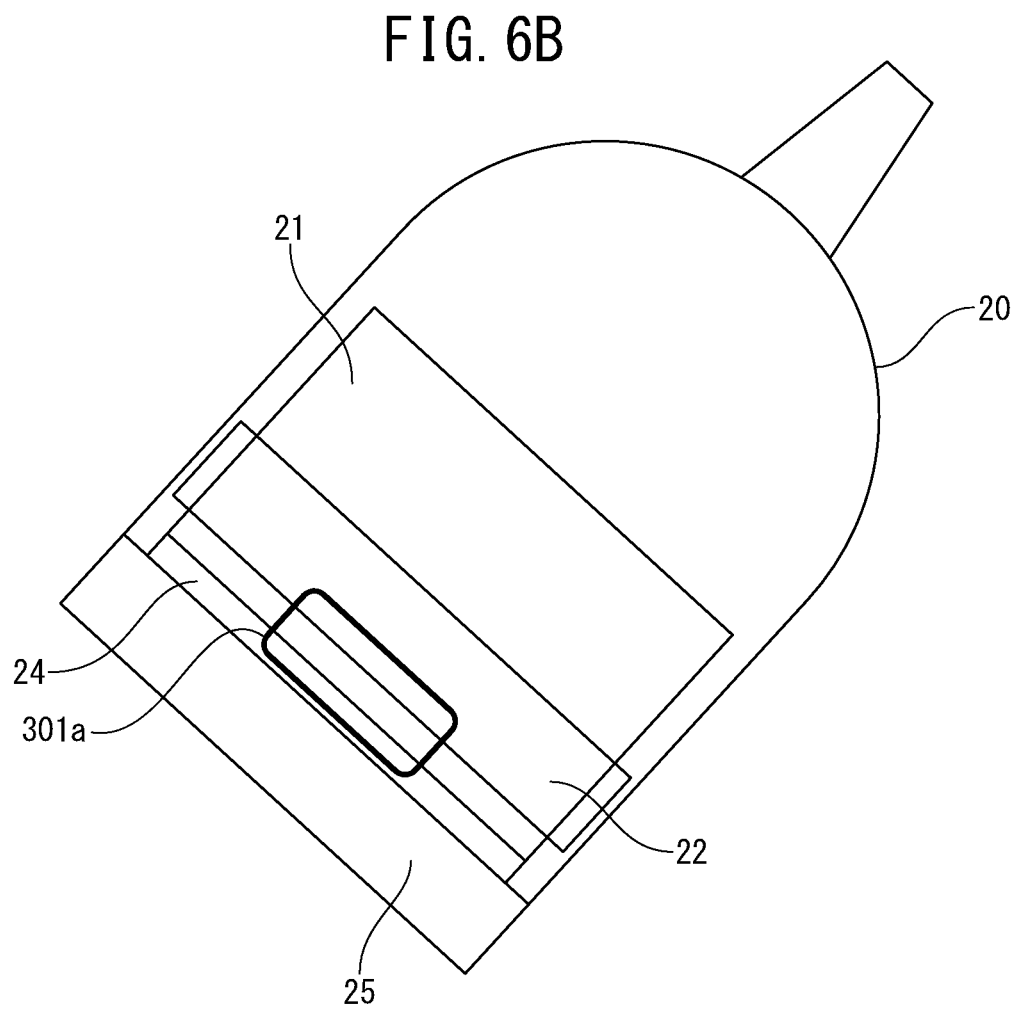
FIG. 6B is a view illustrating a structural example of a probe enclosure of the diagnosis device illustrated in FIG. 6A.

As illustrated in FIG. 6B, the probe pertaining to the first embodiment has the element array 301a in which capacitive acoustic-elements having vibration cavities manufactured by MEMS technology are arrayed in a shape of matrix, as elements for transmitting/receiving ultrasonic waves. The probe is a main assembled component of the diagnosis device pertaining to the first embodiment, and the performances of a frequency band, characteristics, etc., of the probe have large influence on the performance and image quality of the diagnosis device pertaining to the first embodiment. As illustrated in FIG. 6B, in the probe, from a rear side (inner side) of the probe to a head side (a side in which a target T to be diagnosed exists), a membrane substrate 21, a packing layer 22, the element array 301a, an acoustic matching layer 24 and an acoustic lens 25 are arrayed in this order.

The packing layer 22 is called a damper and has an action for suppressing the ultrasonic wave from being propagating to the rear side of the element array 301a and further an action for decreasing pulse widths of the ultrasonic waves transmitted to the head side of the element array 301a. In addition, since the probe pertaining to the first embodiment uses the capacitive acoustic-elements, the propagation to the rear side of the element array 301a is little, which may omit the packing layer 22. In the probe pertaining to the first embodiment, the packing layer 22 is used because a function is expected as an assembling formwork to keep a curved structure such as convex shape. The acoustic matching layer 24 is called λ/4 layer or matching layer and arranged in multiple layers in order to reduce an acoustic impedance difference between the element array 301a and the target T, and efficiently transmitting and receiving the ultrasonic waves. The acoustic lens 25 is provided to converge and narrow the ultrasonic beam to obtain a high-definition image that is, by using the refraction of the acoustic lens 25 and converging the ultrasonic beam, the resolution in a lens thickness direction can be improved. Also, because the acoustic lens 25 is used to be contacted with the target T at a time of diagnosing, and the acoustic lens 25 also has a purpose of decreasing the friction with the target T, the acoustic lens 25 is typically a convex lens and made of material, in which a sound speed is slower . . . about 1 km/second . . . than the sound speed in the target (for example, a living body) T, for example, silicon rubber.

The element array 301a is a portion for transmitting and receiving the ultrasonic waves, and as exemplified in FIG. 1 and FIG. 2, the plurality of acoustic-elements $23_{i(j-1)}$, $23_{ij}$, $23_{i(j+1)}$, . . . are arranged at a fine pitch on the predetermined substrate in a shape of matrix. When voltages are applied, the respective acoustic-elements $23_{i(j-1)}$, $23_{ij}$, $23_{i(j+1)}$, . . . are vibrated, thereby generating the ultrasonic waves. Inversely, when the acoustic-elements are vibrated, voltages are generated, namely, the acoustic-elements serve as so-called transducer. Each acoustic-element is the capacitive element in which the lower and upper electrodes are facing to each other, sandwiching the vibration-cavity in between, and the upper electrode on the vibration-cavity is vibrated. Although the capacitive acoustic-elements can be assembled as the element array 301a, because the capacitive acoustic-elements has the vibration-cavity, to improve the reliability (yield), reviews and considerations of the layout arrangements, for example, arrangements of the plugs and the jointing members, etc. become important. Also, in the case of the capacitive acoustic-elements, optimizations of the thickness of the vibration membranes and the size of the vibration-cavities are necessary, based upon used frequencies and application fields (medical purpose or underwater application, etc.). Because high voltages are typically required to drive the vibration-cavities, as illustrated in FIG. 4 and FIG. 5, whole structure is classified, and the classified portions are assigned to the first chip 501, the second chip 502 and the third chip 503, in view of their operation-voltage levels.

Figure 7:
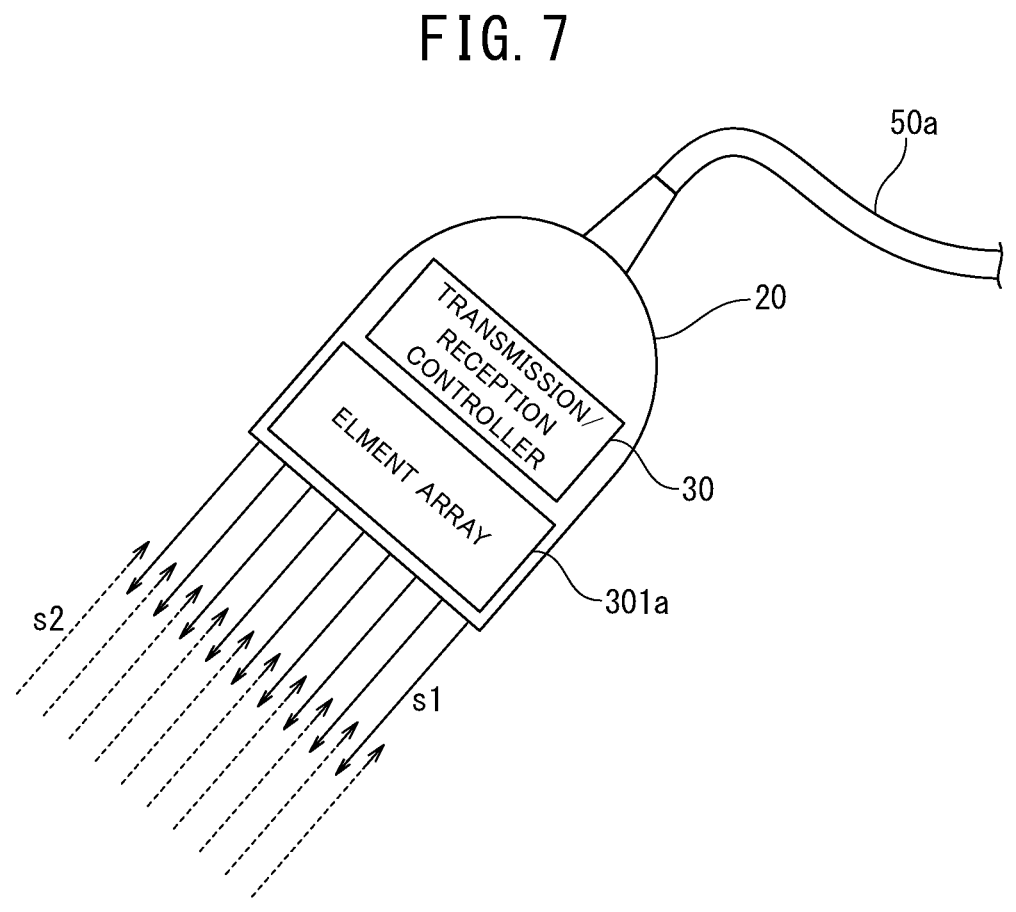

In FIG. 6A, the transmission/reception controller 30 is provided in the transmission/reception device 30a. However, as illustrated in FIG. 7, the transmission/reception controller 30 can be accommodated in the probe enclosure 20. In the case illustrated in FIG. 7, the element array 301a, and a fourth chip merging the transmission/reception controller 30 are stacked on each other, and the element array 301a, and the fourth chip are connected by the various connection-member such as the jointing member of bumps and connection-plugs. As illustrated in FIG. 5, when the reference clock-generator 31 and the waveform generator 32 are merged in the third chip, the transmission/reception controller 30 in the fourth chip in FIG. 7 encompasses the timing adjuster 38 and the image processor 39. In recent years, the needs in medical field for ultrasonic diagnosis have been increased from the standpoint of early-stage detection of diseases.

According to the diagnosis device pertaining to the first embodiment illustrated in FIG. 6A, FIG. 6B and FIG. 7, the capacitive acoustic-elements having the miniatured structure are arranged as high density array, and the ultrasonic waves from the respective acoustic-elements are transmitted to the inside of the human body, and the reflection waves are received, and thereafter, the ultrasonic signals can be converted into electric signals. In particular, because the diagnosis device pertaining to the first embodiment uses the capacitive acoustic-elements having the vibration cavities, the acoustic impedances are not required to be matched with each other, since the vibrators of the acoustic-elements and the human body are approximately equal in acoustic impedance. Hence, according to the diagnosis device pertaining to the first embodiment, the ultrasonic waves can be efficiently transmitted and received, which makes the deterioration in the ultrasonic signals small. Therefore, according to the diagnosis device pertaining to the first embodiment, an effectiveness, such that the clear image having high quality can be obtained, can be achieved At present, for example, in countries such as China, there is a trend to allow anyone to use the ultrasound diagnostic apparatus as a home medical tool. However, in the earlier ultrasonic diagnosis device, unless the ultrasonic waves are used by a professional, who is familiar with anatomical structure, at appropriate positions and angles, because internal-structures are made to overlap, a diagnostic cross-section cannot be clearly imaged. On the contrary, according to the diagnosis device pertaining to the first embodiment, the clear image having high quality can be obtained. For example, when a cross-section of blood vessel of a carotid artery is imaged, even if an amateur applies the ultrasonic waves at a cursory angle to a roughly-estimated position, a part of a blood vessel as a clear image having high quality can be imaged. If a part of the blood vessel can be imaged by using the ultrasonic waves, the central flow velocity vector of the blood vessel can be determined from the Doppler image of the blood vessel, and the orthogonal section of the blood vessel wall can be calculated, which enables the appropriate orthogonal section image to be displayed, using the 3D data. Thus, according to the diagnosis device pertaining to the first embodiment, since even non-expert can obtain the clear image having high quality by using the ultrasonic waves, the diagnosis device of the first embodiment is preferable for the trend of the ultrasonic diagnosis device, which is desired as a household medical device.

Second Embodiment

Figure 8:
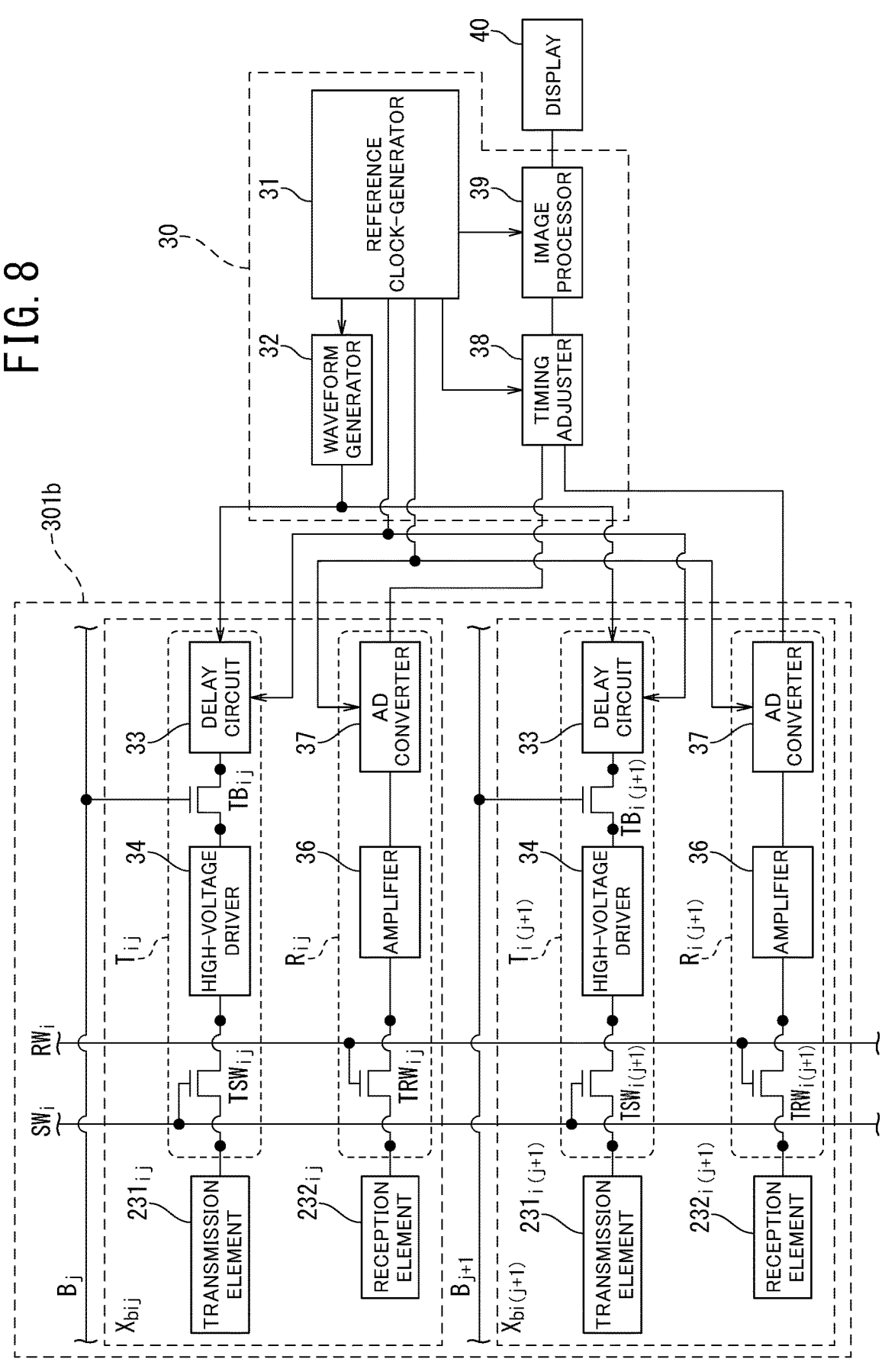
FIG. 8 is a block diagram illustrating a cell constructing an AEIC pertaining to a second embodiment of the present invention, and an example of an intra-cell circuit merged in the cell.

An AEIC pertaining to a second embodiment of the present invention is a semiconductor integrated circuit in which a plurality of cells, each having electronic circuits as illustrated in FIG. 8 as intra-cell circuits, are arrayed in a shape of 2D matrix. FIG. 8 corresponds to a block diagram focusing to cell $X_{bij}$ and cell $X_{bi(j+1)}$ arrayed on an i-th row of an element array 301b that has the planar layout structure like the element array 301a illustrated in FIG. 1 and FIG. 2. FIG. 8 illustrates a transmission/reception controller 30 for drive-controlling the cells $X_{bij}$ and $X_{bi(j+1)}$ and a display 40 connected to the transmission/reception controller 30, in addition to the circuit structure like the functional blocks of the cells $X_{bij}$ and $X_{bi(j+1)}$. The cell $X_{bij}$ on the upper space in FIG. 8 is the cell allocated on an i-th row and a j-th column of the matrix constructing the element array 301b. The cell $X_{bij}$ merges a capacitive transmission element $231_{ij}$ having a transmitting function, and a capacitive reception element $232_{ij}$ that is arranged adjacently to the transmission element $231_{ij}$ having a reception function. The capacitive transmission element $231_{ij}$ and the capacitive reception element $232_{ij}$ are allocated as a unit number n=1 and merged as a pair in the cell $X_{bij}$.

Figure 10:
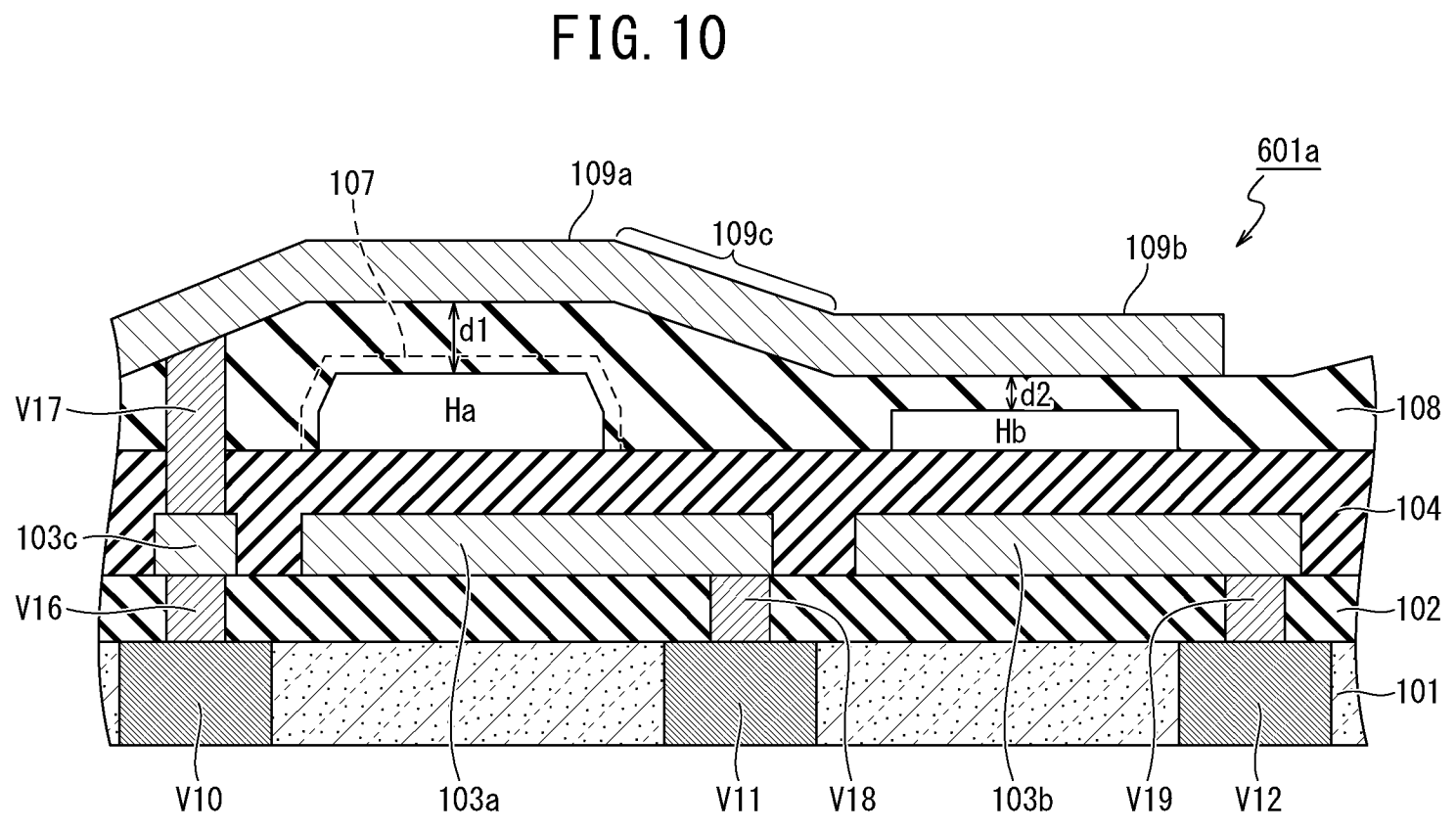
Figure 11:
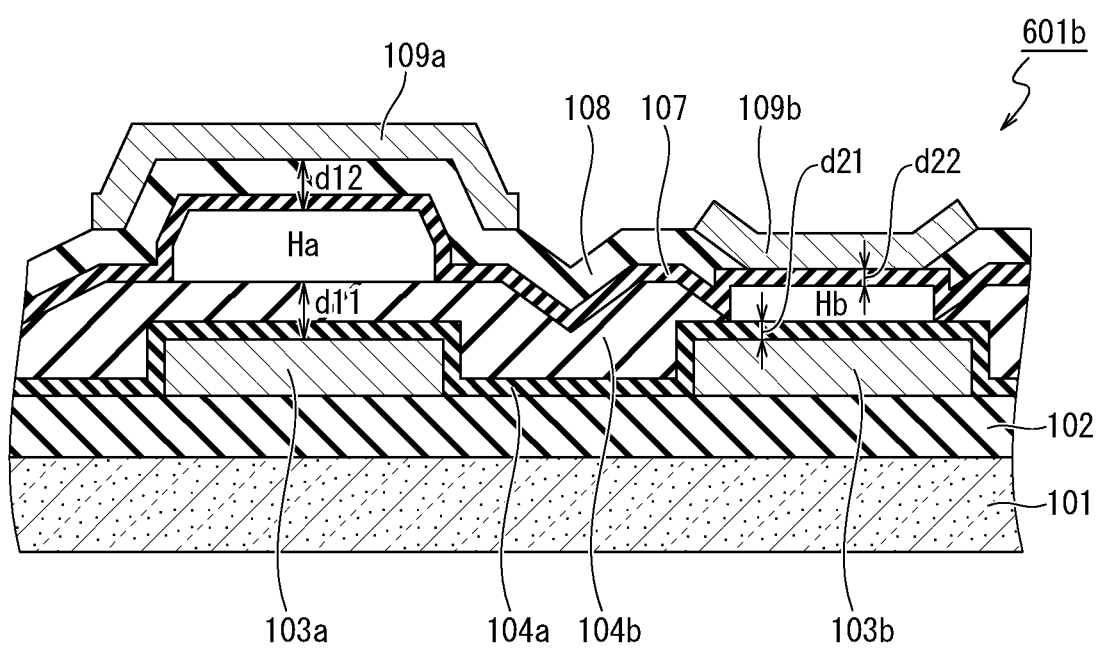
FIG. 11 is a cross-sectional view explaining another structure of the first chip of the AEIC pertaining to the second embodiment.

A module embracing the pair of the transmission element $231_{ij}$ and the reception element $232_{ij}$ is called "an acoustic-element $(231_{ij}, 232_{ij})$" in the AEIC pertaining to the second embodiment. The acoustic-element in the AEIC pertaining to the first embodiment has a single vibration-cavity in each cell and serves as the function for transmitting and receiving. On the contrary, the acoustic-element $(231_{ij}, 232_{ij})$ in the AEIC pertaining to the second embodiment includes double vibration cavities of a transmitting vibration-cavity (hereafter, referred to as "transmission cavity") Ha and a receiving vibration-cavity (hereafter, referred to as "reception cavity") Hb, in each cell, as illustrated in FIG. 10 and FIG. 11, which will be explained later. Thus, the acoustic-element $(231_{ij}, 232_{ij})$ can be regarded as an integrated element having transmitting and reception functions. The transmission element $231_{ij}$ in the cell $X_{bij}$, which generates ultrasonic signals and transmits the ultrasonic signals to a target. The reception element $232_{ij}$ in the cell $X_{bij}$ has a function for receiving reflection signals from the target and converting into electric signals.

In addition, although FIG. 8 illustrates a case in which only one acoustic-element $(231_{ij}, 232_{ij})$ exists in the cell $X_{bij}$, the case illustrated in FIG. 8 is merely an exemplification. The AEIC of the second embodiment is not limited to the case in which only one acoustic-element $(231_{ij}, 232_{ij})$ exists in each cell, and double or more modules may exist in the cell $X_{bij}$, regarding the number of acoustic-elements. That is, in the AEIC pertaining to the second embodiment, about the array of the cells constructing the 2D matrix deployed on the coplanar surface, a unit number n (the n is a positive integer of one or more) of acoustic-elements is allocated to each cell, and a set of unit number n of acoustic-elements can be driven by the intra-cell circuits. However, in the AEIC pertaining to the second embodiment, for the purpose of simplification, a case of a single acoustic-element $(231_{ij}, 232_{ij})$ is exemplified for conveniences. More typically, attention should be paid to a feature that single cell is built by a single set of n acoustic-elements, and corresponding to the single cell, the n acoustic-elements can be driven by a single set of circuits assigned as the intra-cell circuit.

An exciting circuit $T_{ij}$ for generating excitation signals for exciting the vibration membrane of the transmission element $231_{ij}$ is connected to the transmission element $231_{ij}$ in the cell $X_{bij}$. A reception circuit $R_{ij}$ for processing reception signals transmitted from the reception element $232_{ij}$ is connected to the reception element $232_{ij}$ in the cell $X_{bij}$. And, the exciting circuit $T_{ij}$ in the cell $X_{bij}$ includes an excitation row-selection element $TSW_{ij}$ connected to the transmission element $231_{ij}$, a high-voltage driver (vibration-membrane driver) 34 connected to the excitation row-selection element $TSW_{ij}$, a column-selection element $TB_{ij}$ connected to the high-voltage driver 34, and a delay circuit 33 connected to the column-selection element $TB_{ij}$. For exciting the vibration membrane of the transmission element $231_{ij}$, a high-voltage driver 34 is a circuit of large-signal levels of 20 volts or more, concretely 50 volts or more, or 100 volts or more, further about 200 volts. An excitation row-selection line $SW_i$ on the i-th row is connected to a gate terminal of the excitation row-selection element $TSW_{ij}$ in the cell $X_{bij}$, and electric connections between the transmission element $231_{ij}$ and the high-voltage driver 34 is controlled by the excitation row-selection line $SW_i$.

A bit line $B_j$ on the j-th column is connected to a gate terminal to a column-selection element $TB_{ij}$ in the cell $X_{bij}$, and an electric connection between the high-voltage driver 34 and the delay circuit 33 is controlled by the bit line $B_j$. For example, the transmission element $231_{ij}$ can be operated only when the signals of the excitation row-selection line $SW_i$ connected to a gate line of the excitation row-selection element $TSW_{ij}$ in the cell $X_{bij}$ are high levels and the signals of the bit line $B_j$ connected to the gate terminal of the column-selection element TB; are high levels. That is, only the transmission element $231_{ij}$ in the cell $X_{bij}$ at any position in the matrix constructing the element array 301b can be selectively operated by the signals of the excitation row-selection line $SW_i$ and the signals of the bit line $B_j$. However, the column-selection element $TB_{ij}$ is not essential when the 2D phased-array architecture is intended. The reason is because, since the exciting circuit $T_{ij}$ has the delay circuit 33, even in a case that all of the transmission elements $231_{ij}$, $231_{i(j+1)}$, . . . connected to the excitation row-selection line $SW_i$ on the i-th row are excited, phase differences are generated between the excitation signals of the respective transmission elements $231_{ij}$, $231_{i(j+1)}$, . . . and accordingly, by performing a sequential driving on each row, the phased-array architecture for each row can be carried out.

The reception circuit $R_{ij}$ in the cell $X_{bij}$ embraces a receiving row-selection element $TRW_{ij}$ connected to the reception element $232_{ij}$, the amplifier 36 connected to the receiving row-selection element $TRW_{ij}$ and the AD converter 37 connected to the amplifier 36. Since a receiving row-selection line $RW_i$ on the i-th row is connected to the gate terminal of the receiving row-selection element $TRW_{ij}$ in the cell $X_{bij}$, electric connections between the reception element $232_{ij}$ and the amplifier 36 is controlled by the receiving row-selection line $RW_i$. For example, outputs of the transmission element $231_{ij}$ can be designed to be amplified by the amplifier 36 only when the signals of the receiving row-selection line $RW_i$ connected to the gate terminal of the receiving row-selection element $TRW_{ij}$ in the cell $X_{bij}$ are high levels. Since a single spatial information is included in the half wavelength of the ultrasonic waves, high-frequency signals that can sample ultrasonic signals are selected as signals of the receiving row-selection line $RW_i$, by clock signals sufficiently faster than frequencies of ultrasonic waves.

That is, the transmission elements $231_{ij}$ in the cell $X_{bij}$ arrayed on any row in the matrix constructing the element array $301b$ can be selectively operated at a unit of row by the signals of the receiving row-selection line $RW_i$. In addition, when the amplifier 36 is implemented by a MOS transistor, etc., any row in the matrix can be selected by applying the signals of the receiving row-selection line $RW_i$ to the gate of the MOS transistor, and therefore, the case that the amplifier 36 is implemented by the MOS transistor does not require the receiving row-selection element $TRW_{ij}$ in the cell $X_{bij}$. Although illustration is omitted, a memory, which store AD-converted digital signals, can be merged on the output side of the AD converter 37, and arranging the receiving row-selection element $TRW_{ij}$ on the output side of the memory so that the information stored in the memories in the cell $X_{bij}$ can be read out by row-selection of the signals through the receiving row-selection line $RW_i$. As the memory, a marching—moving as an organized manner of troop—memory is preferable, because the marching memory stores vector data arrayed in time sequences and transfers the vector data as data stream, and therefore random-access operations are not required.

That is, the excitation row-selection element $TSW_{ij}$, the high-voltage driver 34, the column-selection element $TB_{ij}$, the delay circuit 33, the receiving row-selection element $TRW_{ij}$, the amplifier 36 and the AD converter 37 are compactly merged in the 3D structure as the intra-cell circuits for the pair of the transmission elements $231_{ij}$ and the reception element $232_{ij}$ which are assigned by the unit number n=1 to the cell $X_{bij}$ on the i-th row and the j-th column.

The cell $X_{bi(j+1)}$ on the lower space in FIG. 8 is the cell allocated on the i-th row and the (j+1)-th column of the matrix constructing the element array $301b$. In the same way to the cell $X_{bij}$ on the i-th row and the j-th column, the cell $X_{bi(j+1)}$ includes a pair of a capacitive transmission element $231_{i(j+1)}$ having the transmitting function and a capacitive reception element $232_{i(j+1)}$ which is arranged adjacently to the transmission element $23_{i(j+1)}$ and has the reception function, as the unit number n=1. A module embracing the pair of the transmission element $231_{i(j+1)}$ and the reception element $232_{i(j+1)}$ is called "an acoustic-element ($231_{i(j+1)}$, $232_{i(j+1)}$)" in the AEIC pertaining to the second embodiment.

In addition, in FIG. 8, although only a single acoustic-element ($231_{i(j+1)}$, $232_{i(j+1)}$) exists in the cell $X_{bi(j+1)}$, the above stated feature is merely an exemplification is like the case of the cell $X_{bij}$ represented on an upper space of FIG. 8. And therefore, the AEIC pertaining to the second embodiment is not limited to a case that the acoustic-element ($231_{i(j+1)}$, $232_{i(j+1)}$) exemplified in FIG. 8 is defined as the unit number n=1. As explained for the cell $X_{bij}$, the unit number n of the acoustic-elements allocated in the cell $X_{bi(j+1)}$ may be double or more. In the same way to the transmission element $231_{ij}$ in the cell $X_{bij}$, the transmission element $231_{i(j+1)}$ in the cell $X_{bi(j+1)}$, which generates the ultrasonic signals and transmits the ultrasonic signals to the target. In the same way to the reception element $232_{ij}$ in the cell $X_{bij}$, the reception element $232_{i(j+1)}$ in the cell $X_{bi(j+1)}$ has a function for receiving the reflection signals from the target and converting into the electric signals.

An exciting circuit $T_{i(j+1)}$ for generating excitation signals for exciting the vibration membrane of the transmission elements $231_{i(j+1)}$ is connected as the intra-cell circuit to the transmission elements $231_{i(j+1)}$ in the cell $X_{bi(j+1)}$. A reception circuit $R_{i(j+1)}$ for processing reception signals transmitted from the reception element $232_{i(j+1)}$ is connected as the intra-cell circuit to the reception element $232_{i(j+1)}$ in the cell $X_{bi(j+1)}$. And, the exciting circuit $T_{i(j+1)}$ in the cell $X_{bi(j+1)}$ includes an excitation row-selection element $TSW_{i(j+1)}$ connected to the transmission elements $231_{i(j+1)}$, a high-voltage driver 34 connected to the excitation row-selection element $TSW_{i(j+1)}$, a column-selection element $TB_{i(j+1)}$ connected to the high-voltage driver 34, and a delay circuit 33 connected to the column-selection element $TB_{i(j+1)}$, as the intra-cell circuits. For exciting the vibration membrane of the transmission elements $231_{i(j+1)}$, the high-voltage driver 34 is the circuit of the large-signal levels of 20 volts or more, concretely 50 volts or more, or 100 volts or more, further about 200 volts. An excitation row-selection line $SW_i$ on the i-th row is connected to a gate terminal of the excitation row-selection element $TSW_{i(j+1)}$ in the cell $X_{bi(j+1)}$, and electric connections between the transmission element $231_{i(j+1)}$ and the high-voltage driver 34 is controlled by the excitation row-selection line $SW_i$.

A bit line $B_{(j+1)}$ on the (j+1)-th column is connected to a gate terminal to a column-selection element $TB_{i(j+1)}$ in the cell $X_{bi(j+1)}$, and electric connections between the high-voltage driver 34 in the cell $X_{bi(j+1)}$ and the delay circuit 33 are controlled by the bit line $B_{(j+1)}$. For example, the transmission element $231_{i(j+1)}$ in the cell $X_{bi(j+1)}$ can be operated only when the signals of the excitation row-selection line $SW_i$ connected to a gate line of the excitation row-selection element $TSW_{i(j+1)}$ in the cell $X_{bi(j+1)}$ are high levels and the signals of the bit line $B_{(j+1)}$ connected to the gate terminal of the column-selection element $TB_{i(j+1)}$ are high levels. That is, only the transmission elements $231_{i(j+1)}$ in the cells $X_{bi(j+1)}$ at any position in the matrix constructing the element array $301b$ can be selectively operated by the signals of the excitation row-selection line $SW_i$ and the signals of the bit line $B_{(j+1)}$.

The reception circuit $R_{i(j+1)}$ in the cell $X_{bi(j+1)}$ embraces a receiving row-selection element $TRW_{i(j+1)}$ connected to the reception element $232_{i(j+1)}$, an amplifier 36 connected to the receiving row-selection element $TRW_{i(j+1)}$, and an AD converter 37 connected to the amplifier 36, as the intra-cell circuits. The receiving row-selection line $RW_i$ on the i-th row is connected to the gate terminal of the receiving row-selection element $TRW_{i(j+1)}$ in the cell $X_{bi(j+1)}$, and electric connections between the reception element $232_{i(j+1)}$ and the amplifier 36 is controlled by the receiving row-selection line $RW_i$. For example, the output of the transmission elements $231_{i(j+1)}$ can be amplified by the amplifier 36 only when the signals of the receiving row-selection line $RW_i$ are high levels, the receiving row-selection line $RW_i$ is connected to the gate terminal of the receiving row-selection element $TRW_{i(j+1)}$ in the cell $X_{bi(j+1)}$. That is, the transmission elements $231_{i(j+1)}$ in the cells $X_{bi(j+1)}$ arrayed on any row in the matrix constructing the element array 301b can be selectively operated at a unit of row, by the signals of the receiving row-selection line $RW_i$. In the same way to the case of the cell $X_{bij}$, because any row in the matrix can be selected by applying the signals of the receiving row-selection line $RW_i$ to a gate of the MOS transistor when the amplifier 36 in the cell $X_{bi(j+1)}$ encompasses the MOS transistor, etc., and therefore, the case when the amplifier 36 is implemented by MOS transistor does not require the receiving row-selection element $TRW_{i(j+1)}$ in the cell $X_{bi(j+1)}$. Moreover, as a variation, a memory for storing the AD-converted digital signals may be integrated on the output side of the AD converter 37 in the cell $X_{bi(j+1)}$. If the receiving row-selection elements $TRW_{i(j+1)}$ are arranged on the output side of the memories, the information stored in the memories in the cells $X_{bi(j+1)}$ can be read out by performing the row selections, based upon the signals of the receiving row-selection line $RW_i$. When a marching memory is used as the memory of the cell $X_{bi(j+1)}$, because the marching memory is the memory that does not require a peripheral circuit, without requiring any occupation area, a high-speed self-transferring of vector data can be carried out.

That is, the excitation row-selection element $TSW_{i(j+1)}$, the high-voltage driver 34, the column-selection element $TB_{i(j+1)}$, the delay circuit 33, the receiving row-selection element $TRW_{i(j+1)}$, the amplifier 36 and the AD converter 37 are compactly merged in the 3D structure as the intra-cell circuits for the pair of the transmission element $231_{i(j+1)}$ and the reception element $232_{i(j+1)}$ which are assigned by the unit number to the cell $X_{bi(j+1)}$ on the i-th row and the (j+1)-th column. However, when the 2D phased-array architecture is intended, the column-selection element $TB_{i(j+1)}$ is not essential. The reason is because, since the exciting circuit $T_{i(j+1)}$ has the delay circuit 33, even in a case that all of the transmission elements $231_{ij}$, $231_{i(j+1)}$, . . . connected to the excitation row-selection line $SW_i$ on the i-th row are excited, phase differences are generated between the excitation signals of the respective transmission elements $231_{ij}$, $231_{i(j+1)}$, . . . and accordingly, by performing a sequential driving on each row, the phased-array architecture for each row can be carried out.

A reference clock-generator 31 is connected to the delay circuit 33 and the AD converter 37 in the cell $X_{bij}$ disposed on the upper space in FIG. 8, and the same reference clock-generator 31 is also connected to the delay circuit 33 and the AD converter 37 disposed on the lower space in FIG. 8. Moreover, a common waveform generator 32 is connected to the delay circuit 33 in the cell $X_{bij}$ and the delay circuit 33 in the cell $X_{bi(j+1)}$, and the waveform generator 32 is also connected to the reference clock-generator 31. Moreover, a common timing adjuster 38 is connected to the AD converter 37 in the cell $X_{bij}$ and the AD converter 37 in the cell $X_{bi(j+1)}$, and the timing adjuster 38 is also connected to the reference clock-generator 31. An image processor 39 is connected to the reference clock-generator 31 and the timing adjuster 38, the image processor 39 is connected to a display 40.

As exemplified in FIG. 8, the reference clock-generator 31, the waveform generator 32, the timing adjuster 38 and the image processor 39 are commonly provided in the cell $X_{bij}$ on the upper space and the cell $X_{bi(j+1)}$ on the lower space, and the display 40 is further connected. In the circuit configuration exemplified in FIG. 8, if the waveform generator 32 is made to have a function for performing selections for each row and sequentially generating the excitation signals, the excitation row-selection elements $TSW_{ij}$, $TSW_{i(j+1)}$, . . . become unnecessary. The reason is because the function of the waveform generator 32, which drives the transmission elements $231_{ij}$, $231_{i(j+1)}$, . . . arrayed for the respective cell-rows, sequentially and selectively for each cell, is enough. The reference clock-generator 31, the waveform generator 32, the timing adjuster 38 and the image processor 39 implement the transmission/reception controller 30 illustrated in FIG. 6A and FIG. 7 as mentioned above. In the cells $X_{bij}$ and $X_{bi(j+1)}$, a part of the element array 301b, which has a topology like the element arrays 301A illustrated in FIG. 6B and FIG. 7, is represented. The respective functional blocks, each of which implements the transmission/reception controller 30 and the display 40 connected to the transmission/reception controller 30, are commonly provided in all cells $X_{bij}$ in the element array 301b constructing the 2D matrix.

As illustrated in FIG. 8, the AEIC pertaining to the second embodiment encompasses the element array 301b including the cells $X_{bij}$ and $X_{bi(j+1)}$, and the transmission/reception controller 30 common in all cells $X_{bij}$ and $X_{bi(j+1)}$, etc., included in the element array 301b, and the display 40 is connected to the transmission/reception controller 30. The exciting circuit TA and the reception circuit $R_{ij}$ are provided in the cell $X_{bij}$, and each of the exciting circuit $T_{i(j+1)}$ and the reception circuit $R_{i(j+1)}$ are provided as the intra-cell circuit in the cell $X_{bi(j+1)}$. Thus, the cell $X_{bi(j+1)}$ can be controlled independently of the cell $X_{bij}$. As just described, since each of the cells $X_{bij}$, $X_{bi(j+1)}$, . . . encompasses the intra-cell circuit, the respective cells $X_{bij}$, $X_{bi(j+1)}$, . . . positioned at intersections of the 2D matrix can be randomly accessed, through the receiving row-selection element $TRW_{ij}$, and therefore, the respective cells $X_{bij}$, $X_{bi(j+1)}$, . . . can be individually controlled. If the operations of the respective cells $X_{bij}$, $X_{bi(j+1)}$, . . . arranged in the shape of 2D matrix can be access-controlled individually and randomly, for example, the 2D phased-array, in which wavefronts of the ultrasonic waves to be transmitted can be freely changed in the 2D surface, can be established, at a time when the ultrasonic waves are transmitted.

The reference clock-generator 31 serving as a partial circuit of the transmission/reception controller 30 illustrated on the right space in FIG. 8 generates reference clock signals to determine operation-timings of each of the functional blocks, which are provided independently from each other in the respective cells $X_{bij}$, $X_{bi(j+1)}$, . . . constructing the 2D matrix deployed on the coplanar surface. The waveform generator 32 in the transmission/reception controller 30 generates the excitation signals to generate ultrasonic pulses, in the transmission elements $231_{ij}$ in the cell $X_{bij}$, based upon the reference clock signals delivered from the reference clock-generator 31. The waveform generator 32 further generates the excitation signals to generate the ultrasonic pulse, in the transmission elements $23_{i(j+1)}$ in each cell $X_{bi(j+1)}$, based upon the reference clock signals. The delay circuits 33 provided in each of the cells $X_{bij}$, $X_{bi(j+1)}$, . . . generate phase-delays different for each of the cells $X_{bij}$, $X_{bi(j+1)}$, . . . , with respect to the excitation signals delivered from the waveform generator 32, to perform the phased-array architecture. By generating the phase-delays different for each of the cells $X_{bij}$, $X_{bi(j+1)}$, . . . with respect to the excitation signals and performing the phased-array architecture, various scan schemes to carry out ultrasonic diagnosis, for example, oblique scan, electronic sector scan, etc. can be realized.

Also, according to the AEIC pertaining to the second embodiment illustrated in FIG. 8, the concentric ultrasonic wavefronts can be generated without using any annular array probe, and dynamic focus can be realized, which can obtain more fine and sophisticated images. Since any phased-array waterfront can be generated, 3D internal-structure data can be acquired by scanning a focus position, and therefore, any cross-section of 3D structures such as a magnetic resonance imaging (MRI) can be reconstructed.

The high-voltage driver 34 provided in the cell $X_{bij}$ on the upper space in FIG. 8 converts the excitation signals transferred from the waveform generator 32 in the transmission/reception controller 30 into the high-voltage signals at levels of, for example, about 200 volts. When the transmitting row-selection element $TSW_{ij}$ provided in the cell $X_{bij}$ makes conductive state between the high-voltage driver 34 and the transmission elements 231$_{ij}$, the high-voltage signals are applied between the lower electrode of the transmission element 231$_{ij}$ and the upper electrode at ground potential, and therefore, the transmission element 231$_{ij}$ is driven. On the other hand, when the receiving row-selection element $TRW_{ij}$ makes conductive state between the reception element 232$_{ij}$ and the amplifier 36, the reception signals detected by the reception element 232$_{ij}$ are transferred to the amplifier 36. As just described, by the transmitting row-selection element $TSW_{ij}$ in the transmission elements 231$_{ij}$, the exciting circuit $T_{ij}$ is electrically connected to the transmission elements 231$_{ij}$ when the ultrasonic waves are transmitted. The amplifier 36 provided in the cell $X_{bij}$ amplifies the reception signals detected by the element 232$_{ij}$ in the cell $X_{bij}$. Since the amplifier 36 is integrated and arranged as the intra-cell circuit near the element 232$_{ij}$, the SN ratio of the reception signals can be improved. The AD converter 37 connected to the amplifier 36 converts the reception signals that are analog signals transferred from the amplifier 36 into digital signals.

The high-voltage driver 34 provided in the cell $X_{bi(j+1)}$ on the lower space in FIG. 8 converts the excitation signals transferred from the waveform generator 32 in the transmission/reception controller 30 into the high-voltage signals. When the transmitting row-selection element $TSW_{ij}$ provided in the cell $X_{bi(j+1)}$ makes conductive state between the high-voltage driver 34 and the transmission element 231$_{i(j+1)}$, the high-voltage signals are applied between the lower electrode of the transmission element 231$_{i(j+1)}$ and the upper electrode at ground potential, and the transmission element 231$_{i(j+1)}$ is driven. In the same way to the transmitting row-selection element $TSW_{ij}$ in the cell $X_{bij}$, the transmitting row-selection element $TSW_{ij}$ in the transmission elements 231$_{i(j+1)}$ electrically connects the exciting circuit $T_{i(j+1)}$ to the transmission elements 231$_{i(j+1)}$ when the ultrasonic waves are transmitted, and electrically connects the reception circuit $R_{i(j+1)}$ to the reception element 232$_{i(j+1)}$ when the ultrasonic waves are received. When the receiving row-selection element $TRW_{ij}$ in the transmission elements 231$_{i(j+1)}$ makes conductive state between the reception element 232$_{i(j+1)}$ and the amplifier 36, the reception signals detected by the reception element 232$_{i(j+1)}$ are transferred to the amplifier 36 in the cell $X_{bi(j+1)}$. The amplifier 36 provided in the cell $X_{bi(j+1)}$ amplifies the reception signals detected by the reception element 232$_{i(j+1)}$ in the cell $X_{bi(j+1)}$. Since the amplifier 36 is integrated and arranged as the intra-cell circuit near the reception element 232$_{i(j+1)}$, the SN ratio of the reception signals can be improved. The AD converter 37 connected to the amplifier 36 converts the reception signals that are the analog signals transferred from the amplifier 36 into the digital signals.

The transmission/reception controller 30 serving as the common circuit illustrated in the right space in FIG. 8 embraces the timing adjuster 38. The timing adjusters 38 are connected to the respective cells $X_{bij}$, $X_{bi(j+1)}$, . . . constructing the 2D matrix, respectively, as the common circuits of the respective cells $X_{bij}$, $X_{bi(j+1)}$, . . . constructing the element array 301$b$, and the respective reception signals are entered from the respective cells $X_{bij}$, $X_{bi(j+1)}$, . . . . The timing adjuster 38 adjusts the timing of the digital signals transferred from the AD converter 37 in each of the cells $X_{bij}$, $X_{bi(j+1)}$, . . . , and transfers to the image processor 39 in the transmission/reception controller 30. The image processor 39 connected to the timing adjuster 38, after performing a necessary process on the digital signals transferred from the AD converter 37, transfers the digital signals on which the necessary process is performed to the display 40.

In addition, a DC bias voltage is preliminarily applied between the lower and upper electrodes of the capacitive transmission elements 231$_{ij}$, 231$_{i(j+1)}$, . . . each of which has the vibration-cavity. When the ultrasonic waves are scheduled to be transmitted, electrostatic force between the lower and upper electrodes is varied by the transmission pulse as the excitation signals, and the vibration membranes of the transmission elements 231$_{ij}$, 231$_{i(j+1)}$, . . . are displaced, thereby the ultrasonic waves are transmitted. Also, when the ultrasonic waves are scheduled to be received, the vibration membranes of the reception elements 232$_{ij}$, 232$_{i(j+1)}$, . . . are displaced by the ultrasonic waves, and the displacements result in the changes in the electrostatic capacitances between the lower and upper electrodes of the reception elements 232$_{ij}$, 232$_{i(j+1)}$, . . . . Then, after the changes are extracted as electric signals, the ultrasonic waves are received.

As exemplified on the upper space of the block diagram illustrated in FIG. 8, the cell $X_{bij}$ in the AEIC pertaining to the second embodiment embraces the pair of the transmission elements 231$_{ij}$ and the reception element 232$_{ij}$ arranged adjacently to the transmission elements 231$_{ij}$ as the acoustic-element of the unit number n=1. Also, the cell $X_{bi(j+1)}$ illustrated on the lower space of the block diagram illustrated in FIG. 8 embraces the pair of the transmission elements 231$_{bi(j+1)}$ and the reception element 232$_{bi(j+1)}$ arranged adjacently to the transmission elements 231$_{i(j+1)}$ as the acoustic-element of the unit number n=1. In general, for the transmission of the ultrasonic waves, because the amplitude of the vibration membrane is required to be made large by using higher voltages, the transmission elements 231$_{ij}$, 23$_{i(j+1)}$ are desired to be a structure having sufficient mechanical strength to withstand the large amplitude of the vibration membrane. On the contrary, for the reception of the ultrasonic waves, even for the reflection signals of weak ultrasonic waves to be able to be detected at high sensitivity, as to the reception elements 232$_{ij}$, 232$_{i(j+1)}$, the vibration membranes are desired to be easily vibrated, and the receiving areas are desired to be sufficiently large.

Figure 9:
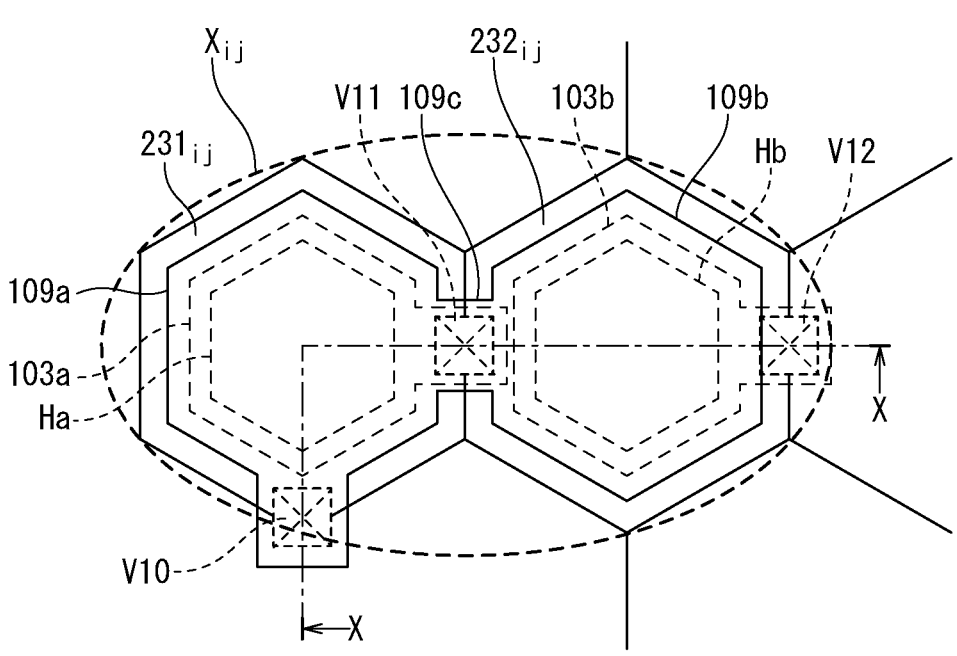
FIG. 9 is a plan view illustrating an example of an element array pertaining to the second embodiment, in a case when integrated number of the transmitting and reception elements differ from each other, while both are equal in hexagonal shape.

So, in the AEIC pertaining to the second embodiment, for example, as illustrated in FIG. 9, as the shapes of the planar patterns of the transmission element 231$_{ij}$ and the reception element 232$_{ij}$ are assumed to be hexagonal, a case in which size of the transmission element 231$_{ij}$ is made equal to the size of the reception element 232$_{ij}$ is exemplified, from the standpoint of area-efficiency design. As a matter of fact, as illustrated in FIG. 9, on a transmission upper-electrode 109$a$, a reception upper-electrode 109$b$ and surface interconnections 109*c* connecting the transmission upper-electrode 109*a* and the reception upper-electrode 109*b*, there is a protection film to protect the transmission upper-electrode 109*a* and the reception upper-electrode 109*b*. However, in the representation illustrated in FIG. 9, to easily view the shapes of the transmission upper-electrode 109*a* and the reception upper-electrode 109*b*, the visible outlines of the transmission upper-electrode 109*a* and the reception upper-electrode 109*b* are represented by solid lines, as a top view with the protection film removed. A reception cavity Hb and a transmission cavity Ha, which are located at a vertical stacked level under the transmission upper-electrode 109*a* and the reception upper-electrode 109*b*, are represented by hidden outlines in FIG. 9. From a viewpoint of improving the receiving sensitivity, the receiving area may be increased by making the number of the reception elements 232$_{ij}$ larger than the number of the transmission elements 231$_{ij}$.

As described later by using the configuration illustrated in FIG. 12, etc., similarly to the AEIC pertaining to the first embodiment, the AEIC pertaining to the second embodiment is characterized in the 3D structure configured from the triple-layer structure embracing a first chip 601, a second chip 602 in which high-voltage circuits of 20 volts or more are merged and a third chip 603 in which small-signal and low-voltage circuits of less than 20 volts are merged. A representation of "a second chip 602 in which high-voltage circuits of 20 volts or more are merged" is merely a rhetorical convenience to differentiate from the small-signal and low-voltage circuits of the third chip 603 is like the representation of the AEIC pertaining to the first embodiment. As the practical technical meaning, the high-voltage circuits of 40 volts or more, for example, the high-voltage circuits of about 100 volts to 200 volts or the voltage level equal to or more than the above can be merged in the second chip 602. However, attention should be paid to a feature that the second chip 602 can include a case in which high-voltage circuits of about 20 volts is integrated, if it is possible to identify from the small-signal and low-voltage circuits of the third chip 603. In addition, the small-signal and low-voltage circuits of the third chip 603 may include electronic circuits at operation voltages of 3.3 volts or less.

As explained in the AEIC of the first embodiment, the earlier capacitive acoustic-elements does not carry out operations for making vibration membranes full-span swing, as the vibrations of the vibration membranes are limited in the spans illustrated in FIG. 24B. In the AEIC pertaining to the second embodiment, because the circuits merged in the second chip 602 and the circuits merged in the third chip 603 are classified based upon voltage levels of each operation voltages, the circuits of the large-signal levels in the second chip 602 can be stably operated without having influence on the circuits of the small-signal levels in the third chip 603. Therefore, according to the AEIC pertaining to the second embodiment, as illustrated in FIG. 22A, the high-voltage driver 34 can stably transfer vibration energies having large amplitudes for full-span swing, at high voltages of, for example, zero volt to 200 volts. As a result, each vibration membrane of the 2D arranged transmission elements 231$_{ij}$, 23$_{i(j+1)}$, . . . can be made to be vibrated closely to the full-span swing as illustrated in FIG. 22B.

A stepped cross-sectional structure of a first chip 601*a* in the AEIC pertaining to the second embodiment exemplified in FIG. 10 is a schematic view illustrating a stepped cross-sectional structure taken from stepped X-X direction, which passes through centers of hexagons, regarding the transmission element 231$_{ij}$ having a shape of hexagon and the reception element 232$_{ij}$ having a shape of hexagon illustrated in FIG. 9. That is, the first chip 601 used in the AEIC pertaining to the second embodiment encompasses the transmission element 231$_{ij}$ and the reception element 232$_{ij}$ which are illustrated in FIG. 9. The transmission element 231$_{ij}$ and the reception element 232$_{ij}$ are disposed on a composite structure embracing a semiconductor substrate 101 and an underlayer-insulating film 102 deposited on the semiconductor substrate 101, as exemplified in FIG. 10.

As illustrated in FIG. 10, triple connection-plugs of a ground plug V10, an excitation plug V11 and a receiving plug V12 are provided in the semiconductor substrate 101. As can be understood from the plan view in FIG. 9, the ground plug V10 is provided at a position of a lower apex in a hexagon implementing a shape of the transmission element 231$_{ij}$. The excitation plug V11 is provided at the center on a right latus of the hexagon implementing the shape of the transmission element 231$_{ij}$, and the receiving plug V12 is provided at the center on the right latus of a hexagon implementing a shape of the reception element 232$_{ij}$. That is, in the planar pattern illustrated in FIG. 9, each of the positions of the ground plug V10, the excitation plug V11 and the receiving plug V12 is arranged at a position that does not overlap with a position occupied by the transmission cavity Ha of the transmission elements 231$_{ij}$ and a position occupied by the transmission cavity Ha of the reception cavity Hb of the reception element 232$_{ij}$. A link-up plug V16 connected to the ground plug V10, a link-up plug V18 connected to the excitation plug V11 and a link-up plug V19 connected to the receiving plug V12 are provided in the underlayer-insulating film 102.

The transmission element 231$_{ij}$ illustrated on the left space in FIG. 10 encompasses a transmission lower-electrode 103*a* provided on the underlayer-insulating film 102, an inter-layer insulator 104 deposited on the transmission lower-electrode 103*a*, a transmission cavity Ha provided on the inter-layer insulator 104, a first vibration membrane 107 and a second vibration membrane 108 provided on the transmission cavity Ha, and a transmission upper-electrode 109*a* provided on the second vibration membrane 108. The planar pattern of the transmission lower-electrode 103*a* is connected to the excitation plug V11 through the link-up plug V18 provided in the underlayer-insulating film 102. On the other hand, the reception element 232$_{ij}$ illustrated on the right space in FIG. 10 is built by a reception lower-electrode 103*b* provided on the underlayer-insulating film 102, an inter-layer insulator 104 deposited on the reception lower-electrode 103*b*, a reception cavity Hb provided on the inter-layer insulator 104, a second vibration membrane 108 provided on the reception cavity Hb, and a reception upper-electrode 109*b* provided on the second vibration membrane 108.

The planar pattern of the reception lower-electrode 103*b* is a pattern connected to the receiving plug V12 through the link-up plug V19 provided in the underlayer-insulating film 102. The interiors of the transmission cavity Ha and the reception cavity Hb are in a state of reduced pressure of about one kPa with helium (He) gas as main component. The transmission upper-electrode 109*a* and the reception upper-electrode 109*b* are connected to each other on a near-ward portion of a paper. Moreover, an inter-layer wiring plug V17 that penetrates the second vibration membrane 108 and the inter-layer insulator 104 is embedded on the left space in FIG. 10. The inter-layer wiring plug V17 is connected to the link-up plug V16 through a link-up pad 103*c*, and the link-up plug V16 is connected to a ground plug V10. The inter-layer wiring plug V17 is connected to the transmission upper-electrode 109*a*, and both the transmission upper-electrode 109$a$ and the reception upper-electrode 109$b$ are grounded through the surface wirings 109$c$ connecting the transmission upper-electrode 109$a$ and the reception upper-electrode 109$b$. In addition, practically, the protection film for protecting the transmission upper-electrode 109$a$, the reception upper-electrode 109$b$ and the surface wirings 109$c$ exists on the transmission upper-electrode 109$a$, the reception upper-electrode 109$b$ and the surface wirings 109$c$. The illustration of the protection film is omitted in FIG. 10 because of the correspondence to the representing method in FIG. 9.

In the structure of the first chip 601$a$ in the AEIC pertaining to the second embodiment illustrated in FIG. 10, a size in a vertical direction (membrane thickness direction) of the transmission cavity Ha in the transmission element is larger than a size in the vertical direction (membrane thickness direction) of the reception cavity Hb in the reception element. Also, a total membrane thickness d1 of the first vibration membrane 107 and the second vibration membrane 108 in the transmission element is larger than a membrane thickness d2 of the second vibration membrane 108 in the reception element. By setting the relation of the sizes illustrated in FIG. 10, stronger ultrasonic waves can be transmitted, while sufficient strength is secured in the transmission element. Also, in the reception element, finer ultrasonic waves can be received and a high sensibility can be achieved. That is, in the structure illustrated in FIG. 10, the acoustic-element having a higher performance can be manufactured, by making the total membrane thickness d1 of the first vibration membrane 107 and the second vibration membrane 108 thicker than the membrane thickness d2 of the second vibration membrane 108 in the reception element and optimizing the height measured along the vertical direction of the vibration-cavity or the height between the electrodes (the maximum height) in transmitting/receiving.

In addition, when the AEIC pertaining to the second embodiment is applied as an ultrasonic diagnosis device, an acoustic matching layer and an acoustic lens shall be provided in a portion along the upper direction of the first chip 601$a$ illustrated in FIG. 10. However, insulating inorganic film or organic film may be provided on the surface of the first chip 601$a$ in the AEIC pertaining to the second embodiment. As the inorganic film, silicon oxide film, silicon nitride film and materials in which additives are contained in the silicon oxide film or the silicon nitride film can be used, and as the organic film, polyimide resin film and epoxy resin film can be used.

FIG. 11 illustrates another example differing from the structure illustrated in FIG. 10, as another structure of a first chip 601$b$ used in the AEIC pertaining to the second embodiment, which implements a triple-layered structure. Even a cross-sectional structure exemplified in FIG. 11 is a schematic view corresponding to a cross-sectional structure when regarding the hexagon implementing a shape of the transmission element 231$_{ij}$ and the hexagonal reception element 232$_{ij}$ illustrated in FIG. 9, the hexagons are cut on a cutting plane passing through the mutual hexagonal centers. That is, in the first chip 601$b$ used in the AEIC pertaining to the second embodiment, as exemplified in FIG. 11, the transmission element 231$_{ij}$ and the reception element 232$_{ij}$ illustrated in FIG. 9 are provided on the composite structure embracing the semiconductor substrate 101 and the underlayer-insulating film 102 deposited on the semiconductor substrate 101. In FIG. 11, the transmission elements 231$_{ij}$ and the reception element 232$_{ij}$ illustrated in FIG. 9 are disposed on the composite structure embracing the semiconductor substrate 101 and the underlayer-insulating film 102 deposited on the semiconductor substrate 101.

In the same way to the ground plug V10, the excitation plug V11 and the receiving plug V12 provided in the semiconductor substrate 101 in FIG. 10, the triple connection-plugs of the ground, excitation and receiving plugs are provided even in the semiconductor substrate 101 in FIG. 11. However, the cross-sectional view in FIG. 11 differs from the stepped cross-sectional view taken from the stepped X-X direction in FIG. 9, and illustrates a case that the triple connection-plugs exist at the positions on a near-side portions of the paper. Thus, FIG. 11 does not illustrate the connection-plugs. Also, similarly to FIG. 10, although the link-up plugs, which are connected to the ground, excitation and receiving plugs, are provided in the under-layer-insulating film 102 in FIG. 11, they are not positioned on the cross-sectional view. The transmission element 231$_{ij}$ illustrated on the left space in FIG. 11 encompasses the transmission lower-electrode 103$a$ provided on the under-layer-insulating film 102, a first inter-layer insulator 104$a$ deposited on the transmission lower-electrode 103$a$, a second inter-layer insulating member 104$b$ deposited on the first inter-layer insulating member 104$a$, a transmission cavity Ha provided on the second inter-layer insulating member 104$b$, and a first vibration membrane 107 and a second vibration membrane 108 provided on the transmission cavity Ha, and a transmission upper-electrode 109$a$ provided on the second vibration membrane 108.

On the other hand, the reception element 232$_{ij}$ illustrated on the right space in FIG. 11 encompasses the reception lower-electrode 103$b$ provided on the underlayer-insulating film 102, the first inter-layer insulator 104$a$ deposited on the reception lower-electrode 103$b$, the reception cavity Hb provided on the first inter-layer insulator 104$a$, the first vibration membrane 107 provided on the reception cavity Hb, and the reception upper-electrode 109$b$ provided on the first vibration membrane 107. The feature that the interiors of the transmission cavity Ha and the reception cavity Hb are in a state of reduced pressure of about one kPa with He gas as main component is like the structure illustrated in FIG. 10. In the same way to FIG. 10, the inter-layer wiring plug, which penetrates the second vibration membrane 108, the first vibration membrane 107, the second inter-layer insulator 104$b$ and the first inter-layer insulator 104$a$ is embedded on a near-ward portion of a paper in FIG. 11. The inter-layer wiring plug is connected to the link-up plug through the link-up pad, and the link-up plug is connected to the ground plug.

In the structure of the first chip 601$b$ in the AEIC pertaining to the second embodiment illustrated in FIG. 11, a size in the vertical direction (membrane thickness direction) of the transmission cavity Ha in the transmission element is larger than a size in the vertical direction (membrane thickness direction) of the reception cavity Hb in the reception element. Also, a total membrane thickness d12 of the first vibration membrane 107 and the second vibration membrane 108 in the transmission element is larger than a membrane thickness d22 of the first vibration membrane 107 in the reception element. By setting the relation of the sizes illustrated in FIG. 11, stronger ultrasonic waves can be transmitted, while securing sufficient strength of the transmission element. Also, in the reception element, finer ultrasonic waves can be received, a high sensibility can be achieved. That is, in the structure of the first chip 601$b$ in the AEIC pertaining to the second embodiment as illustrated in FIG. 11, the acoustic-element having a higher performance can be manufactured by making the total membrane thickness d12 of the first vibration membrane 107 and the second vibration membrane 108 thicker than the membrane thickness d22 of the first vibration membrane 107 in the reception element and optimizing the height in the vertical direction of the vibration-cavity or the height between the electrodes (the maximum height) in transmitting/receiving.

In addition, even when the AEIC pertaining to the second embodiment is applied as the ultrasonic diagnosis device, the acoustic matching layer and the acoustic lens are provided in a portion along the upper direction of the first chip $601b$ illustrated in FIG. 11. However, the insulating inorganic film or organic film may be provided on the surface of the first chip $601b$ in the AEIC pertaining to the second embodiment. As the inorganic film, silicon oxide film, silicon nitride film and member in which additives are contained added to the silicon oxide film or the silicon nitride film can be used, and as the organic film, polyimide resin film and epoxy resin film can be used.

Figure 12:
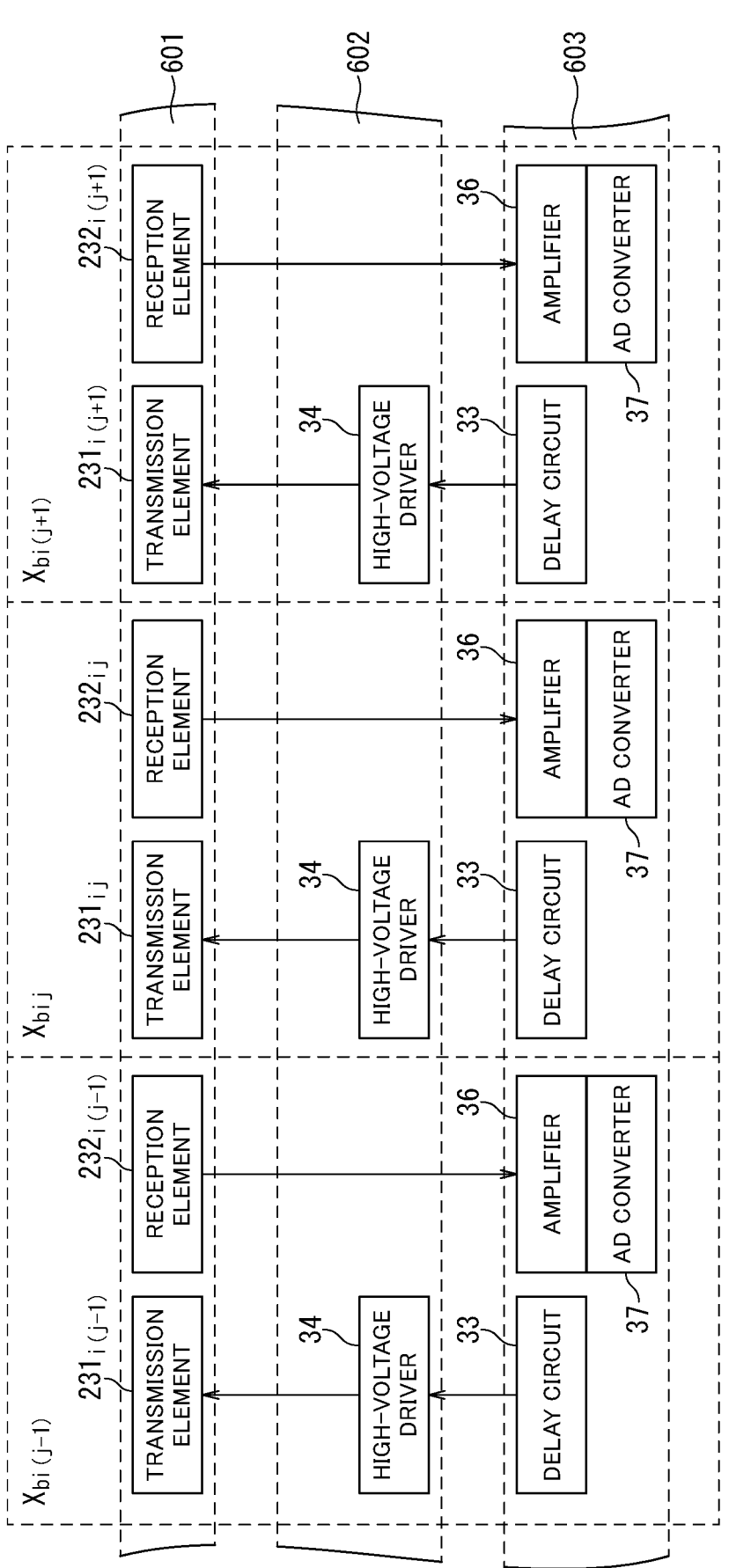
FIG. 12 is a conceptual diagram illustrating an example of an allocation of each of the functional blocks when each of the functional blocks in FIG. 3 is integrated into the 3D structure.

As illustrated in FIG. 12, the AEIC pertaining to the second embodiment is the 3D integrated circuit built by the stacked body embracing the first chip 601, the second chip 602 in which the high-voltage circuits of 20 volts or more are merged, and the third chip 603 in which the circuits of the small-signal levels of less than 20 volts are merged in the same way to the AEIC of the first embodiment, the first chip 601, the second chip 602 and the third chip 603 can be made by semiconductor chips whose main bodies are the semiconductor substrates, for example, such as Si, SiC, etc. The semiconductor chip implementing the first chip 601, the second chip 602 and the third chip 603 may be the composite structure embracing the semiconductor substrates and the insulating layers, such as the SOI structure, etc. In particular, the semiconductor chip implemented by wide-bandgap semiconductor that is excellent in high-breakdown-voltage characteristics is preferable for the second chip 602.

The first chip 601 has a pair of the capacitive transmission elements $231_{i(j-1)}$ and the capacitive reception element $232_{i(j-1)}$, a pair of the capacitive transmission elements $231_{ij}$ and the capacitive reception element $232_{ij}$ and a pair of the capacitive transmission elements $23_{i(j+1)}$ and the capacitive reception element $232_{i(j+1)}$. In the same way to the subject matters already been explained, a module embracing the pair of the transmission elements $231_{i(j-1)}$ and the reception element $232_{i(j-1)}$ is called "acoustic-element ($231_{i(j-1)}$, $232_{i(j-1)}$)" in the AEIC pertaining to the second embodiment. The module embracing the pair of the transmission element $231_{i(j-1)}$ and the reception element $232_{i(j-1)}$, the module embracing the pair of the transmission element $231_{ij}$ and the reception element $232_{ij}$ and the module embracing the pair of the transmission element $231_{i(j+1)}$ and the reception element $232_{i(j+1)}$, which are merged in the first chip 601, implement a part of the cell-columns $X_{bi(j-1)}$, $X_{bij}$, $X_{bi(j+1)}$, . . . arrayed on the i-th row in the matrix, as the acoustic-elements each having double vibration cavities.

In the cell $X_{bi(j+1)}$ illustrated on the left space in FIG. 12, a high-voltage driver (vibration-membrane driver) 34 constructing an exciting circuit $T_{i(j-1)}$ in the cell $X_{bi(j-1)}$ is provided in the second chip 602. The high-voltage driver 34 is the circuit of the large-signal levels of 20 volts or more, concretely 50 volts or more or 100 volts or more, further about 200 volts for exciting the vibration membrane of the transmission elements $231_{i(j-1)}$. For the convenience arranging the higher-voltage operating-devices such as the high-voltage driver 34, etc., the semiconductor substrates made of wide-bandgap semiconductor that is excellent in high breakdown-voltage, such as SiC, diamond, GaN, etc., may be used in the second chip 602. As explained already in the AEIC pertaining to the first embodiment, although the wide-bandgap semiconductor has the feature that the semiconductor integrated circuits of higher breakdown-voltages can be achieved, on the other hand, there is the technical issue on manufacturing process. By classifying the second chip 602 as a chip dedicated to the high-voltage circuits and the third chip 603 as a chip for merging circuits of the small-signal levels, the manufacturing yield can be improved, and the percent of goods having required performance as the entire AEIC can be achieved, and furthermore, the high reliability can be achieved. In addition, even when Si is used for the second chip 602, the use of a high specific-resistivity Si substrate with an impurity concentration of $5 \times 10^{14}$ cm$^{-3}$ or less is preferable for high breakdown-voltage semiconductor elements, while the use of a low specific-resistivity Si substrate with an impurity concentration of $1 \times 10^{15}$ cm$^{-3}$ or more for small-signal levels circuits is suitable for miniaturization. Thus, the voltage classification of the second chip 602 and the third chip 603 improves the degree of freedom in the designs of the second and third chips 602 and 603. The high-voltage driver 34 of cell $X_{bi(j-1)}$ converts the low-voltage drive signals at voltage levels of 3.3 volts or lower from the third chip 603 into high-voltage signals and applies to the lower electrode of the transmission element $231_{i(j-1)}$.

The high-voltage driver 34 in the cell $X_{bi(j-1)}$ may be implemented by, for example, power MOS transistors, IGBT, SI thyristor, etc. On the front stage (input side) of the high-voltage driver 34, a level shifter and a high-side circuit which is connected to the level shifter and operated by signals whose level is shifted to high-potential levels by the level shifter may be provided. Although illustration is omitted in FIG. 12 because they are not essential circuit elements, similarly to the circuit configuration illustrated in FIG. 8, if the excitation row-selection element $TSW_{i(j-1)}$ is connected between the transmission element $231_{i(j-1)}$ and the high-voltage driver 34, electric connections between the transmission element $231_{i(j-1)}$ and the high-voltage driver 34 can be controlled by the excitation row-selection line $SW_{i(j-1)}$, by connecting the excitation row-selection line $SW_i$ on the i-th row to a gate of the excitation row-selection element $TSW_{i(j-1)}$. The third chip 603 in the cell $X_{bi(j-1)}$ has the delay circuit 33 in the exciting circuit $T_{i(j-1)}$ and the amplifier 36 and the AD converter 37 in the reception circuit $R_{i(j-1)}$. For exciting the vibration membrane of the transmission element $231_{i(j-1)}$, since the high-voltage driver 34 in the cell $X_{bi(j-1)}$ is the circuit of the large-signal levels of 50 volts or more, for example, about 200 volts, the high-voltage driver 34 is merged in the second chip 602. On the contrary, the delay circuit 33 in the cell $X_{bi(j-1)}$ is merged in the third chip 603 because the delay circuit 33 is a circuit operated at lower voltages of less than 20 volts, for example, 3.3 volts or less. The delay circuit 33 in the cell $X_{bi(j-1)}$ is a circuit for determining phases of the output signals of the high-voltage driver 34 in the cell $X_{bi(j-1)}$ and its operational timing.

The circuit topology may include a column-selection element $TB_{i(j-1)}$ connected between the high-voltage driver 34 and the delay circuit 33, the illustration of the column-selection element $TB_{i(j-1)}$ is omitted, because the column-selection element $TB_{i(j-1)}$ is not essential circuit element, similarly to the circuit configuration illustrated in FIG. 8. By applying the signals of the bit line $B_{(j-1)}$ on the (j−1)-th column to a gate of the column-selection element $TB_{i(j-1)}$, the electric conductions between the high-voltage driver 34 and the delay circuit 33 can be controlled, which can control the operations of the transmission element $231_{i(j-1)}$ at an intersection in the matrix on the i-th row and the (j−1)-th column. Similarly, if the receiving row-selection element $TRW_{i(j-1)}$ is connected between the reception element $232_{i(j-1)}$ and the amplifier 36, electric connections between the reception element $232_{i(j-1)}$ and the amplifier 36 can be controlled, by connecting the receiving row-selection line $RW_i$ on the i-th row to a gate of the receiving row-selection element $TRW_{i(j-1)}$. The small-signal outputs of the low-side circuit constructing the delay circuit 33 merged in the third chip 603 are transferred to the high-side circuit by the level shifter, which constructs the front stage of the high-voltage driver 34 merged in the second chip 602.

In the cell $X_{bij}$ on the i-th row illustrated in the center space in FIG. 12, a high-voltage driver 34 constructing an exciting circuit $T_{ij}$ in the cell $X_{bij}$ is provided in the second chip 602. The high-voltage driver 34 in the cell $X_{bij}$ converts the low-voltage driving-signals at levels of 3.3 volts or less from the third chip 603 into high-voltage signals and applies to the lower electrode in the transmission element $231_{ij}$. FIG. 12 schematically illustrates the simplified structure under situation that the third chip 603 in the cell $X_{bij}$ has the delay circuit 33 in the exciting circuit $T_{ij}$ and the amplifier 36 and the AD converter 37 in the reception circuit $R_{ij}$. For exciting the vibration membrane in the transmission element $231_{ij}$, since the high-voltage driver 34 in the cell $X_{bij}$ is the circuit of the large-signal levels of 50 volts or more, for example, about 200 volts, the high-voltage driver 34 is merged in the second chip 602. On the contrary, since the delay circuit 33 in the cell $X_{bij}$ is a circuit operated at lower voltages of less than 20 volts, for example, 3.3 volts or less, the delay circuit 33 is merged in the third chip 603. The delay circuit 33 in the cell $X_{bik}$ is the circuit for determining phases of the output signals of the high-voltage driver 34 in the cell $X_{bij}$ and its operational timing. Although illustration is omitted because they are not essential circuit elements, similarly to the circuit configuration illustrated in FIG. 8, if the excitation row-selection element $TSW_{ij}$ is connected between the transmission element $231_{ij}$ and the high-voltage driver 34, electric connections between the transmission elements $231_{ij}$ and the high-voltage driver 34 can be controlled by the excitation row-selection line $SW_i$, by connecting the excitation row-selection line $SW_i$ on the i-th row to a gate of the excitation row-selection element $TSW_{ij}$.

The column-selection element $TB_{ij}$ can be connected between the high-voltage driver 34 in the cell $X_{bij}$ and the delay circuit 33, the illustration of the column-selection element $TB_{ij}$ is omitted in FIG. 12 because the column-selection element TB; is not essential circuit elements. By applying the signals of the bit line $B_j$ on the j-th column to a gate of the column-selection element $TB_{ij}$ in the cell $X_{bij}$, the electric conductions between the high-voltage driver 34 in the cell $X_{bij}$ and the delay circuit 33 can be controlled, which can control the operations of the transmission element $231_{ij}$ at an intersection in the matrix on the i-th row and the j-th column. Similarly, if the receiving row-selection element $TRW_{ij}$ is connected between the reception element $232_{ij}$ and the amplifier 36, electric connections between the reception element $232_{ij}$ and the amplifier 36 in the cell $X_{bij}$ can be controlled by the receiving row-selection line $RW_i$, by connecting the receiving row-selection line $RW_i$ on the i-th row to a gate of the receiving row-selection element $TRW_{ij}$. The small-signal outputs of the low-side circuit constructing the delay circuit 33 in the cell $X_{bij}$ merged in the third chip 603 are transferred to the high-side circuit by the level shifter, which constructs the front stage of the high-voltage driver 34 merged in the second chip 602.

A high-voltage driver 34 constructing an exciting circuit $T_{i(j+1)}$ in the cell $X_{bi(j+1)}$ is provided in the second chip 602 in the cell $X_{bi(j+1)}$ on the i-th row illustrated on the right space in FIG. 12. The high-voltage driver 34 in the cell $X_{bi(j+1)}$ converts the low-voltage driving-signals at levels of 3.3 volts or less from the third chip 603 into high-voltage signals and applies to the lower electrode of the transmission element $231_{i(j+1)}$. FIG. 12 illustrates the simplified configuration such that the third chip 603 in the cell $X_{bi(j+1)}$ has a delay circuit 33 in the exciting circuit $T_{i(j+1)}$ and an amplifier 36 and a AD converter 37 in the reception circuit $R_{i(j+1)}$. For exciting the vibration membrane of the transmission element $231_{i(j+1)}$, since the high-voltage driver 34 in the cell $X_{bi(j+1)}$ is the circuit of the large-signal levels of 50 volts or more, for example, about 200 volts, the high-voltage driver 34 is merged in the second chip 602. On the contrary, since the delay circuit 33 in the cell $X_{bi(j+1)}$ is a circuit operated at lower voltages of less than 20 volts, for example, 3.3 volts or less, the delay circuit 33 is merged in the third chip 603. The delay circuit 33 in the cell $X_{bi(j+1)}$ is the circuit for determining phases of the output signals of the high-voltage driver 34 in the cell $X_{bi(j+1)}$ and its operational timing. Although illustration is omitted because they are not essential circuit elements, if the excitation row-selection element $TSW_{i(j+1)}$ is connected between the transmission element $231_{i(j+1)}$ and the high-voltage driver 34 in the cell $X_{bi(j+1)}$, electric connections between the transmission elements $231_{i(j+1)}$ and the high-voltage driver 34 can be controlled by the excitation row-selection line $SW_i$, by connecting the excitation row-selection line $SW_i$ on the i-th row to a gate of the excitation row-selection element $TSW_{i(j+1)}$.

A column-selection element $TB_{i(j+1)}$ can be connected between the high-voltage driver 34 in the cell $X_{bi(j+1)}$ and the delay circuit 33, the illustration of the column-selection element $TB_{i(j+1)}$ is omitted because the column-selection element $TB_{i(j+1)}$ is not essential circuit elements. By applying the signals of the bit line $B_{(j+1)}$ on the (j+1)-th column to a gate of the column-selection element $TB_{i(j+1)}$ in the cell $X_{bi(j+1)}$, the electric conductions between the high-voltage driver 34 and the delay circuit 33 can be controlled, which can control the operations of the transmission element $231_{i(j+1)}$ at an intersection in the matrix on the i-th row and the (j+1)-th column. Similarly, if the receiving row-selection element $TRW_{i(j+1)}$ is connected between the reception element $232_{i(j+1)}$ and the amplifier 36, electric connections between the reception element $232_{i(j+1)}$ and the amplifier 36 can be controlled by the receiving row-selection line $RW_i$, by connecting the receiving row-selection line $RW_i$ on the i-th row to a gate of the receiving row-selection element $TRW_{i(j+1)}$. The small-signal outputs of the low-side circuit constructing the delay circuit 33 in the cell $X_{bi(j+1)}$ merged in the third chip 603 are transferred to the high-side circuit by the level shifter, which constructs the front stage of the high-voltage driver 34 merged in the second chip 602.

Although illustration is omitted in FIG. 12, one or more circuits constructing the functional blocks embracing a reference clock-generator 31, a waveform generator 32, a timing adjuster 38 and an image processor 39 in the transmission/reception controller 30 illustrated on the right space in FIG. 8 may be merged in the third chip 603. In the AEIC pertaining to the second embodiment, the electronic circuits to be driven by higher voltages are merged in the second chip 602, and the electronic circuits to be driven by lower voltages are merged in the third chip 603. As just described, since the circuits constructing the respective functional blocks are sorted to the respective chips depending on drive-voltage levels, the electronic circuits to be driven by higher voltages are merged in the wide-bandgap semiconductor substrate such as SiC, and the electronic circuits to be driven by lower voltages are merged in the Si substrate, in which circuit-integration process is easy and well refined, and it is accordingly possible to select semiconductor materials. Also, since the electronic circuits to be driven by higher voltages are merged in the second chip 602 and the electronic circuits to be driven by lower voltages are merged in the third chip 603, the free degree in the layouts of circuits is improved which implement the respective functional blocks exemplified in FIG. 8.

Figure 13:
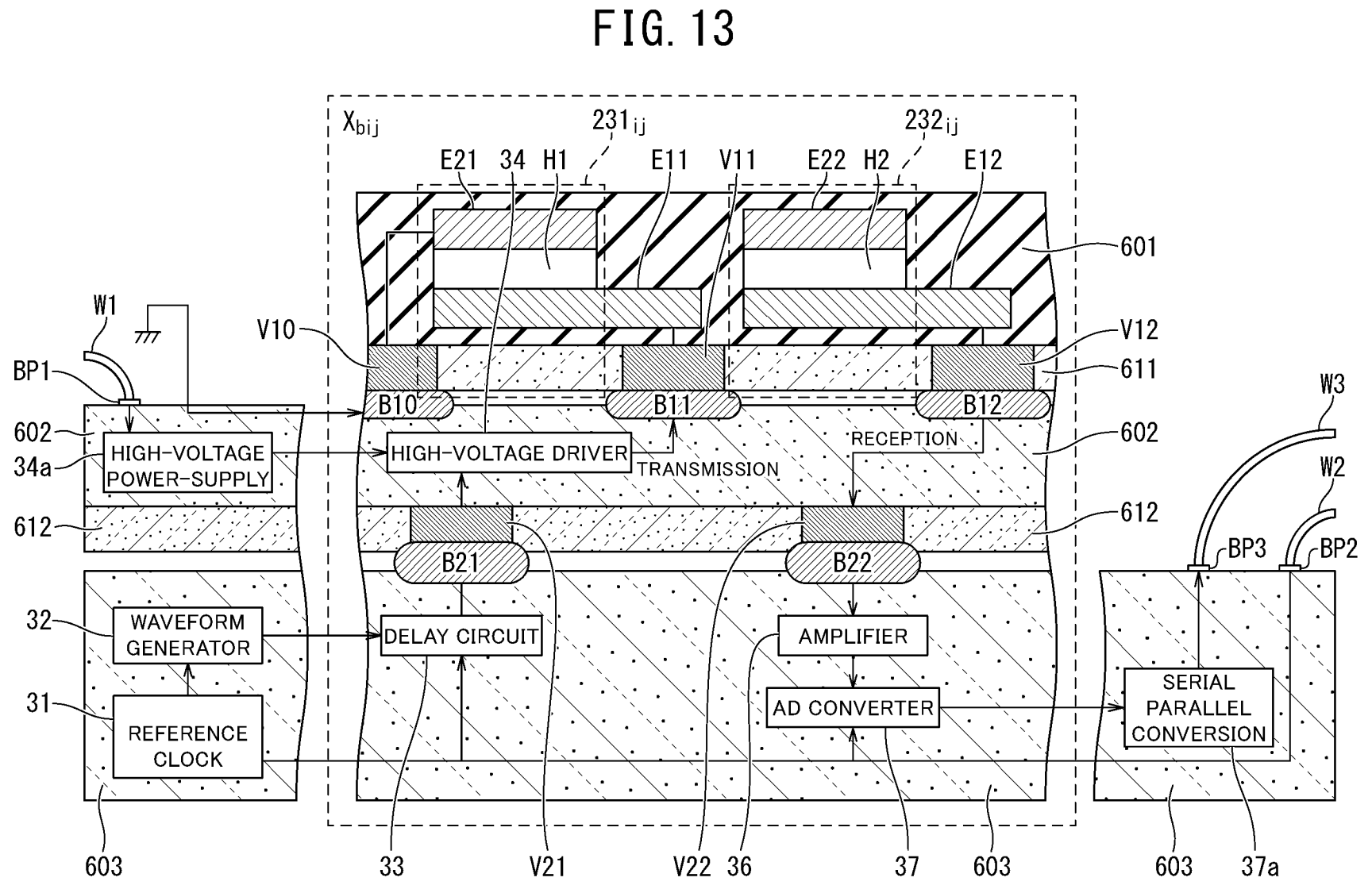

When focusing to the cell $X_{bij}$ among the cells $X_{bi(j-1)}$, $X_{bij}$ and $X_{bi(j+1)}$ on the i-th row exemplified in FIG. 12, the concept of the schematic structure of the cell $X_{bij}$ is concretely exemplified by using the configuration illustrated in FIG. 13. That is, the cell $X_{bij}$ constructing the AEIC pertaining to the second embodiment exhibits the 3D structure in which the second chip 602 is stacked on the third chip 603, and the first chip 601 is stacked on the second chip 602, similarly to FIG. 12. The first chip 601 is structured such that a semiconductor substrate 611 and a pair of a capacitive transmission element $231_{ij}$, which is arranged on the main surface of the semiconductor substrate 611 and transmits the ultrasonic waves, and a capacitive reception element $232_{ij}$ for receiving the ultrasonic waves are merged. A ground plug V10 serving as TSV which penetrates from the main surface to the bottom surface of the semiconductor substrate 611, an excitation plug V11 and a receiving plug V12 are provided in the semiconductor substrate 611, starting from the left. In addition, in the AEIC pertaining to the second embodiment, the ground plug V10, the excitation plug V11 and the receiving plug V12 are called an upper-layer "connection-plug (V10, V11, V12)", collectively and generically.

The transmission element $231_{ij}$ has a transmission lower-electrode E11 connected to the excitation plug V11 and a transmission upper-electrode E21 arranged through a transmission cavity H1 on the transmission lower-electrode E11. The transmission lower-electrode E11 corresponds to the transmission lower-electrode 103a illustrated in FIG. 10 and FIG. 11. Also, the transmission cavity H1 corresponds to the transmission cavity Ha illustrated in FIG. 10 and FIG. 11, and the transmission upper-electrode E21 corresponds to the transmission upper-electrode 109a illustrated in FIG. 10 and FIG. 11. The reception element $232_{ij}$ has a reception lower-electrode E12 connected to the receiving plug V12 and a reception upper-electrode E22 arranged through a reception cavity H2 on the reception lower-electrode E12. The reception lower-electrode E12 corresponds to the reception lower-electrode 103b illustrated in FIG. 10 and FIG. 11. Also, the reception cavity H2 corresponds to the reception cavity Hb illustrated in FIG. 10 and FIG. 11, and the reception upper-electrode E22 corresponds to the reception upper-electrode 109b illustrated in FIG. 10 and FIG. 11.

The transmission upper-electrode E21 and the reception upper-electrode E22 are connected to each other through surface interconnections whose illustration is omitted and further connected to a upper inter-chip connector B10 connected to a ground terminal through the ground plug V10. Bumps, solders and solder balls can be employed for the upper inter-chip connectors B10, B11 and B12. The ground plug V10, the excitation plug V11 and the receiving plug V12 are allocated at positions with which the positions on the planar pattern of the transmission cavity H1 and the reception cavity H2 do not overlap. In the AEIC of the first embodiment, by designing the positions of the ground plug V10, the excitation plug V11 and the receiving plug V12 on the planar layout exemplified in FIG. 1, problems is solved in which the transmission cavity H1 and the reception cavity H2 are crushed when the first chip 601, the second chip 602 and the third chip 603 are stacked and electric inter-chip connection is performed between the circuit of the second chip 602 and the circuit of the third chip 603 by using jointing member.

In FIG. 13, although the second chip 602 is exemplified as the composite structure embracing a semiconductor substrate 612 and a semiconductor layer in which the high-voltage driver (vibration-membrane driver) 34 connected to the main surface of the semiconductor substrate 612 is merged, the composite structure illustrated in FIG. 13 is merely a schematic model, and the structure of the second chip 602 is not limited to the structure illustrated in FIG. 13. For example, as the subject matter explained in relation with FIG. 12, if the excitation row-selection element $TSW_{ij}$ is connected between the reception lower-electrode E12 and the high-voltage driver 34, electric connections between the transmission element $231_{ij}$ and the high-voltage driver 34 can be controlled by the excitation row-selection line $SW_i$, by connecting the excitation row-selection line $SW_i$ on the i-th row to a gate of the excitation row-selection element $TSW_{ij}$. Also, the second chip 602 may be built by a monolithic semiconductor substrate, instead of composite structure embracing the semiconductor substrate 612 and the semiconductor layer provided on the main surface of the semiconductor substrate 612. Moreover, the second chip 602 may be made of a SOI substrate and a multi-level insulator structure exemplified in FIG. 20 and FIG. 21. In particular, if chips are stacked in the flip-chip configuration as exemplified in FIG. 21, the number of TSVs penetrating the SOI insulator and SOI silicon layer in the second chip 602 can be decreased, which can widen the pitch of TSV arrangement.

As described already, if the second chip 602 made of wide-bandgap semiconductor substrate such as SiC, circuits of the high-voltage driver 34 operated at higher voltages and the excitation row-selection element $TSW_{ij}$ can be merged in the second chip 602. Also, as exemplified in FIG. 20 and FIG. 21, when the U-grooves are dug in the SOI silicon layer to arrive the SOI insulator, a dielectric isolation region can be embedded between the U-grooves in the shape of grids or castle walls. And then, if the island-shaped SOI silicon layer is provided by the U-grooves penetrating the SOI silicon layer, the high-voltage driver 34, which is excellent in high-breakdown-voltage characteristics, can be merged in the island-shaped SOI silicon layer. In the exemplification illustrated in FIG. 13, the exciting-circuit plug V21 and the receiving-circuit plug V22 are represented as TSVs penetrating from the main surface to the bottom surface of the semiconductor substrate 612. However, when the second chip 602 is made of a monolithic semiconductor substrate such as the wide-bandgap semiconductor substrate, the exciting-circuit plug V21 and the receiving-circuit plug V22 do not become TSVs. In addition, in the AEIC pertaining to the second embodiment, the exciting-circuit plug V21 and the receiving-circuit plug V22 are called lower-layer "connection-plug (V21, V22)", generically and collectively.

On the main surface of the semiconductor substrate 612, an upper inter-chip connector (connection mechanism) B10 connected to the ground plug V10 of the first chip 601, an upper inter-chip connector (connection mechanism) B11 connected to the excitation plug V11, an upper inter-chip connector (connection mechanism) B12 connected to the receiving plug V12 are arranged respectively on connection lands whose illustration is omitted. For the upper inter-chip connector B11 and the upper inter-chip connector B12, jointing conductors such as bumps, solders or solder balls can be employed. Moreover, the upper inter-chip connectors are not limited to the connection schemes using the jointing members such as bumps, or the hybrid bonding, and the first chip 601 and the second chip 602 may be directly bonded to each other by DSB method. Moreover, the upper inter-chip connector may include a layer of an interposer which converts a pitch of a cell array of the first chip 601 and a pitch of a cell array of the second chip 602. That is, if there is a correspondence relationship such that the pattern of the cell array of the first chip 601 can be projected onto the pattern of the cell array of the second chip 602, the pitch of the cell array of the first chip 601 is made finer and finer, thereby improving the resolution.

As illustrated on the left space in FIG. 13, the high-voltage power-supply 34$a$ is arranged in the region on the left of the element-array area in which the cells $X_{bi(j-1)}$, $X_{bij}$, $X_{bi(j+1)}$, . . . in the second chip 602 are arranged in the shape of matrix. And, a bonding pad BP1 as illustrated on the left space in FIG. 13 is provided on the top surface of the second chip 602, in the peripheral-circuit area in which the high-voltage power-supply 34$a$ is arranged. A wire W1 is bonding-connected to the bonding pad BP1 on the top surface of the second chip 602. From the high-voltage power-supply 34$a$, to which electric power is supplied through the wire $W_i$, high voltages are supplied to the high-voltage drivers 34 of each of the cells $X_{bi(j-1)}$, $X_{bij}$, $X_{bi(j+1)}$, . . . arranged in the element-array area. The high-voltage drivers 34 can supply the high-voltage signals of full-span swing for vibrating the vibration-cavities of the transmission elements in each of the cells $X_{bi(j-1)}$, $X_{bij}$, $X_{bi(j+1)}$, . . . as exemplified in FIG. 22A, FIG. 22B and FIG. 23A, from the second chip 602.

Although illustration of the bonding pad is omitted, a grounding bonding pad is provided adjacently to the bonding pad BP1 on the top surface of the second chip 602 in the peripheral-circuit area illustrated on the left. A grounding wire is bonding-connected to the grounding bonding pad. A ground potential though the grounding wire is connected through the upper inter-chip connector B10 to a grounding plug V10 in the first chip 601. And, the ground plug V10 is connected to the transmission upper-electrode E21 and the reception upper-electrode E22 in the first chip 601 in each of the cells $X_{bi(j-1)}$, $X_{bij}$, $X_{bi(j+1)}$, . . . arranged in the element-array area, and the transmission upper-electrode E21 and the reception upper-electrode E22 are commonly grounded. The exciting-circuit plug V21 in the second chip 602 is electrically connected to the high-voltage driver 34 through an intra-chip wiring such as connection-plug whose illustration is omitted. The high-voltage driver 34 and the connection land mounting the upper inter-chip connector B11 are electrically connected through intra-chip wirings such as connection-plugs whose illustrations are omitted. The receiving-circuit plug V22 may be extended to the connection land mounting the upper inter-chip connector B12 as a penetration plug.

As illustrated in FIG. 13, since the high-voltage driver 34 is arranged in the region of the second chip 602 corresponding to a position of the cell $X_{bij}$ and connected to both the circuits of the high-voltage power-supply 34$a$ and the third chip 603. Then, the high-voltage driver 34 can shift levels of the low-voltage driving-signals at levels of 3.3 volts or less, which are received from the third chip 603 to high-voltage signals. The delay circuit 33, the amplifier 36 and the AD converter 37 in the cell $X_{bij}$ are provided in the region of the third chip 603 corresponding to a position of the cell $X_{bij}$. Although illustration is omitted, moreover, a circuit integration may be carried out to insert a column-selection element TB$_{ij}$ between the high-voltage driver 34 and the delay circuit 33 in the cell $X_{bij}$, and further another circuit integration may be carried out to insert a receiving row-selection element TRW$_{ij}$ between the reception lower-electrode E12 and the amplifier 36.

Although illustration is omitted in FIG. 13, in the peripheral-circuit area close to the chip peripheral-edge of the third chip 603, the column-driver 302 and the row-driver 303 which are illustrated as the peripheral circuits in FIG. 2 are arranged to surround the element-array area 301$a$. If the signals of the excitation row-selection line SW$_i$ on the i-th row delivered from the row-driver 303 is connected to a gate of the excitation row-selection element TSW$_{ij}$, and the signals of the bit line B$_j$ on the j-th column delivered from the column-driver 302 is connected to a gate of the column-selection element TB$_{ij}$, the transmission element 231$_{ij}$ in the cell $X_{bij}$ positioned at the intersection in the matrix can be selectively excited. Also, if the signals of the receiving row-selection line RW$_i$ on the i-th row delivered from the row-driver 303 is connected to a gate of the receiving row-selection element TRW$_{ij}$, the signals transferred from the respective transmission elements 231$_{ij}$ arrayed on the i-th row are read out to the vertical-output signal-lines R$_1$, R$_2$, R$_3$, . . . , R$_{(j-1)}$, R$_j$, R$_{(j+1)}$, . . . at a unit of row. The excitation row-selection line SW$_i$, the receiving row-selection line RW$_i$ and the bit line B$_j$ can be made of surface wirings or the buried wirings in the third chip 603. Although illustration is omitted in FIG. 13, for example, the excitation row-selection line SW$_i$, the receiving row-selection line RW$_i$ and the bit line B$_j$, can be arranged mutually between inter-layer insulators, when a multi-level interconnection structure is built by a plurality of inter-layer insulators on the top surface of the third chip 603.

According to the configuration illustrated in FIG. 13, the high-voltage circuits of the high-voltage driver 34 and the excitation row-selection element TSW$_{ij}$ which are driven by higher voltages can be merged in the second chip 602 that is the wide-bandgap semiconductor substrate. And, since the electronic circuits driven by lower voltages are merged in the third chip 603 using the Si substrate, the sorting of chips by operation voltages of electronic circuits can be carried out. In the peripheral-circuit area on the left of the element-array area in which the cells $X_{bi(j-1)}$, $X_{bij}$, $X_{bi(j+1)}$, . . . in the third chip 603 are arranged in the shape of matrix, the reference clock-generator 31 and the waveform generator 32 are provided as circuits in a common circuit portion.

In the peripheral-circuit area illustrated on the right of the element-array area in FIG. 13, the serial-to-parallel converter 37$a$ is provided as a circuit in another common circuit portion. The serial-to-parallel converter 37$a$ corresponds to the output-buffer circuit 304 illustrated as the peripheral circuit in FIG. 2, and for example, the serial-to-parallel converter 37$a$ may be included as an intra-cell circuit of the output-buffer circuit 304. The serial-to-parallel converter 37$a$ converts parallel signals, which are read out by the vertical-output signal-lines R$_1$, R$_2$, R$_3$, . . . , R$_{(j-1)}$, R$_j$, R$_{(j+1)}$, . . . in FIG. 2 into serial signals.

On the top surface of the third chip 603 corresponding to a position of the cell $X_{bij}$ as illustrated in FIG. 13, the lower inter-chip connector (connection mechanism) B21 and B22 are included on the connection lands whose respective illustrations are omitted. Even for the lower inter-chip connectors B21 and B22, jointing conductors such as bumps, solders or solder balls, etc. can be employed. In the same way to the upper inter-chip connector, the lower inter-chip connector is not limited to the connection schemes using the jointing members such as bumps, or the hybrid bonding. Then, a method of directly bonding the second chip 602 and the third chip 603 to each other by the DSB method can be included. Moreover, the lower inter-chip connector may include an interposer which converts a pitch of a cell array of the second chip 602 and a pitch of a cell array of the third chip 603. That is, if there is a correspondence relationship such that the pattern of the cell array of the second chip 602 can be projected onto the pattern of the cell array of the third chip 603, the pitches of the cell arrays of the first chip 601 and the second chip 602 are made finer and finer, thereby improving the resolution, and the first chip 601 and the second chip 602 may be connected to the third chip 603 which is plentiful in cell area.

The connection land, which mounts the lower inter-chip connector B21, is connected to the delay circuit 33 through intra-chip wirings such as connection-plugs whose illustrations are omitted. The connection land, which mounts the lower inter-chip connector B22, is connected to the amplifier 36 through intra-chip wirings such as connection-plugs whose illustrations are omitted. As illustrated in FIG. 13, the lower inter-chip connectors B21 and B22 are connected to the exciting-circuit plug V21 and the receiving-circuit plug V22, respectively, which are provided in the bottom surface of the second chip 602.

As a result, the delay circuit 33 in the third chip 603 is electrically connected to the high-voltage driver 34 constructing the cell $X_{bij}$ in the corresponding second chip 602, by the inter-chip connection such as the pressure-welding through the jointing member. With the inter-chip connection by the jointing member, an electrical connection from the amplifier 36 in the third chip 603 is made to penetrate through the second chip 602, and reaches to the reception lower-electrode E12 in the reception element $232_{ij}$.

And, bonding pads BP1 and BP2 are provided on the top surface of the third chip 603 corresponding to the right peripheral-circuit area in which the serial-to-parallel converter 37$a$ is arranged. A wire W2 is bonding-connected to the bonding pad BP2, and a wire W3 is bonding-connected to the bonding pad BP3. Although the physical illustration of concrete wiring structure is omitted, the bonding pad BP2 is connected to the reference clock-generator 31, the delay circuit 33 and the AD converter 37 through surface wirings and inner-buried wirings. Thus, the operations of the respective electronic circuits in the reference clock-generator 31, the delay circuit 33 and the AD converter 37 are controlled by control signals entered to the third chip 603 through the wire W2. The parallel signals read out by the vertical-output signal-lines $R_1$, $R_2$, $R_3$, . . . , $R_{(j-1)}$, $R_j$, $R_{(j+1)}$, . . . in FIG. 2 are converted into serial signals by the serial-to-parallel converter 37$a$, and delivered to the image processor 39 through the timing adjuster 38 illustrated in FIG. 8 through the wire W3, and imaging process is performed on the image processor 39.

FIG. 13 illustrates an example focusing to the cell $X_{bij}$ among the cells $X_{bi(j-1)}$, $X_{bij}$, $X_{bi(j+1)}$, . . . constructing the element-array area 301$a$ illustrated in FIG. 1 and FIG. 2 and the functional blocks corresponding to the transmission element $231_{ij}$ in the cell $X_{bij}$ are merged in the second chip 602 and the third chip 603 to exhibit the stacked structure. That is, according to the AEIC pertaining to the second embodiment, for the respective transmission elements $231_{i(j-1)}$, $231_{ij}$, $231_{i(j+1)}$, . . . in the cells $X_{bi(j-1)}$, $X_{bij}$, $X_{bi(j+1)}$, . . . , which are arrayed in the 2D matrix, the exciting circuits $T_{i(j-1)}$, $T_{ij}$, $T_{i(j+1)}$, . . . and the reception circuits $R_{i(j-1)}$, $R_{ij}$, $R_{i(j+1)}$, . . . are individually merged in the second chip 602 and the third chip 603, and accordingly, the transmission-and-reception operations as the 2D phased-array for each of the transmission elements $231_{i(j-1)}$, $231_{ij}$, $231_{i(j+1)}$, . . . , can be controlled. As just described, according to the AEIC pertaining to the second embodiment, because the operation of the 2D phased-array is possible, the diagnosis with high precision and high resolution can be achieved. In addition, in the case of the 2D phased-array operation, the transmission upper-electrode E21 can be common in all transmission elements. However, instead of the operation of the 2D phased array, for at least one of the transmission lower-electrode E11 and the transmission upper-electrode E21, it can be changed to the driving at a unit of row or column.

—Manufacturing of First Chip: First Method—

The manufacturing method of the first chip 601 in the AEIC pertaining to the second embodiment exemplified in FIG. 10 is explained by using the configuration illustrated in FIG. 14A to FIG. 14D.

(a) At first, a semiconductor substrate 101 is prepared in which positions of cells $X_{bi(j-1)}$, $X_{bij}$, $X_{bi(j+1)}$, . . . are two-dimensionally defined and assigned on the main surface of the substrate. Each pattern of the cells $X_{bi(j-1)}$, $X_{bij}$, $X_{bi(j+1)}$, . . . , which are two-dimensionally arrayed on the same main surface, the ground plug V10, the excitation plug V11 and the receiving plug V12 are arranged around the periphery of the pattern, as exemplified in FIG. 9. And, by using chemical vapor deposition (CVD) method, an underlayer-insulating film 102 made of, for example, silicon oxide film ($SiO_2$ film), etc., is provided on the semiconductor substrate 101. And, a first photo-resist film is coated on the underlayer-insulating film 102, and by using a photo-lithography, the first photo resist film is exposed, developed and delineated as a pattern in which the top surfaces of the ground plug V10, the excitation plug V11 and the receiving plug V12 are opened. The pattern of the first photo resist film is used as an etching mask, and dry etching such as reactive ion etching (RIE) is used to selectively etch the underlayer-insulating film 102, and via-holes reaching to the ground plug V10, the excitation plug V11 and the receiving plug V12 are drilled.

After that, a first metallic film made of refractory metal such as tungsten (W), molybdenum (Mo) or titanium (Ti) is deposited on the underlayer-insulating film 102 by using CVD, sputtering, vacuum evaporation or the like. Then, the first metallic film is etched back to bury the first metallic film in the via-hole, thereby creating a link-up plug V16 connected to the ground plug V10, a link-up plug V18 connected to the excitation plug V11, and a link-up plug V19 connected to the receiving plug V12. If necessary, a top surface of the underlayer-insulating film 102 is made flat by using a polishing method such as chemical mechanical polishing (CMP). In succession, a second metallic film is deposited on the entire surface by using sputtering method or vacuum evaporation. And, a second photo-resist film is coated on the second metallic film, and by using photo-lithography, the second photo-resist film is exposed, developed and delineated as a pattern of a transmission lower-electrode 103$a$, a pattern of a reception lower-electrode 103$b$, and a pattern of a link-up pad 103$c$.

By using the pattern of the second photo-resist film as etching mask, the second metallic film is selectively etched by using dry etching such as RIE to delineate the respective patterns of the transmission lower-electrode 103$a$ and the reception lower-electrode 103$b$ on the underlayer-insulating film 102. The planar pattern of the transmission lower-electrode 103$a$ is connected to the top end of the link-up plug V18 provided in the underlayer-insulating film 102. Similarly, the planar pattern of the reception lower-electrode 103$b$ is also connected to the top end of the link-up plug V19 provided in the underlayer-insulating film 102. Moreover, the pattern of the link-up pad 103c is also provided by the second metallic film to be connected to the top end of the via plug V10 buried in the underlayer-insulating film 102. After that, by using depositing method such as CVD, an inter-layer insulator 104 such as tetraethoxysilane (TEOS) film is deposited on the underlayer-insulating film 102 to completely cover the upper portions of the transmission lower-electrode 103a, the reception lower-electrode 103b and the link-up pad 103c. If necessary, the top surface of the inter-layer insulator 104 is made flat by using the polishing method such as CMP.

Figure 14A:
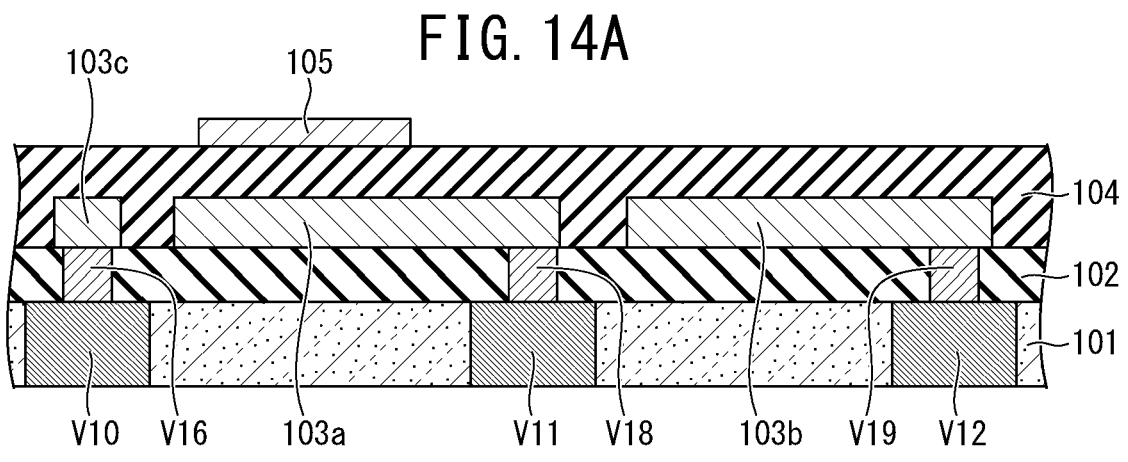
FIG. 14A is a process-flow cross-sectional view explaining a manufacturing method of the AEIC pertaining to the second embodiment (first process-flow stage)

In succession, a third metallic film such as W is deposited on the entire surface by using sputtering or vacuum evaporation. And, a third photo-resist film is coated on the third metallic film, and by using photo-lithography, the third photo-resist film is exposed, developed and delineated for a pattern of an adjust-sacrificial layer 105. The pattern of the third photo-resist film is used as etching mask, and the third metallic film is selectively etched by using dry etching such as RIE, and the pattern of the adjust-sacrificial layer 105 is provided on the inter-layer insulator 104, as illustrated in FIG. 14A The pattern of the adjust-sacrificial layer 105 is selectively provided only on the upper portion of the transmission lower-electrode 103a.

(b) Next, a fourth metallic film such as W is deposited on the entire surface by using sputtering or vacuum evaporation. Preferably, the fourth metallic film is the same metal as the third metallic film. And, a fourth photo-resist film is coated on the fourth metallic film, and by using photo-lithography, the fourth photo-resist film is exposed, developed and delineated as a pattern of an upper sacrificial layer 106a and a pattern of a second sacrificial layer 106b. By using the pattern of the fourth photo-resist film as etching mask, the fourth metallic film is selectively etched by using dry etching such as RIE. As a result, as illustrated in FIG. 14B, the upper sacrificial layer 106a is provided above the pattern of the adjust-sacrificial layer 105, and the pattern of the second sacrificial layer 106b is provided on the inter-layer insulator 104.

Figure 14B:
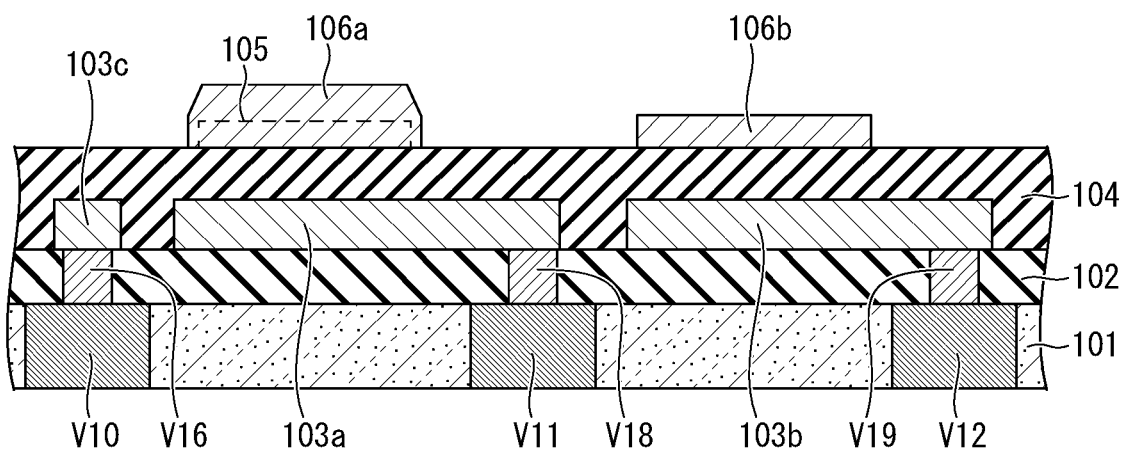
FIG. 14B is a process-flow cross-sectional view explaining the manufacturing method of the AEIC pertaining to the second embodiment (second process-flow stage)

As illustrated in FIG. 14B, in such a way that the pattern of the upper sacrificial layer 106a is selectively provided on only the upper portion of the adjust-sacrificial layer 105, photo-lithography is used to carry out mask alignment. Since the pattern of the upper sacrificial layer 106a is deposited on the pattern of the adjust-sacrificial layer 105 to construct a double-layer composite film, the pattern of the first sacrificial layer (105, 106a) is provided thicker than the pattern of the second sacrificial layer 106b, above the transmission lower-electrode 103a. On the other hand, the pattern of the second sacrificial layer 106b is aligned by using photo-lithography, and selectively provided on only the upper portion of the reception lower-electrode 103.

Figure 14C:
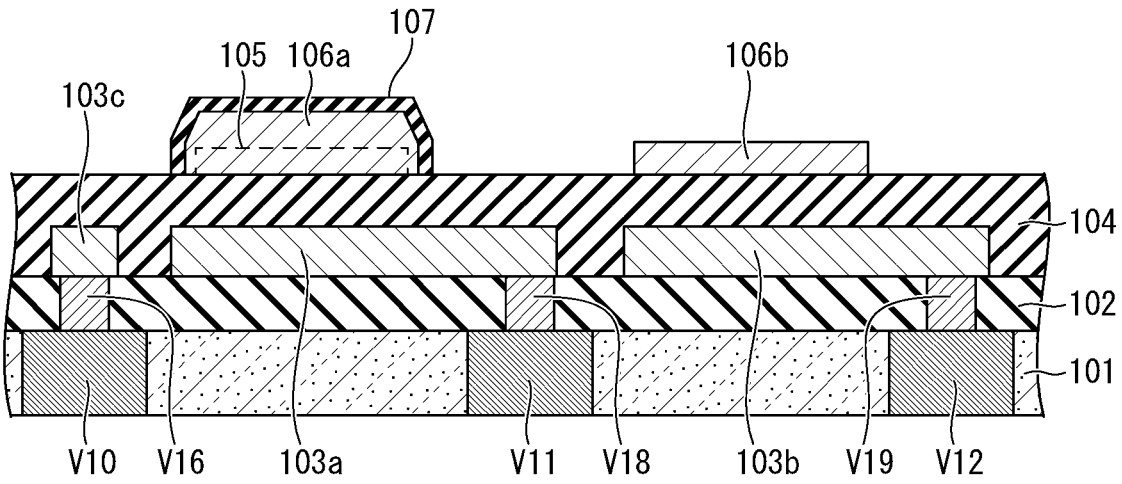
FIG. 14C is a process-flow cross-sectional view explaining the manufacturing method of the AEIC pertaining to the second embodiment (third process-flow stage)

(c) Next, by using depositing method such as CVD, a first vibration membrane 107 such as silicon nitride film (Si_3N_4 film) is deposited on the inter-layer insulator 104 to perfectly cover the upper portions of the first sacrificial layer (105, 106a) and the second sacrificial layer 106b. And, a fifth photo-resist film is coated on the first vibration membrane 107, and by using photo-lithography, the fifth photo-resist film is exposed, developed and delineated such that only a pattern on the first sacrificial layer (105, 106a) is left. By using the pattern of the fifth photo-resist film as etching mask, dry etching such as RIE is used to selectively etch the first vibration membrane 107, and a pattern of the first vibration membrane 107 is delineated on the first sacrificial layer (105, 106a), as illustrated in FIG. 14C.

Figure 14D:
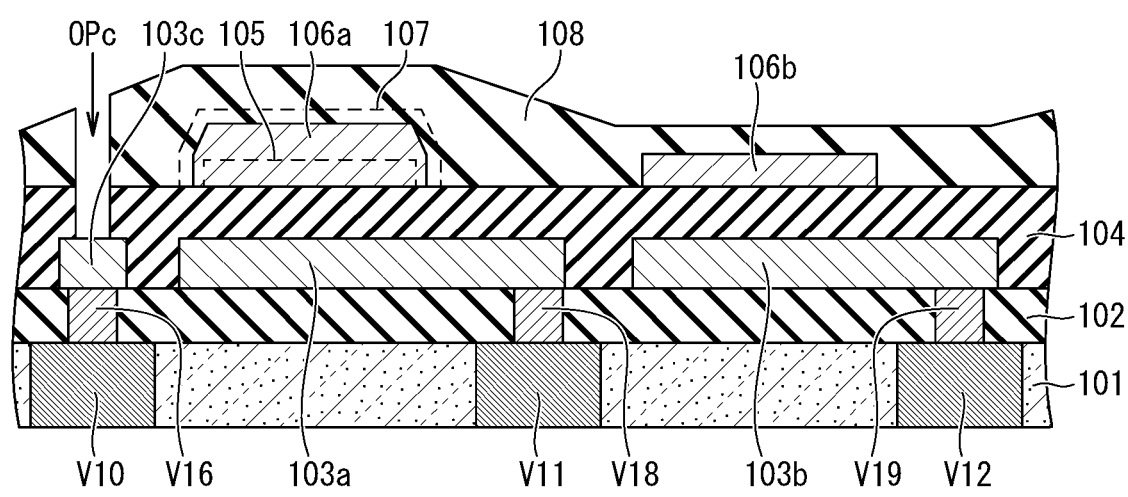
FIG. 14D is a process-flow cross-sectional view explaining the manufacturing method of the AEIC pertaining to the second embodiment (fourth process-flow stage)

(d) Next, by using depositing method such as CVD, a second vibration membrane 108 such as silicon oxide film is deposited on the inter-layer insulator 104 to perfectly cover the upper portions of the first vibration membrane 107 and the second sacrificial layer 106b. And, a sixth photo-resist film is coated on the second vibration membrane 108, and by using photo-lithography, the sixth photo-resist film is exposed, developed and delineated as a pattern of an etching mask in which the top surface of a link-up plug V16 on the ground plug V10 is opened. By using the pattern of the sixth photo-resist film as etching mask, dry etching such as RIE is used to carry out selective etching so that a space for link-up plug V16 penetrates the second vibration membrane 108, the inter-layer insulator 104 and the underlayer-insulating film 102, and a via-hole OPc reaching to the link-up pad 103c is opened as illustrated in FIG. 14D. After that, a fifth metallic film made of refractory metal is deposited on the second vibration membrane 108 by using CVD, sputtering or vacuum evaporation. And, the fifth metallic film is etched back to bury the fifth metallic film in the via-hole OPc, and an inter-layer wiring plug V17 connected to the link-up pad 103c is provided.

Figure 14E:
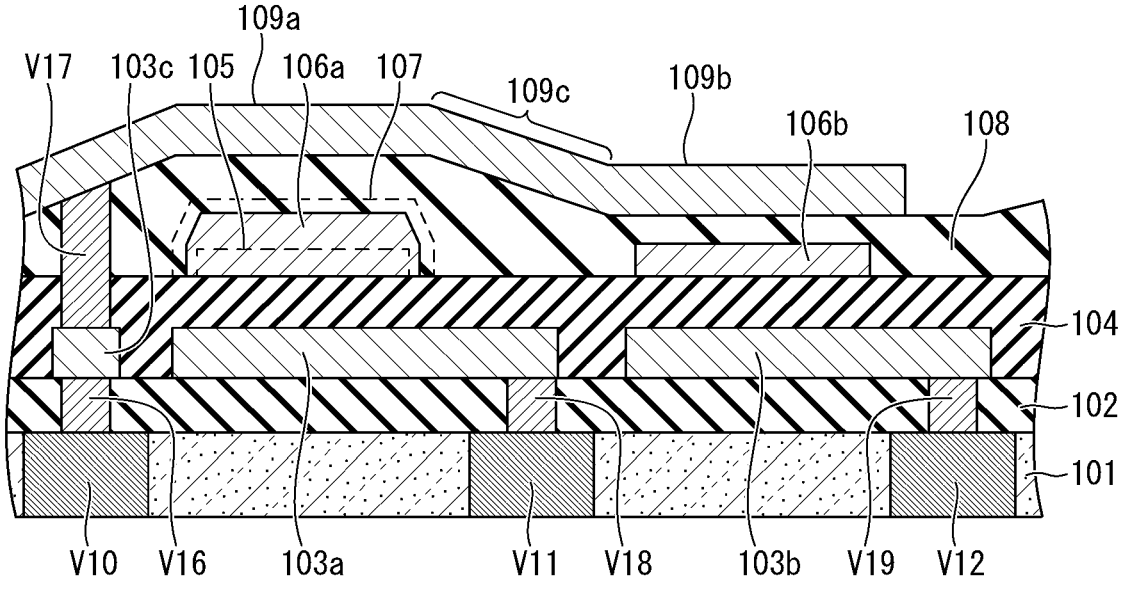
FIG. 14E is a process-flow cross-sectional view explaining the manufacturing method of the AEIC pertaining to the second embodiment (fifth process-flow stage)

(e) After that, by using sputtering or vacuum evaporation, a sixth metallic film is deposited on the entire surface of the second vibration membrane 108. And, a seventh photo-resist film is coated on the sixth metallic film, and by using photo-lithography, the seventh photo-resist film is exposed, developed and delineated to define a pattern of a transmission upper-electrode 109a and a pattern of a reception upper-electrode 109b. By using the pattern of the seventh photo-resist film as etching mask, dry etching such as RIE is used to selectively etch the sixth metallic film, and the respective patterns of the transmission upper-electrode 109a and the reception upper-electrode 109b are delineated on the second vibration membrane 108, as illustrated in FIG. 14E. As illustrated in FIG. 14E, the transmission upper-electrode 109a of the transmission element is provided above the first sacrificial layer (105, 106a), and the reception upper-electrode 109b of the reception element is provided above the second sacrificial layer 106b. In addition, as illustrated in FIG. 9 and FIG. 14E, the transmission upper-electrode 109a and the reception upper-electrode 109b are delineated to be connected to each other through the surface wirings 109c. Moreover, as illustrated in FIG. 14E, the transmission upper-electrode 109a is connected to the inter-layer wiring plug V17 connected to the top end of the ground plug V10. As a result, the transmission upper-electrode 109a and the reception upper-electrode 109b are electrically connected to the inter-layer wiring plug V17 and can be grounded.

(f) Next, by using depositing method such as spin coating, sputtering, vacuum evaporation and CVD, a first protection film is deposited on the second vibration membrane 108, and the upper portions of the transmission upper-electrode 109a, the reception upper-electrode 109b and the surface wirings 109c are perfectly covered by the first protection film. And, an eighth photo-resist film is coated on the first protection film, and by using photo-lithography, etching masks for making a first hole and a second hole are made with the eighth photo-resist film. The mask pattern for making the first hole is aligned to a position reaching to the first sacrificial layer (105, 106a), and the mask pattern for making the second hole is aligned to a position reaching to the second sacrificial layer 106b. By using etching mask of the eighth photo-resist film, and the second vibration membrane 108 and the first vibration membrane 107 are selectively etched through dry etching, the first hole reaching to the first sacrificial layer (105, 106a) and the second hole reaching to the second sacrificial layer 106b are cut. The first and second holes are cut at positions differing from the cross-section illustrated in FIG. 14E.

(g) And, through the first and second holes, for example, heated solution of hydrogen peroxide is introduced into the first sacrificial layer (105, 106a) and the second sacrificial layer 106b. When the heated solution of hydrogen peroxide is introduced, the first sacrificial layer (105, 106a) and the second sacrificial layer 106b are selectively dissolved by wet etching. When the first sacrificial layer (105, 106a) and the second sacrificial layer 106b are dissolved, as illustrated in FIG. 10, a transmission cavity Ha is provided at a position above the transmission lower-electrode 103a, and a reception cavity Hb is provided at a position above the reception lower-electrode 103b. After that, depositing method such as spin coating or CVD is used, and a thick second protection film is delineated on a first protection film, and the first and second holes are closed. In the step of closing the first and second holes, since the interiors of the transmission cavity Ha and the reception cavity Hb are treated in de-pressurized atmosphere of about one kPa with He gas as the main component, the interiors of the transmission cavity Ha and the reception cavity Hb in which the He gas serves as the main component becomes reduced-pressure state which can be regarded to be substantially vacuum. By the steps illustrated in FIG. 14A to FIG. 14E, the transmission and reception elements can be provided in the first chip as illustrated in FIG. 10. As described above, the illustration of the protection film that is the composite film composed of the first and second protection films is omitted in FIG. 10.

—Manufacturing of First Chip: Second Method—

The manufacturing method of the first chip 601 in the AEIC pertaining to the second embodiment exemplified in FIG. 11 is explained by using the configuration illustrated in FIG. 15A to FIG. 15D.

(a) At first, similarly to the structure illustrated in the semiconductor substrate 611 in FIG. 9 and FIG. 13 described later, the semiconductor substrate 101 is prepared in which the plurality of cells where each of the cells $X_{bi(j-1)}$, $X_{bij}$, $X_{bi(j+1)}$, . . . has the ground plug V10, the excitation plug V11 and the receiving plug V12 in each periphery are arranged in the shape of matrix. And, by using depositing method such as CVD, the underlayer-insulating film 102 serving as an underlying layer is delineated on the semiconductor substrate 101. And, by using photo-lithography and dry etching, the underlayer-insulating film 102 is selectively etched, thereby cutting the via-hole reaching to the ground, excitation and receiving plugs. After that, refractory metals, such as W, Mo, Ti, etc., are deposited on the underlayer-insulating film 102, by using CVD, sputtering and vacuum evaporation. And, the refractory metals are etched back, and the refractory metals are buried in the via-hole, and the respective link-up plugs connected to the ground, excitation and receiving plugs are provided.

If necessary, the top surface of the underlayer-insulating film 102 is made flat by using the polishing method such as CMP. In succession, by using the depositing technology such as sputtering or vacuum evaporation, or photo-lithography or dry etching such as RIE, the respective patterns of the transmission lower-electrode 103a, the reception lower-electrode 103b and the link-up pad are selectively delineated on the underlayer-insulating film 102. The structure illustrated in FIG. 11 assumes that the connection-plugs, such as the ground, excitation and receiving plugs, are located on the near-ward portion of the paper of FIG. 15A. So, the planar pattern of the transmission lower-electrode 103a is delineated as a pattern extending to the near-ward portion of the paper of FIG. 15A to be connected to the top end of the connection-plug buried in the underlayer-insulating film 102. Similarly, the planar pattern of the reception lower-electrode 103b is delineated as a pattern extending to the near-ward portion of the paper in FIG. 15A to be connected to the top end of the connection-plug buried in the underlayer-insulating film 102. Moreover, the link-up pad is delineated on the link-up plug connected to the ground plug.

Figure 15A:
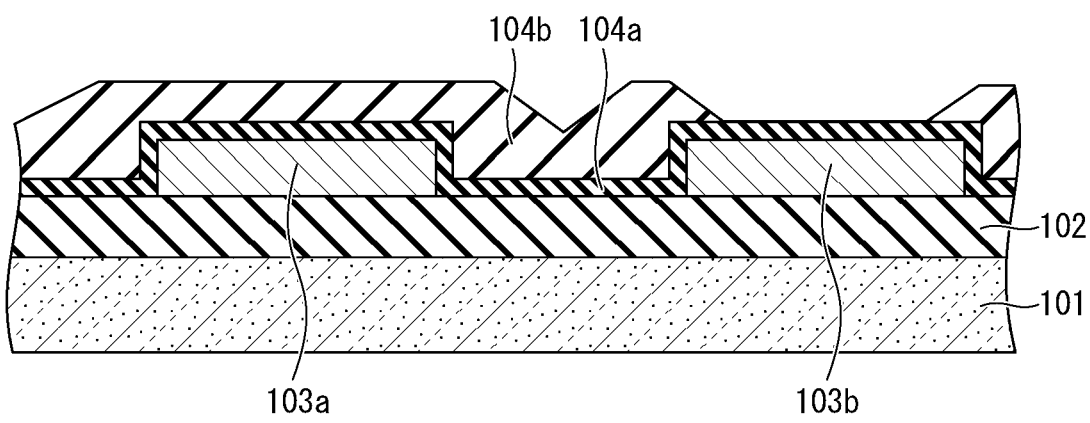
FIG. 15A is a process-flow cross-sectional view explaining another manufacturing method of the AEIC pertaining to the second embodiment (first process-flow stage)

After that, depositing method such as CVD is used to perfectly cover the lower electrodes 103a and 103b and the link-up pad, on the underlayer-insulating film 102. For example, a first inter-layer insulator 104a such as $Si_3N_4$ film is provided. In succession, by using depositing method such as CVD, a second inter-layer insulator 104b, for example, such as TEOS film, differing from the first inter-layer insulator 104a is delineated on the first inter-layer insulator 104a. After that, by using photo-lithography and dry etching such as RIE, as illustrated in FIG. 15A, only the second inter-layer insulator 104b existing on the reception lower-electrode 103b is selectively etched, and the first inter-layer insulator 104a on the reception lower-electrode 103b is exposed.

Figure 15B:
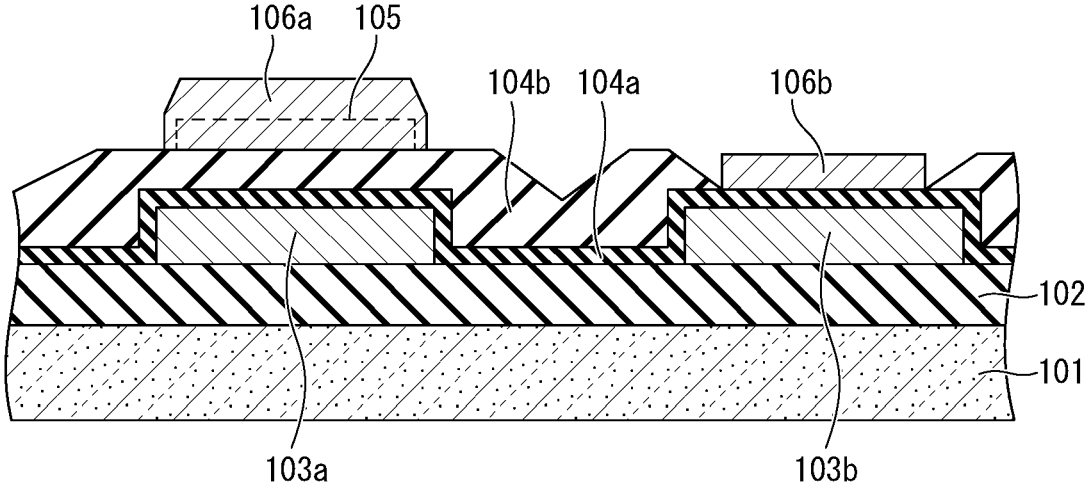
FIG. 15B is a process-flow cross-sectional view explaining the manufacturing method of the AEIC pertaining to the second embodiment, following to the stage illustrated in FIG. 15A (second process-flow stage)

(b) Next, by using the depositing technique, such as sputtering and vacuum evaporation, and photo-lithography and dry etching such as RIE, the adjust-sacrificial layer 105 for the vibration-cavity of the transmission element is delineated only above the transmission lower-electrode 103a. The adjust-sacrificial layer 105 may be made by metallic film such as the W film. In succession, by using the depositing technique such as sputtering and vacuum evaporation, and photo-lithography and dry etching, as illustrated in FIG. 15B, the upper sacrificial layer 106a for the vibration-cavity of the transmission element is provided above the transmission lower-electrode 103a, and the second sacrificial layer 106b for the vibration-cavity of the reception element are provided above the reception lower-electrode 103b. The upper sacrificial layer 106a and the second sacrificial layer 106b may be made of the same metal as the adjust-sacrificial layer 105. Since due to the mask alignment, the pattern of the upper sacrificial layer 106a is deposited on the pattern of the adjust-sacrificial layer 105 to construct a composite film, the pattern of the first sacrificial layer (105, 106a) is provided thicker than the pattern of the second sacrificial layer 106b, above the transmission lower-electrode 103a.

Figure 15C:
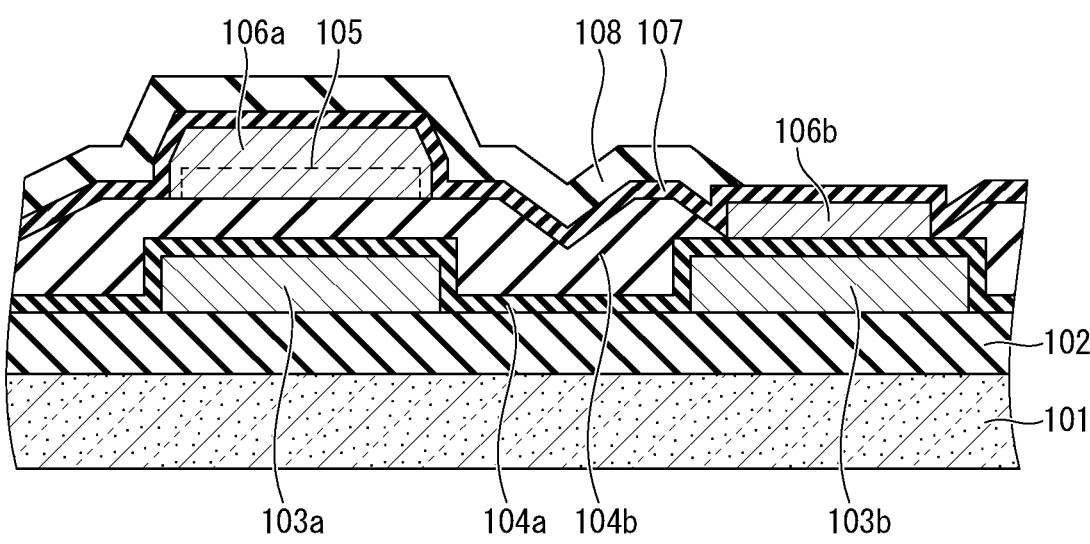
FIG. 15C is a process-flow cross-sectional view explaining the manufacturing method of the AEIC pertaining to the second embodiment, following to the stage illustrated in FIG. 15B (third process-flow stage)

(c) Next, as illustrated in FIG. 15C, by using depositing method such as CVD, for example, the first vibration membrane 107 of silicon oxide film to cover both of the first sacrificial layer (105, 106a) and the second sacrificial layer 106b is deposited on the second inter-layer insulator 104b. Moreover, by using depositing method such as CVD, the second vibration membrane 108 of silicon oxide film is deposited on the first vibration membrane 107. And, the second vibration membrane 108 above the second sacrificial layer 106b is selectively etched back by photo-lithography and dry etching. As a result, a composite film, in which the first vibration membrane 107 and the second vibration membrane 108 are stacked, is structured in the first sacrificial layer (105, 106a).

Figure 15D:
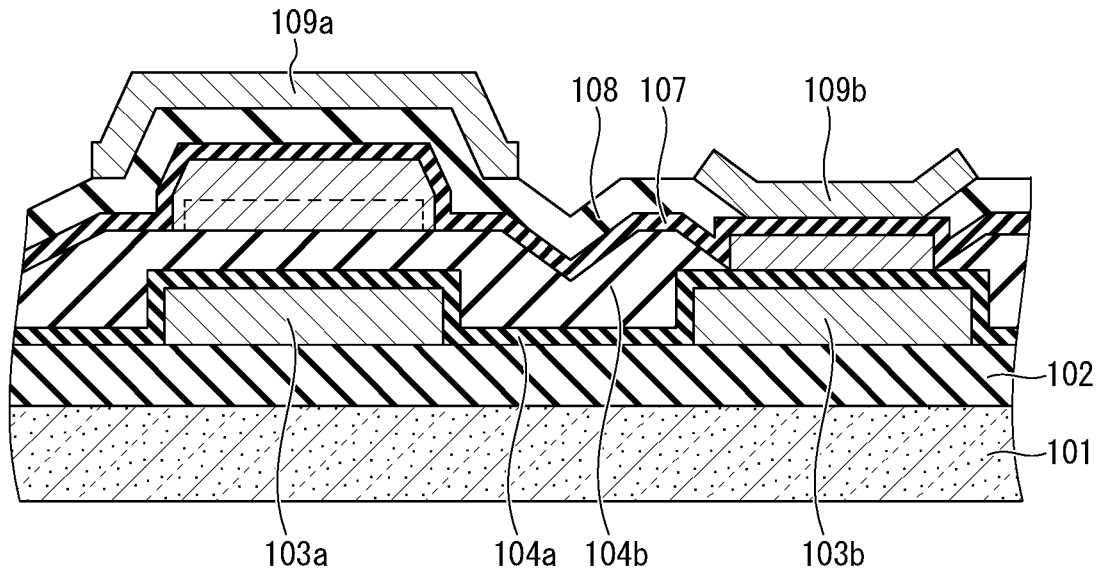
FIG. 15D is a process-flow cross-sectional view explaining the manufacturing method of the AEIC pertaining to the second embodiment, following to the stage illustrated in FIG. 15C (fourth process-flow stage4)

(d) And, by using photo-lithography and dry etching, a via-hole is drilled to penetrate the second vibration membrane 108, the first vibration membrane 107, the second inter-layer insulator 104b, the first inter-layer insulator 104a and the underlayer-insulating film 102 and arrives at the link-up pad. After that, the refractory metal is deposited on the second vibration membrane 108 by using CVD, sputtering and vacuum evaporation. And, the refractory metal is etched back, and the refractory metal is buried in the via-hole, and an inter-layer wiring plug connected to the link-up pad is provided. After that, by using the depositing technique such as sputtering and vacuum evaporation, photo-lithography and dry etching, as illustrated in FIG. 15D, the transmission upper-electrode 109a of the reception element is provided above the first sacrificial layer (105, 106a), and the reception upper-electrode 109b of the reception element is provided above the second sacrificial layer 106b. At the time, the transmission upper-electrode 109a and the reception upper-electrode 109b are delineated to be connected to each other on a near-ward portion of a paper. Moreover, on the near-ward portion of the paper of a cross-sectional view of FIG. 15D, the inter-layer wiring plug connected through the link-up pad to the link-up plug connected to the ground plug is connected to the surface wirings that connects the transmission upper-electrode 109a and the reception upper-electrode 109b.

(e) Next, a first protection film is delineated on the transmission upper-electrode 109a, the reception upper-electrode 109b and the surface wirings that connects the transmission upper-electrode 109a and the reception upper-electrode 109b. A first hole that penetrates the first vibration membrane 107 and the second vibration membrane 108 and arrives at the first sacrificial layer (105, 106a) is cut by using photo-lithography and dry etching. At the same time, a second hole is cut which penetrates the first vibration membrane 107 on the second sacrificial layer 106b and arrives at the second sacrificial layer 106b. The first and second holes are cut at positions differing from the cross-section illustrated in FIG. 15D. In succession, through the first and second holes, for example, heated solution of hydrogen peroxide is introduced. When wet etching solution is introduced from the first and second holes, the first sacrificial layer (105, 106a) and the second sacrificial layer 106b are dissolved. When the first sacrificial layer (105, 106a) and the second sacrificial layer 106b are dissolved, as illustrated in FIG. 11 already, the transmission cavity Ha is created on the transmission lower-electrode 103a, and the reception cavity Hb is created on the reception lower-electrode 103b. After that, a thick second protection film is deposited on the first protection film, and the first and second holes are closed. When the first and second holes are closed, if the interiors of the transmission cavity Ha and the reception cavity Hb are treated, with He gas atmosphere of about one kPa, the interiors of the transmission cavity Ha and the reception cavity Hb are made substantially vacuum. However, similarly to the case represented by FIG. 10, the illustration of the protection film that is the composite film composed of the first and second protection films is omitted in FIG. 11.

Third Embodiment

Figure 16:
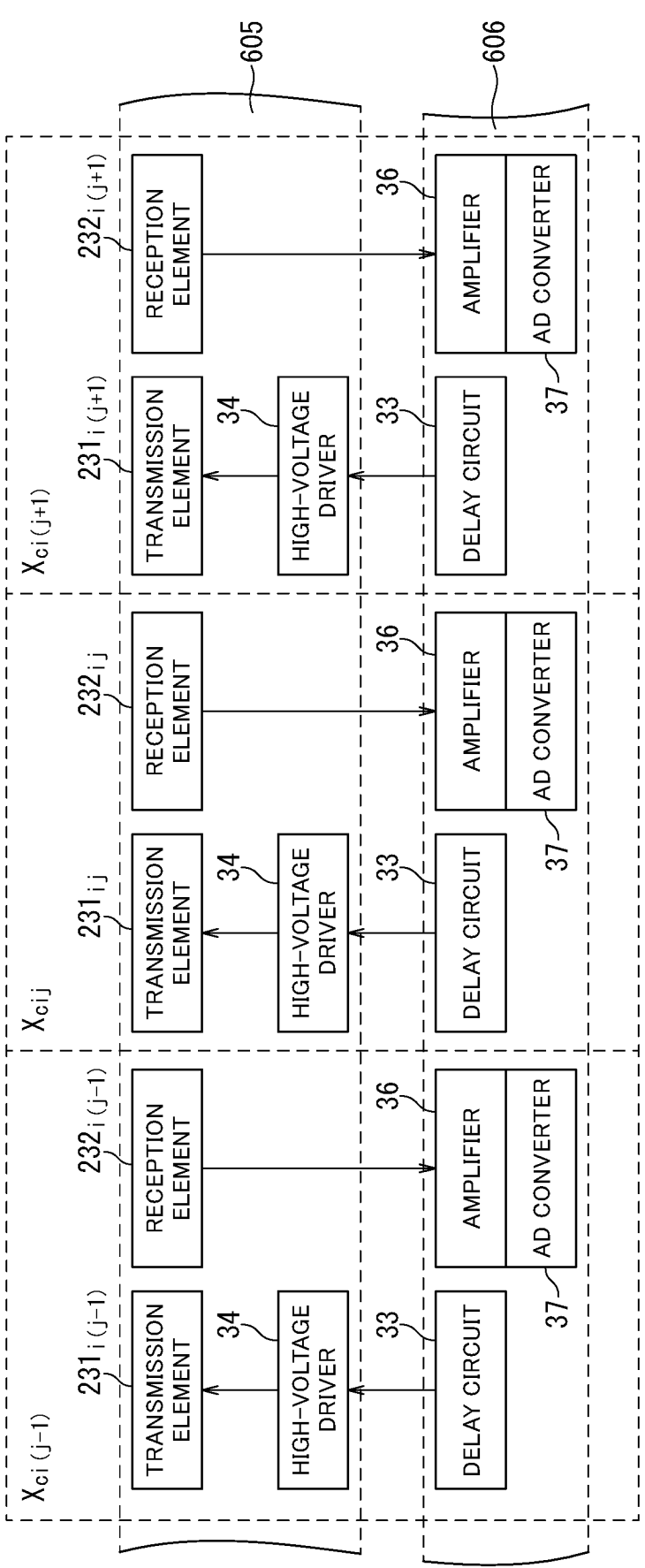
FIG. 16 is a conceptual diagram illustrating the allocation of each of the functional blocks when an AEIC pertaining to a third embodiment is implemented by a stacked structure of double semiconductor chips.

As illustrated in FIG. 16, an AEIC pertaining to a third embodiment of the present invention is a 3D integrated circuit built by a double-layer stacked structure embracing a first chip 605 in which high-voltage circuits of 20 volts or more are merged and a second chip 606 in which small-signal circuits of less than 20 volts are merged. A representation of "a first chip 605 in which high-voltage circuits of 20 volts or more are merged" is merely a rhetorical convenience to differentiate from the second chip 606 is similar to the AEICs pertaining to the first and second embodiments. As the practical technical meaning, the high-voltage circuits of the voltage levels of 40 volts or more, for example, about 100 volts to 200 volts or more can be merged in the first chip 605. In addition, similarly to the AEICs pertaining to the first and second embodiments, the small-signal and low-voltage circuits of the second chip 606 can include electronic circuits at operation voltages of 3.3 volts or less. Although there is a difference between the double-layer stacked structure and the triple-layer stacked structure, similarly to the AEIC pertaining to the first and second embodiments, each of the first chip 605 and the second chip 606 can be made of semiconductor chips whose main body is semiconductor substrate. The semiconductor chips constructing the first chip 605 and the second chip 606 may be a composite structure composed of semiconductor substrates and insulating layers, such as SOI structure. In particular, the semiconductor chip made of the wide-bandgap semiconductor which is excellent in high-breakdown-voltage characteristics, such as SiC, diamond or the like, is preferable for the first chip 605 in which the high-voltage circuits are merged.

A feature that the first chip 605 has a pair of the capacitive transmission elements $231_{i(j-1)}$ and the capacitive reception element $232_{i(j-1)}$, a pair of the capacitive transmission elements $231_{ij}$ and the capacitive reception element $232_{ij}$ and a pair of the capacitive transmission elements $231_{i(j+1)}$ and the capacitive reception element $232_{i(j+1)}$ is similar to the AEIC pertaining to the second embodiment. In the same way to the AEIC pertaining to the second embodiment, a module embracing the pair of the transmission elements $231_{i(j-1)}$ and the reception element $232_{i(j-1)}$, a module embracing the pair of the transmission elements $231_{ij}$ and the reception element $232_{ij}$ and a module embracing the transmission elements $231_{i(j+1)}$ and the reception element $232_{i(j+1)}$ are called "acoustic-elements $231_{i(j-1)}$, $232_{i(j-1)}$; $231_{ij}$, $232_{ij}$; $23_{i(j+1)}$, $232_{i(j+1)}$", respectively, in the AEIC pertaining to the third embodiment.

In addition, although FIG. 16 illustrates a case in which only a single acoustic-element $(231_{i(j-1)}, 232_{i(j-1)})$ exists in the cell $X_{ci(j-1)}$, only a single acoustic-element $(231_{ij}, 232_{ij})$ exists in the cell $X_{cij}$ and only a single acoustic-element $(231_{i(j+1)}, 232_{i(j+1)})$ exists in the cell $X_{ci(j+1)}$, the above topology illustrated in FIG. 16 is merely an exemplification. The number of the acoustic-elements $(231_{i(j-1)}, 232_{i(j-1)}; 231_{ij}, 232_{ij}; 231_{i(j+1)}, 232_{i(j+1)})$ is not limited to one. Various modifications are allowed, in which there are double or more modules, which contain acoustic-elements, in each of the cell-columns $X_{ci(j-1)}$, $X_{cij}$, $X_{ci(j+1)}$, . . . . That is, in the AEIC pertaining to the third embodiment, in the array of the cells constructing the 2D matrix deployed on the coplanar surface, a unit number n (the n is a positive integer of one or more) of acoustic-element is assigned in each of the cells, and a set of unit number n of acoustic-elements can be driven by an intra-cell circuit. However, for the sake of simplification, a case in which there is a single acoustic-element ($231_{i(j-1)}$, $232_{i(j-1)}$; $231_{ij}$, $232_{ij}$; $231_{i(j+1)}$, $232_{i(j+1)}$) is exemplified. One set of n acoustic-elements implements a single cell, and corresponding to the single cell, the n acoustic-elements can be driven by a single intra-cell circuit assigned as the intra-cell circuit.

Although the acoustic-element in the AEIC of the first embodiment has been explained to include a single vibration-cavity, the acoustic-element ($231_{i(j-1)}$, $232_{i(j-1)}$) in the AEIC pertaining to the third embodiment includes double vibration cavities of the transmission cavity Ha used for transmitting and the reception cavity Hb used for receiving. Since the acoustic-element includes the transmission cavity Ha used for transmitting and the reception cavity Hb used for receiving, the acoustic-element can be regarded as an element having the transmitting/reception function. Similarly, since the acoustic-element ($231_{ij}$, $232_{ij}$) includes double vibration cavities of the transmission cavity Ha used for transmitting and the reception cavity Hb used for receiving, the acoustic-element ($231_{ij}$, $232_{ij}$) can be regarded as the element having the transmitting/reception function. And, since the acoustic-element ($231_{i(j+1)}$, $232_{i(j+1)}$) includes double vibration cavities of the transmission cavity Ha used for transmitting and the reception cavity Hb used for receiving, the acoustic-element ($231_{i(j+1)}$, $232_{i(j+1)}$) can be regarded as the element having the transmitting/reception function. The pair of the transmission elements $231_{i(j-1)}$ and the reception elements $232_{i(j-1)}$, the pair of the transmission elements $231_{ij}$ and the reception element $232_{ij}$ and the pair of the transmission elements $231_{i(j+1)}$ and the reception element $232_{i(j+1)}$, which are merged in the first chip 605, implement a part of the cells $X_{ci(j-1)}$, $X_{cij}$, $X_{ci(j+1)}$, . . . , which are arrayed on the i-th row in the matrix, respectively. And, a feature that in the first chip 605 in the AEIC pertaining to the third embodiment, the high-voltage driver (vibration-membrane driver) 34 is provided in each of the cells $X_{ci(j-1)}$, $X_{cij}$, and $X_{ci(j+1)}$) differs from the AEIC pertaining to the second embodiment.

The high-voltage driver 34 in the cell $X_{ci(j-1)}$ is connected to the transmission elements $231_{i(j-1)}$ and implement a part of the exciting circuit $T_{i(j-1)}$) in the cell $X_{ci(j-1)}$, in the first chip 605. The high-voltage driver 34 is the circuit of the large-signal levels of 20 volts or more, concretely 50 volts or more or 100 volts or more, further about 200 volts, for exciting the vibration membrane of the transmission elements $231_{i(j-1)}$. The high-voltage driver 34 in the cell $X_{cij}$ is connected to the transmission elements $231_{ij}$ and implement a part of the exciting circuit $T_{ij}$ in the cell $X_{cij}$, in the first chip 605. The high-voltage driver 34 is the circuit of the large-signal levels of 20 volts or more, concretely 50 volts or more or 100 volts or more, further about 200 volts, for exciting the vibration membrane of the transmission elements $231_{ij}$. The high-voltage driver 34 in the $X_{ci(j+1)}$ is connected to the transmission elements $231_{i(j+1)}$ and implement a part of the exciting circuit $T_{i(j+1)}$ in the $X_{ci(j+1)}$, in the first chip 605. The high-voltage driver 34 is the circuit of the large-signal levels of 20 volts or more, concretely 50 volts or more or 100 volts or more, further about 200 volts, for exciting the vibration membrane of the transmission elements $231_{i(j+1)}$.

As just described, to arrange the high-voltage operating-elements such as the high-voltage driver 34, for example, as exemplified in FIG. 20, the first chip 605 may be made of a SOI substrate and a multi-level insulator structure on the SOI substrate. And, similarly to FIG. 20, the U-grooves reaching to the SOI insulator is dug in the SOI silicon layer, a dielectric isolation region is buried between the U-grooves in the shape of grid or castle wall, and the SOI silicon layer in which the high-voltage operating-element is arranged can be constructed in the shape of island. The high-voltage driver 34 that is excellent in high-breakdown-voltage characteristics can be merged in the island-shaped SOI silicon layer provided in the first chip 605. Or, the semiconductor substrate made of wide-bandgap semiconductor, which is excellent in high-breakdown-voltage characteristics, such as SiC, diamond, GaN, etc., may be used in the first chip 605. The high-voltage driver 34 in the cell $X_{ci(j-1)}$ converts low-voltage driving-signals at voltage levels of 3.3 volts or less from the second chip 606 into high-voltage signals and applies the high-voltage signals to the lower electrode of the transmission elements $231_{i(j-1)}$.

By using SiC or diamond in the first chip 605, it becomes easy to change materials of the vibration membranes of the transmission elements $231_{i(j-1)}$, $231_{ij}$ and $231_{i(j+1)}$ and the reception elements $232_{i(j-1)}$, $232_{ij}$ and $232_{i(j+1)}$ into hard material of SiC or diamond. By changing the vibration membranes of the transmission elements $231_{i(j-1)}$, $231_{i(j+1)}$ and $231_{i(j+1)}$ and the reception elements $232_{i(j-1)}$, $232_{ij}$ and $232_{i(j+1)}$ into hard material of SiC or diamond, it becomes easy to transmit strong vibration energies from the transmission elements $231_{i(j-1)}$, $231_{ij}$ and $231_{i(j+1)}$, and it becomes accordingly possible to improve the sensitivities of the reception elements $232_{i(j-1)}$, $232_{ij}$ and $232_{i(j+1)}$. In addition, even in a case of materials other than the SiC or diamond, if the material properties are high in Young's modulus and bending strength, the materials can be included in the manufacturing step of the first chip 605. In particular, since higher voltages are applied to the upper and lower electrodes of the transmission elements $231_{i(j-1)}$, $231_{ij}$ and $231_{i(j+1)}$, the membrane thickness can be made thin, and the strong vibration can be easily achieved in a case of using the SiC or the diamond that is high in breakdown-voltage.

The high-voltage driver 34 in each of the cells $X_{ci(j-1)}$, $X_{cij}$, $X_{ci(j+1)}$ may be implemented by, for example, power MOS transistors, IGBT, SI thyristor, etc. On the front stage (input side) of the high-voltage driver 34, a level shifter and a high-side circuit which is connected to the level shifter and operated by signals whose level is shifted to high-potential levels by the level shifter may be provided. In the cell $X_{ci(j-1)}$ on the i-th row illustrated on the left space in FIG. 16, the high-voltage driver 34 converts the low-voltage driving-signals at levels of 3.3 volts or less from the second chip 606 into high-voltage signals and applies to the lower electrode of the transmission element $231_{i(j-1)}$. FIG. 16 schematically illustrates the simplified structure under situation that the second chip 606 in the cell $X_{ci(j-1)}$ has the delay circuit 33 in the exciting circuit $T_{i(j-1)}$ and the amplifier 36 and the AD converter 37 in the reception circuit $R_{i(j-1)}$. For exciting the vibration membrane of the transmission element $231_{i(j-1)}$, since the high-voltage driver 34 in the cell $X_{ci(j-1)}$ is the circuit of the large-signal levels of 50 volts or more, for example, about 200 volts, the high-voltage driver 34 is merged in the first chip 605. On the contrary, since the delay circuit 33 in the cell $X_{ci(j-1)}$ is a circuit operated at lower voltages of less than 20 volts, for example, 3.3 volts or less, the delay circuit 33 is merged in the second chip 606.

The delay circuit 33 in the cell $X_{ci(j-1)}$ is the circuit for determining phases of the output signals of the high-voltage driver 34 in the cell $X_{ci(j-1)}$ and its operational timing. Although illustration is omitted, in the cell $X_{ci(j-1)}$, if the excitation row-selection element $TSW_{i(j-1)}$ is connected between the transmission elements $231_{i(j-1)}$ and the high-voltage driver 34, electric connections between the transmission elements $231_{i(j-1)}$ and the high-voltage driver 34 can be controlled by the excitation row-selection line $SW_i$, by connecting the excitation row-selection line $SW_i$ on the i-th row to a gate of the excitation row-selection element $TSW_{i(j+1)}$. The second chip 606 in the cell $X_{ci(j-1)}$ has the delay circuit 33 in the exciting circuit $T_{i(j-1)}$ and the amplifier 36 and the AD converter 37 in the reception elements $232_{i(j-1)}$.

A circuit configuration may be designed such that the column-selection element $TB_{i(j-1)}$ can be connected between the high-voltage driver 34 and the delay circuit 33. By applying the signals of the bit line $B_{(j-1)}$ on the (j–1)-th column to a gate of the column-selection element $TB_{i(j-1)}$, the electric conductions between the high-voltage driver 34 and the delay circuit 33 can be controlled, which can control the operations of the transmission element $231_{i(j-1)}$) at an intersection in the matrix on the i-th row and the (j–1)-th column. Similarly, if the receiving row-selection element $TRW_{i(j-1)}$ is connected between the reception element $232_{i(j-1)}$ and the amplifier 36, electric connections between the reception element $232_{i(j-1)}$ and the amplifier 36 can be controlled by the receiving row-selection line $RW_i$, by connecting the receiving row-selection line $RW_i$ on the i-th row to a gate of the receiving row-selection element $TRW_{i(j-1)}$. The small-signal outputs of the low-side circuit constructing the delay circuit 33 merged in the second chip 606 are transferred to the high-side circuit by a level shifter, which constructs the front stage of the high-voltage driver 34 merged in the first chip 605.

In the cell $X_4$ on the i-th row illustrated in the center space in FIG. 16, the high-voltage driver 34 converts the low-voltage driving-signals at levels of 3.3 volts or less from the second chip 606 into high-voltage signals and applies the high-voltage signals to the lower electrode of the transmission element $231_{ij}$. FIG. 12 schematically illustrates the simplified structure under situation that the third chip 603 in the cell $X_4$ has the delay circuit 33 in the exciting circuit $T_{ij}$ and the amplifier 36 and the AD converter 37 in the reception circuit $R_{ij}$. For exciting the vibration membrane of the transmission element $231_{ij}$, since the high-voltage driver 34 in the cell $X_{cij}$ is the circuit of the large-signal levels of 50 volts or more, for example, about 200 volts, the high-voltage driver 34 is merged in the first chip 605. On the contrary, since the delay circuit 33 in the cell $X_{cij}$ is a circuit operated at lower voltages of less than 20 volts, for example, 3.3 volts or less, the delay circuit 33 is merged in the second chip 606. The delay circuit 33 in the cell $X_{cij}$ is the circuit for determining phases of the output signals of the high-voltage driver 34 in the cell $X_{cij}$ and its operational timing. However, if the excitation row-selection element $TSW_{ij}$ is connected between the transmission element $231_{ij}$ and the high-voltage driver 34, electric connections between the transmission element $231_{ij}$ and the high-voltage driver 34 can be controlled by the excitation row-selection line $SW_i$, by connecting the excitation row-selection line $SW_i$ on the i-th row to a gate of the excitation row-selection element $TSW_{ij}$.

Although illustration is omitted in FIG. 16, A circuit configuration may be designed such that the column-selection element $TB_{ij}$ can be connected between the high-voltage driver 34 in the cell $X_{cij}$ and the delay circuit 33. By applying the signals of the bit line $B_j$ on the j-th column to a gate of the column-selection element $TB_{ij}$ in the cell $X_{cij}$, the electric conductions between the high-voltage driver 34 in the cell $X_{cij}$ and the delay circuit 33 can be controlled, which can control the operations of the transmission element $231_{ij}$, at an intersection in the matrix on the i-th row and the j-th column. Similarly, if the receiving row-selection element $TRW_{ij}$ is connected between the reception element $232_{ij}$ and the amplifier 36, electric connections between the reception element $232_{ij}$ and the amplifier 36 in the cell $X_{cij}$ can be controlled by the receiving row-selection line $RW_i$, by connecting the receiving row-selection line $RW_i$ on the i-th row to a gate of the receiving row-selection element $TRW_{ij}$. The small-signal outputs of the low-side circuit constructing the delay circuit 33 in the cell $X_{cij}$ merged in the second chip 606 are transferred to the high-side circuit by the level shifter, which constructs the front stage of the high-voltage driver 34 merged in the first chip 605.

The high-voltage driver 34 constructing the exciting circuit $T_{i(j+1)}$ in the $X_{ci(j+1)}$ is further provided in the first chip 605 in the $X_{ci(j+1)}$ on the i-th row illustrated on the right space in FIG. 16. The high-voltage driver 34 in the $X_{ci(j+1)}$ converts the low-voltage driving-signals at levels of 3.3 volts or less from the second chip 606 into high-voltage signals and applies to the lower electrode of the transmission element $231_{i(j+1)}$. FIG. 16 illustrates the simplified configuration such that the second chip 606 in the $X_{ci(j+1)}$ has the delay circuit 33 in the exciting circuit $T_{i(j+1)}$ and the amplifier 36 and the AD converter 37 in the reception circuit $R_{i(j+1)}$. For exciting the vibration membrane of the transmission element $231_{i(j+1)}$, since the high-voltage driver 34 in the cell $X_{ci(j+1)}$ is the circuit of the large-signal levels of 50 volts or more, for example, about 200 volts, the high-voltage driver 34 is merged in the first chip 605. On the contrary, since the delay circuit 33 in the $X_{ci(j+1)}$ is a circuit operated at lower voltages of less than 20 volts, for example, 3.3 volts or less, the delay circuit 33 is merged in the second chip 606. The delay circuit 33 in the $X_{ci(j+1)}$ is the circuit for determining phases of the output signals of the high-voltage driver 34 in the $X_{ci(j+1)}$ and its operational timing. However, if the excitation row-selection element $TSW_{i(j+1)}$ is connected between the transmission element $231_{i(j+1)}$ and the high-voltage driver 34 in the cell $X_{ci(j+1)}$, electric connections between the transmission element $231_{i(j+1)}$ and the high-voltage driver 34 can be controlled by the excitation row-selection line $SW_i$, by connecting the excitation row-selection line $SW_i$ on the i-th row to a gate of the excitation row-selection element $TSW_{i(j+1)}$.

As explained already, in the operations of the earlier capacitive acoustic-elements, as illustrated in FIG. 24B, the vibration membrane is excited only within the limited range in the full-span, and the full-span swing operation is not performed. In the AEIC pertaining to the third embodiment, the circuits merged in the first chip 605 and the circuits merged in the second chip 606 are classified based upon voltage levels of each operation voltages, thus, similarly to the AEICs pertaining to the first and second embodiments, the circuits of the large-signal levels can be stably operated without having influence on the circuits of the small-signal levels. Thus, according to the AEIC pertaining to the third embodiment, as illustrated in FIG. 22A, the high-voltage driver 34 can stabilize the output of large amplitude in which the high voltages of, for example, zero volt to 200 volts is excited at full-span swing. As a result, as illustrated in FIG. 22B, each vibration membrane of the two-dimensionally arranged transmission elements $231_{i(j-1)}$, $231_{ij}$, $231_{i(j+1)}$ . . . can be vibrated at the large amplitude.

A circuit configuration may be designed such that the column-selection element $TB_{i(j+1)}$ can be connected between the high-voltage driver 34 in the $X_{ci(j+1)}$ and the delay circuit 33. By applying the signals of the bit line $B_{(j+1)}$ on the (j+1)-th column to a gate of the column-selection element $TB_{i(j+1)}$ in the cell $X_{ci(j+1)}$, the electric conductions between the high-voltage driver 34 and the delay circuit 33 can be controlled, which can control the operations of the transmission element $231_{i(j+1)}$, at an intersection in the matrix on the i-th row and the (j+1)-th column. Similarly, if the receiving row-selection element $TRW_{i(j+1)}$ is connected between the reception element $232_{i(j+1)}$ and the amplifier 36, electric connections between the reception element $232_{i(j+1)}$ and the amplifier 36 can be controlled by the receiving row-selection line $RW_i$, by connecting the receiving row-selection line $RW_i$ on the i-th row to a gate of the receiving row-selection element $TRW_{i(j+1)}$. The small-signal outputs of the low-side circuit constructing the delay circuit 33 in the cell $X_{ci(j+1)}$ merged in the second chip 606 are transferred to the high-side circuit by the level shifter, which constructs the front stage of the high-voltage driver 34 merged in the first chip 605.

Although illustration is omitted in FIG. 16, one or more circuits among the circuits constructing the functional blocks embracing a reference clock-generator 31, the waveform generator 32, the timing adjuster 38 and the image processor 39 in the transmission/reception controller 30 explained in FIG. 8 may be merged in the second chip 606. In the AEIC pertaining to the third embodiment, the electronic circuits to be driven by higher voltages are merged in the first chip 605, and the electronic circuits to be driven by lower voltages are merged in the second chip 606. As just described, since depending on drive-voltage levels, the circuits constructing the respective functional blocks are sorted to the respective chips, the electronic circuits to be driven by higher voltages are merged in the wide-bandgap semiconductor substrate such as SiC, and the electronic circuits to be driven by lower voltages are merged in the Si substrate, in which circuit-integration process is easy and well refined, and accordingly, semiconductor materials can be selected. Also, since the electronic circuits to be driven by higher voltages are merged in the first chip 605 and the electronic circuits to be driven by lower voltages are merged in the second chip 606, the free degree in the layouts of circuits, which implement the respective functional blocks explained in FIG. 8, is improved.

Figure 17:
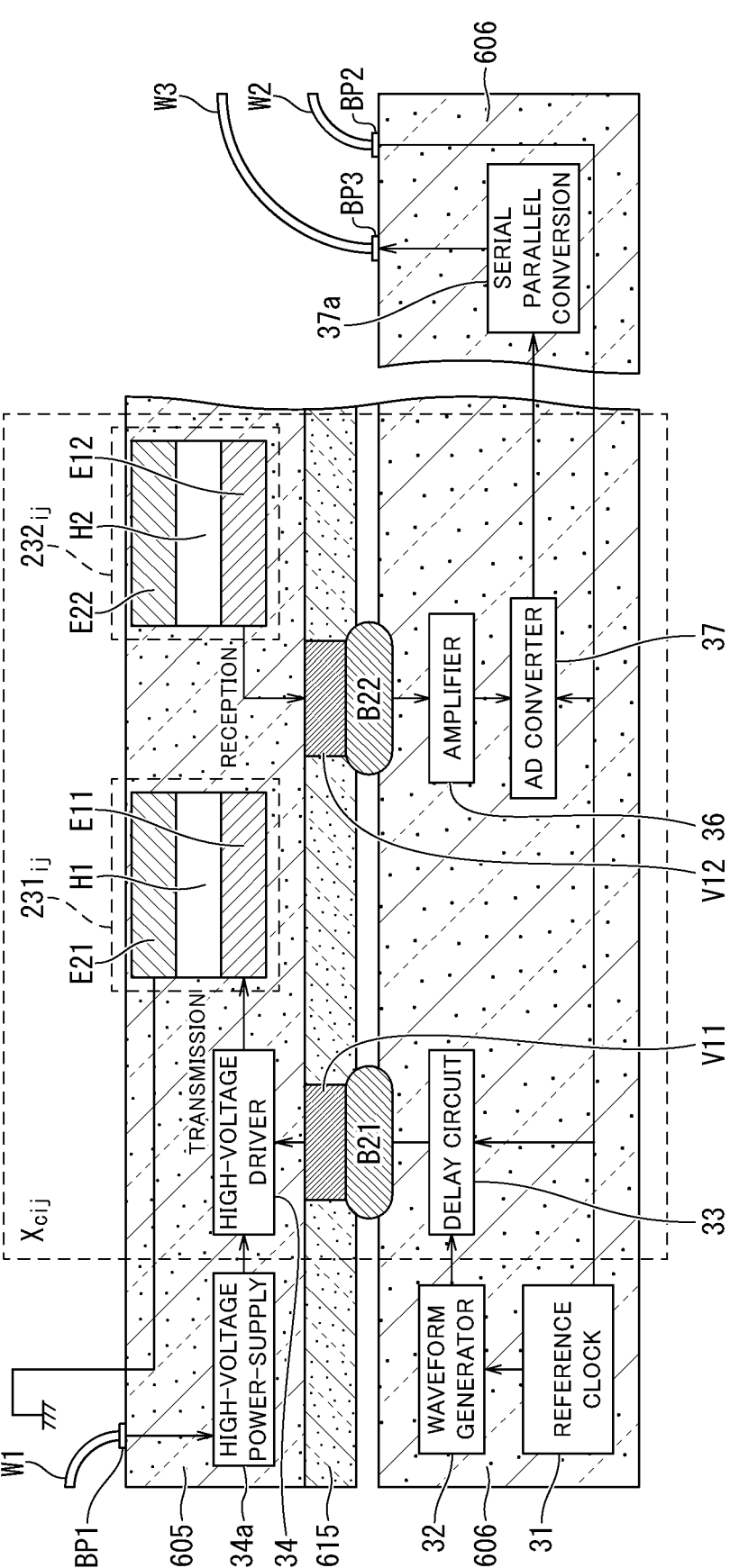
FIG. 17 is a schematic view including a block diagram to concretely realize the conceptual image illustrated in FIG. 16.

By using the configuration illustrated in FIG. 17, a concept of the schematic structure of the cell $X_{cij}$ is concretely exemplified, focusing to the cell $X_{cij}$ among the cells $X_{ci(j-1)}$, $X_{cij}$, $X_{ci(j+1)}$, . . . on the i-th row exemplified in FIG. 16. That is, in the cell $X_{cij}$ constructing the AEIC pertaining to the third embodiment, similarly to FIG. 16, the first chip 605 is stacked on the second chip 606. The first chip 605 is structured such that the high-voltage driver 34 arranged on the main surface of the semiconductor substrate 615 and the pair of the capacitive transmission element $231_{ij}$ for transmitting the ultrasonic waves and the capacitive reception element $232_{ij}$ for receiving the ultrasonic waves are merged in the semiconductor substrate 615. An excitation plug V11 and a receiving plug V12, each of which serves as TSV penetrating from the main surface to the bottom surface of the semiconductor substrate 615, are provided in the semiconductor substrate 615. In addition, in the AEIC pertaining to the third embodiment, the excitation plug V11 and the receiving plug V12 are called "connection-plugs (V11, V13)", collectively and generically.

The transmission element $231_{ij}$ has a transmission lower-electrode E11 connected to the high-voltage driver 34 and a transmission upper-electrode E21 arranged through the transmission cavity H1 on the transmission lower-electrode E11. The reception element $232_{ij}$ has a reception lower-electrode E12 connected to the receiving plug V12 and a reception upper-electrode E22 arranged through the reception cavity H2 on the reception lower-electrode E12. The transmission upper-electrode E21 and the reception upper-electrode E22 are connected to each other through the surface wirings whose illustration is omitted and further connected to a ground terminal (grounding bonding pad) provided at the end (periphery) of the first chip 605, through the surface wirings or buried wirings. The excitation plug V11 and the receiving plug V12 are allocated at positions with which the positions on the planar pattern of the transmission cavity H1 and the reception cavity H2 do not overlap. In the AEIC of the first embodiment, the problem such that the transmission cavity H1 and the reception cavity H2 are crushed, when the first chip 605 and the second chip 606 are stacked and electric inter-chip connection is performed by using the jointing member, has been solved by designing the positions of the excitation plug V11 and the receiving plug V12 on the planar layout exemplified in FIG. 1, In FIG. 17, although the first chip 605 is exemplified as the composite structure embracing a semiconductor substrate 615 and a semiconductor layer, in which the high-voltage driver 34 is merged, is connected to the main surface of the semiconductor substrate 615, the topology illustrated in FIG. 17 is merely a schematic model, and therefore, the structure of the first chip 605 is not limited to the topology illustrated in FIG. 17. For example, the first chip 605 may encompasses the semiconductor substrate 615 and a multi-level insulator structure deposited on the main surface of the semiconductor substrate 615, wherein the pair of the transmission element $231_{ij}$ and the reception element $232_{ij}$ is merged in the multi-level insulator structure. Also, as explained in FIG. 16, if the excitation row-selection element $TSW_{ij}$ is connected between the reception lower-electrode E12 and the high-voltage driver 34, electric connections between the transmission element $231_{ij}$ and the high-voltage driver 34 can be controlled by the excitation row-selection line $SW_i$, by connecting the excitation row-selection line $SW_i$ on the i-th row to a gate of the excitation row-selection element $TSW_{ij}$.

As described already, if the first chip 605 is made of wide-bandgap semiconductor substrate such as SiC, the circuits of the high-voltage driver 34 operated at higher voltages and the excitation row-selection element $TSW_{ij}$ can be merged in the first chip 605. In the exemplification illustrated in FIG. 17, the exciting plug V11 and the receiving plug V12 are represented as TSVs penetrating from the main surface to the bottom surface of the semiconductor substrate 615. However, when the first chip 605 is made of a monolithic semiconductor substrate such as the wide-bandgap semiconductor substrate, each of the exciting plug V11 and the receiving plug V12 becomes a blind via (dead-end via: does not do through all the way) that is not the TSV.

Also, if the output stage (final stage) of the high-voltage driver 34 is built by vertical MOS transistors, each of which has a first main electrode on the main surface of the semiconductor substrate 615 and a second main electrode on the bottom surface of the semiconductor substrate 615, even a structure that does not require the excitation plug V11 is possible. The first main electrode is either a source electrode or drain electrode of the MOS transistor, and the second main electrode becomes a drain electrode when the first main electrode is the source electrode, and the second main electrode becomes the drain electrode when the first main electrode is electrode drain electrode. Similarly, when the output stage of the high-voltage driver 34 is built by vertical bipolar transistors, vertical IGBTs and vertical SI thyristors, the excitation plug V11 may be made unnecessary.

As illustrated on the left space in FIG. 17, a high-voltage power-supply 34a is arranged at a left area from an element-array area in which the cells $X_{ci(j-1)}$, $X_{cij}$, $X_{ci(j+1)}$, . . . in the first chip 605 are arrayed in the shape of matrix. And, a bonding pad BP1, as illustrated on the left space in FIG. 17, is disposed on the top surface of the first chip 605, in a peripheral-circuit area in which the high-voltage power-supply 34a is arranged. A wire W1 is bonding-connected to the bonding pad BP1 on the top surface of the first chip 605. From the high-voltage power-supply 34a to which power is supplied through the wire W1, high voltages are supplied to the high-voltage drivers 34 in each of the cells $X_{ci(j-1)}$, $X_{cij}$, $X_{ci(j+1)}$, . . . arranged in the element-array area. The high-voltage driver 34 can generate signals of higher voltages, which facilitate full-span swing, for exciting the vibration membranes of each of the cells $X_{ci(j-1)}$, $X_{cij}$, $X_{ci(j+1)}$, . . . , in the first chip 605, as exemplified in FIG. 22A, FIG. 22B and FIG. 23A.

Although illustration of the bonding pad is omitted, a grounding bonding pad is provided adjacently to the bonding pad BP1, on the top surface of the first chip 605 in the peripheral-circuit area illustrated on the left space in FIG. 17. A grounding wire is bonding-connected to the grounding bonding pad. A ground potential though the grounding wire is branched through the surface wirings and the buried wirings, to each of the cells $X_{ci(j-1)}$, $X_{cij}$, $X_{ci(j+1)}$, . . . arranged in the element-array area, and connected to the transmission upper-electrodes E21 and the reception upper-electrodes E22 in each of the cells $X_{ci(j-1)}$, $X_{cij}$, $X_{ci(j+1)}$, . . . in the first chip 605. As a result, the transmission upper-electrodes E21 and the reception upper-electrodes E22 in each of the cells $X_{ci(j-1)}$, $X_{cij}$, $X_{ci(j+1)}$, . . . are commonly grounded.

As illustrated in FIG. 17, a high-voltage driver 34 is arranged in the region of the first chip 605 corresponding to a position of the cell $X_{cij}$. And, a delay circuit 33, an amplifier 36 and an AD converter 37 in the cell $X_{cij}$ are provided in the region of the second chip 606 corresponding to a position of the cell $X_{cij}$. In such a structure, since the high-voltage driver 34 connected to the high-voltage power-supply 34a is connected to the delay circuit 33 in the second chip 606 through the excitation plug V11, the high-voltage driver 34 can shift levels of the low-voltage driving-signals at levels of 3.3 volts or less, which are received from the delay circuit 33 in the second chip 606 to high-voltage signals. Although illustration is omitted, the circuit configuration may be further integrated to connect a column-selection element $TB_{ij}$ between the high-voltage driver 34 and the delay circuit 33 in the cell $X_{cij}$, and the circuit configuration may be designed to connect a receiving row-selection element $TRW_{ij}$ between the reception lower-electrode E12 and the amplifier 36.

Although illustration is omitted in FIG. 17, in the peripheral-circuit area close to the chip peripheral-edge of the second chip 606, the column-driver 302 and the row-driver 303, which are illustrated as the peripheral circuit in FIG. 2, are disposed to surround the element-array area 301a. If the signals of the excitation row-selection element $TSW_{ij}$ in the excitation row-selection line $SW_i$ on the i-th row delivered from the row-driver 303 is connected to a gate of the column-selection element $TB_{ij}$, the transmission element $231_{ij}$ in the cell $X_{cij}$ positioned at the intersection in the matrix can be selectively excited. Also, if the signals of the receiving row-selection line $RW_i$ on the i-th row delivered from the row-driver 303 is connected to a gate of the receiving row-selection element $TRW_{ij}$, the signals transferred from the respective transmission elements $231_{ij}$ arrayed on the i-th row are read out to the vertical-output signal-lines $R_1$, $R_2$, $R_3$, . . . , $R_{(j-1)}$, $R_j$, $R_{(j+1)}$, . . . by row unit. The excitation row-selection line $SW_i$, the receiving row-selection line $RW_i$ and the bit line $B_j$ can be made of surface wirings or the buried wirings in the second chip 606. Although illustration is omitted in FIG. 17, for example, when the multi-level interconnection structure is built by a plurality of inter-layer insulators on the top surface of the second chip 606, the excitation row-selection line $SW_i$, the receiving row-selection line $RW_i$ and the bit line $B_j$, can be arranged mutually between multi-layered insulators.

According to the configuration illustrated in FIG. 17, the electronic circuits in the high-voltage circuit such as the high-voltage driver 34 and the excitation row-selection element $TSW_{ij}$ which are driven by higher voltages can be merged in the first chip 605 made of wide-bandgap semi-conductor substrate. And, since the electronic circuits driven by lower voltages are merged in the second chip 606 using the Si substrate, the sorting of chips by operation voltages of electronic circuits can be carried out. In the peripheral-circuit area on the left of the element-array area in which the cells $X_{ci(j-1)}$, $X_{cij}$, $X_{ci(j+1)}$, . . . in the second chip 606 are arranged in the shape of matrix, the reference clock-generator 31 and the waveform generator 32 are provided as circuits in a common circuit portion.

In the peripheral-circuit area illustrated on the right of the element-array area in FIG. 17, the serial-to-parallel converter 37a is provided as a circuit in another common circuit portion. The serial-to-parallel converter 37a corresponds to the output-buffer circuit 304 illustrated as the peripheral circuit in FIG. 2, and for example, the serial-to-parallel converter 37a may be included as the intra-cell circuit of the output-buffer circuit 304. The serial-to-parallel converter 37a converts the parallel signals, which are read out by the vertical-output signal-lines $R_1$, $R_2$, $R_3$, . . . , $R_{(j-1)}$, $R_j$, $R_{(j+1)}$, . . . in FIG. 2 into the serial signals.

On the top surface of the second chip 606 corresponding to a position of the cell $X_{cij}$ illustrated in FIG. 17, inter-chip connector (connection mechanism) B21 and B22 are included on the connection lands whose respective illustrations are omitted. Even for the inter-chip connectors B21 and B22, jointing conductors, such as bumps, solders, or solder balls, etc., which enables the electric connection, can be employed. Moreover, as the inter-chip connector, in addition to the connection using the jointing members such as bumps, or the hybrid bonding, a method of directly bonding the first chip 605 and the second chip 606 to each other, by using the DSB method, can be employed. Moreover, the inter-chip connector may include the layer of the interposer which converts a pitch of a cell array of the first chip 605 and a pitch of a cell array of the second chip 606. That is, the pitch of the cell array of the first chip 605 is made finer and finer, thereby improving the resolution, while the cell array of the second chip 606 in which the cell size is made large by giving some margin to the pitch, thereby connecting the first chip 605 and the second chip 606 through the interposer.

The connection land, which mounts the inter-chip connector B21, is connected to the delay circuit 33 through intra-chip wirings such as connection-plugs whose illustrations are omitted. The connection land, which mounts the inter-chip connector B22, is connected to the amplifier 36 through intra-chip wirings such as connection-plugs whose illustrations are omitted. As illustrated in FIG. 17, the inter-chip connectors B21 and B22 are connected to the exciting-circuit plug V21 and the receiving-circuit plug V22, respectively, which are provided in the bottom surface of the first chip 605. As a result, with the inter-chip connection by the pressure-welding via the jointing members such as bumps, electric connection from the amplifier 36 in the second chip 606 is made to penetrate the first chip 605, and further, to reach to the reception lower-electrode E12 in the reception element $232_{ij}$.

And, the bonding pads BP1 and BP2 are delineated on the top surface of the second chip 606 corresponding to the right peripheral-circuit area in which the serial-to-parallel converter 37a is arranged. The wire W2 is bonding-connected to the bonding pad BP2, and the wire W3 is bonding-connected to the bonding pad BP3. Although the physical illustration of concrete wiring structure is omitted, the bonding pad BP2 is connected to the reference clock-generator 31, the delay circuit 33 and the AD converter 37 through the surface wirings and the inner-buried wirings. Thus, the operations of the respective electronic circuits in the reference clock-generator 31, the delay circuit 33 and the AD converter 37 are controlled based upon the control signals entered to the second chip 606 through the wire W2. The parallel signals read out by the vertical-output signal-lines $R_1$, $R_2$, $R_3$, . . . , $R_{(j-1)}$, $R_j$, $R_{(j+1)}$, . . . in FIG. 2 are converted into the serial signals by the serial-to-parallel converter 37a, and delivered to the image processor 39 through the timing adjuster 38 illustrated in FIG. 8 through the wire W3, and imaging process is performed by the image processor 39.

FIG. 17 illustrates an example focusing to the cell $X_{cij}$ among the cells $X_{ci(j-1)}$, $X_{cij}$, $X_{ci(j+1)}$, . . . constructing the 2D matrix deployed on the coplanar surface, corresponding to the element-array area 301a illustrated in FIG. 1 and FIG. 2 and the functional blocks corresponding to the transmission element $231_{ij}$ in the cell $X_{cij}$ are divided into the first chip 605 and the second chip 606 and integrated in the 3D structure. That is, according to the AEIC pertaining to the third embodiment, for the respective transmission elements $231_{i(j-1)}$, $231_{ij}$, $231_{i(j+1)}$, . . . in the cells $X_{ci(j-1)}$, $X_{cij}$, $X_{ci(j+1)}$, . . . , which are arrayed in the 2D matrix, the exciting circuits $T_{i(j-1)}$, $T_{ij}$, $T_{i(j+1)}$, . . . and the reception circuits $R_{i(j-1)}$, $R_{ij}$, $R_{i(j+1)}$, . . . are divided into the first chip 605 and the second chip 606 and integrated as the 3D structure, and accordingly, the transmission-and-reception operations as the 2D phased-array for each of the transmission elements $231_{i(j-1)}$, $231_{ij}$, $231_{i(j+1)}$, . . . can be controlled. As just described, in the AEIC pertaining to the third embodiment, because the operations of the 2D phased-array are possible, the diagnosis with high precision and high resolution can be achieved. In addition, in the case of the 2D phased-array, the transmission upper-electrode E21 can be common in all transmission elements. However, instead of the operation of the 2D phased array, at least one of the transmission lower-electrode E11 and the transmission upper-electrode E21 can be changed to the driving by row unit or column unit.

Other Embodiment

As mentioned above, although the present invention has been illustratively explained based upon the first to third embodiments, the discussions and drawings which serve as a part of the disclosure should not be understood to limit the present invention. Various alternative embodiments, implementations and operational techniques will be apparent for those skilled in the art from the disclosure. For example, the case in which double or triple semiconductor chips are stacked is explained in the first to third embodiment. However, a plurality of more semiconductor chips may be stacked. In addition, CMUT is known as the capacitive acoustic-elements. However, in a case of an element having a capacitive cavity that can be vibrated, the present invention can be applied to MEMS elements other than the CMUT.

In the AEICs pertaining to the first to third embodiments, the cases are exemplified in which, regarding the array of the cells constructing the 2D matrix deployed on the coplanar surface, a single acoustic-element is allocated to each of the cells, and the single acoustic-element is driven by the intra-cell circuits. However, regarding the technical idea of the present invention, single cell is implemented by a set of a plurality of acoustic-elements arranged in parallel, and the plurality of acoustic-elements arranged in parallel may be driven by a single intra-cell circuit assigned as the intra-cell circuit, corresponding to the single cell.

In the AEICs pertaining to the first to third embodiments, the configurations are explained in which the cell at any intersection in the matrix can be selected in the element array constructing 2D matrix deployed on the coplanar surface. However, a mode is possible in which all cells arrayed on the rows of the matrix are respectively excited for each row, and the cells arrayed on the respective rows are sequentially excited by a delay circuit. Or alternatively, another mode is possible in which cells arrayed on the columns of the 2D matrix are respectively excited for each column, and the cells arrayed in the respective columns are sequentially excited by a delay circuit. Especially, in the case of the AEICs pertaining to the second and third embodiments, the transmission and reception elements can be operated separately, which enables a global operation in which all transmission elements are operated simultaneously. By the global operation, the ultrasonic waves of the same phase are emitted from all cells simultaneously, and regarding signal waves returned from a target, reception elements arranged in the shape of 2D matrix are operated independently from each other, and the respective cells . . . , which are arrayed in the 2D matrix can be swept, and the signal from the reception elements are processed as an image. By using a transit time effect in the sweeping of the 2D matrix, a 3D image of the target can be acquired.

Figure 18A:
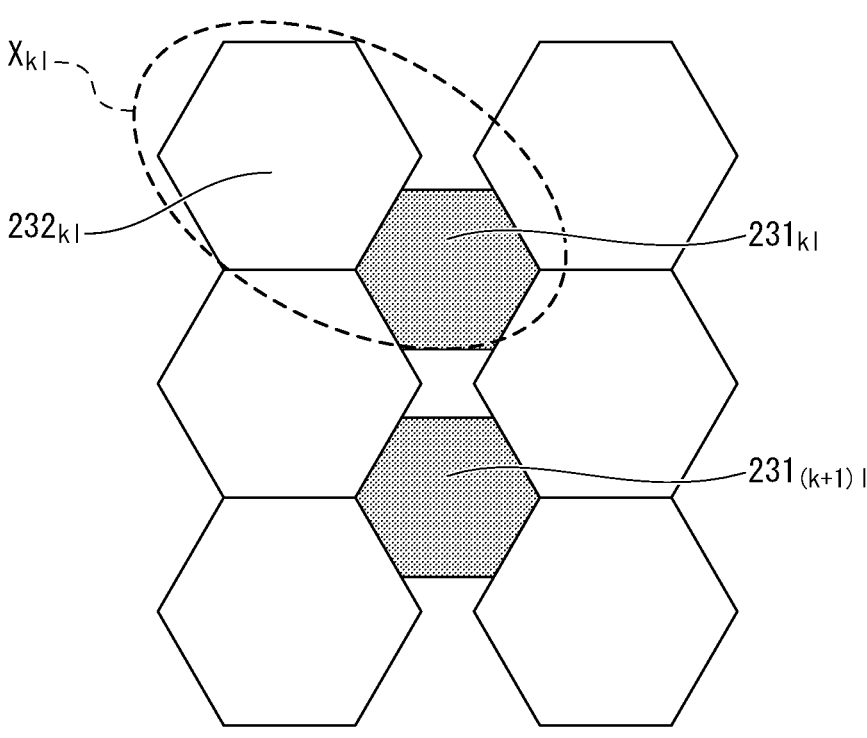
FIG. 18A is a plan view illustrating an example of an element array, in a case when integrated size of the transmitting and reception elements differ from each other, while both are equal in hexagonal shape.

In the AEIC pertaining to the second embodiment, a case is exemplified by using the configuration illustrated in FIG. 9 in which the shape of the planar pattern of each of the transmission element $231_{ij}$ and the reception element $232_{ij}$ is hexagonal and the sizes of the transmission element $231_{ij}$ and the reception element $232_{ij}$ are equal. However, as illustrated in FIG. 18A, from a viewpoint of sufficiently securing the mechanical strength for a transmission element $231_{k1}$, the size of the transmission element $23_{k1}$ may be small than the size of the reception element $232_{k1}$.

Figure 18B:
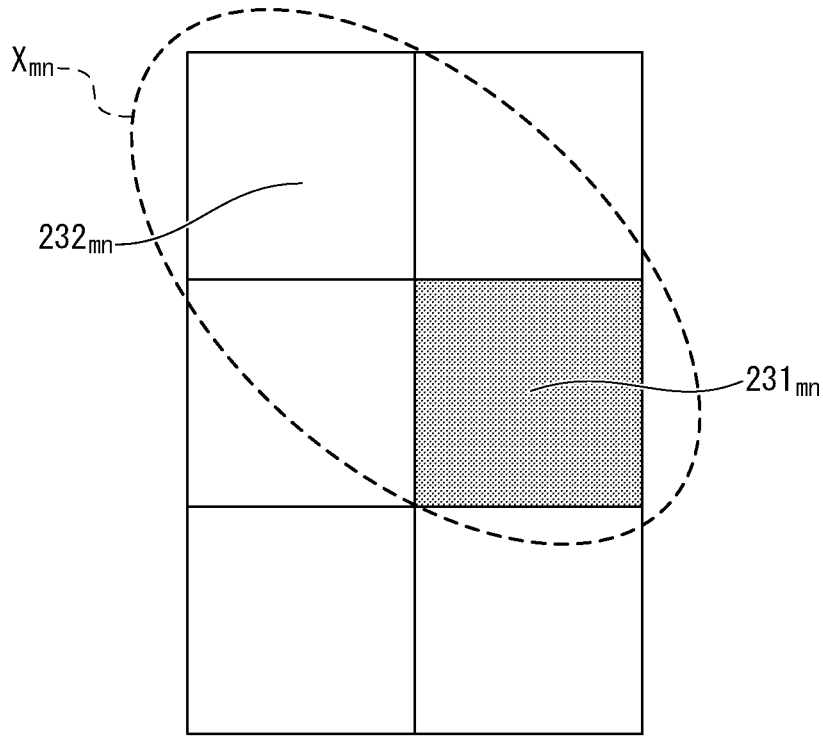
FIG. 18B is a plan view illustrating an example of an element array, in a case when integrated number of the transmitting and reception elements differ from each other, while both are equal in rectangular shape.
Figure 18C:
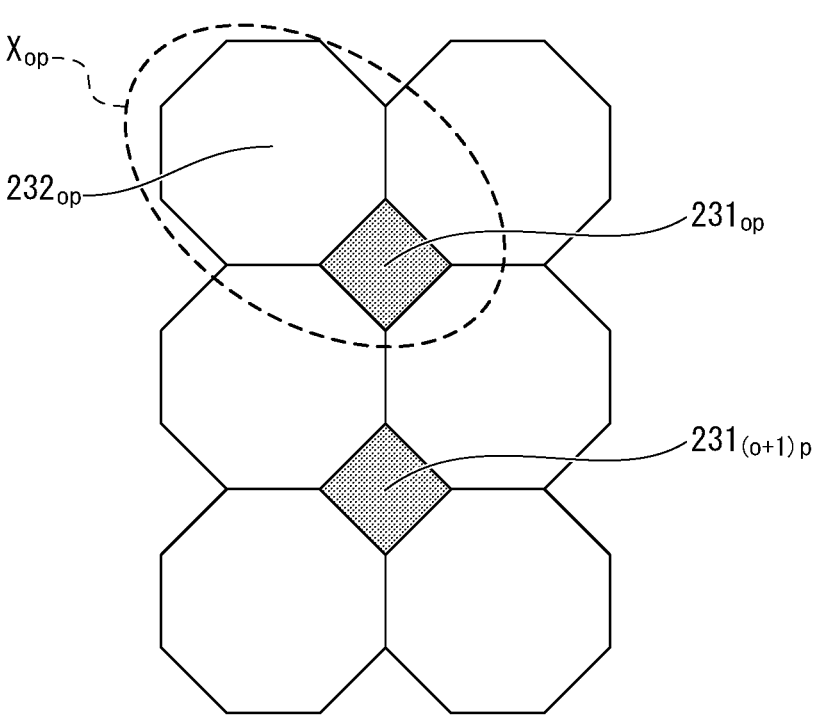
FIG. 18C is a plan view illustrating an example of an element array, in a case when both integrated shape and size of the transmitting and reception elements differ from each other.

Also, as illustrated in FIG. 18B, from a viewpoint of improving an area efficiency, each shape of acoustic-elements $231_{mn}$ and $232_{mn}$ can be made rectangular. Moreover, as illustrated in FIG. 18C, the shape of a transmission element $231_{op}$ can be made to differ from the shape of the reception element $232_{op}$. In an example of FIG. 18C, the shape of the transmission element $231_{op}$, is diamond-like or rectangular. Also, in the example of FIG. 18C, an area ratio between the transmission elements $231_{op}$ and the reception element $232_{op}$ are adjusted by providing the transmission element $231_{op}$ between the reception elements $232_{op}$. That is, an effectiveness of improving the free degree of the designs of the acoustic-elements is achieved.

Figure 18D:
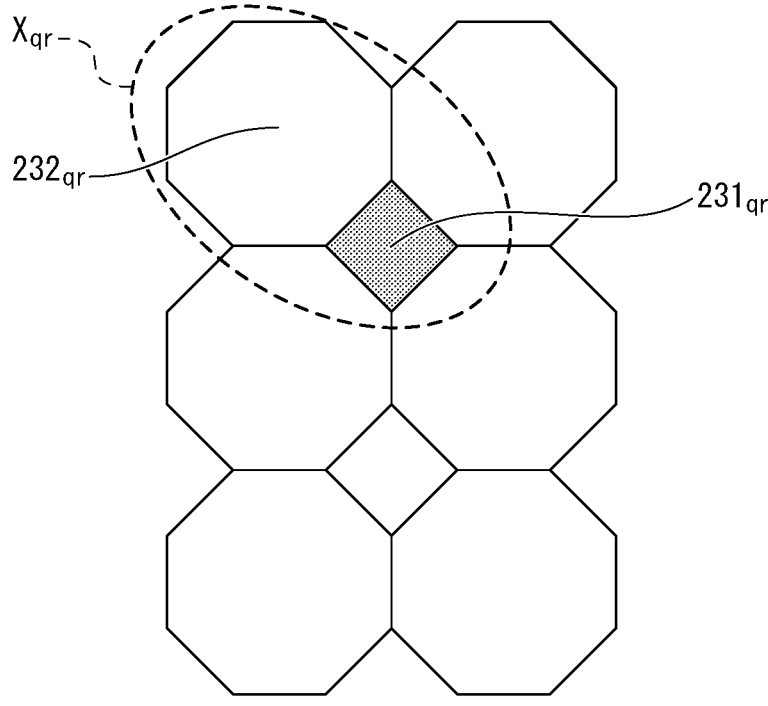
FIG. 18D is a plan view illustrating another example of an element array, in a case when both shape and size of the transmitting and reception elements differ from each other.

Moreover, as illustrated in FIG. 18D, the shape of a transmission element 231$_{qr}$ can be made to differ from the shape of a reception element 232$_{qr}$. Although even in the example of FIG. 18D, the shape of the transmission element 231$_{qr}$ is lozenge-like or rectangular, the shape of the reception element 232$_{qr}$ is octagonal whose area is larger in area than the transmission elements 231$_{qr}$. In a planar topology illustrated in FIG. 18D, since the transmission elements 231$_{qr}$ is provided between the reception elements 232$_{qr}$ or is not provided, the area ratio between the transmission elements 231$_{qr}$ and the reception element 232$_{qr}$ can be easily adjusted. That is, the free degree of the array of the acoustic-elements is improved by employing the planar layout illustrated in FIG. 18D and making the pitch of the 2D array of the transmission elements 231$_{qr}$ differ from the pitch of the 2D array of the reception elements 232$_{qr}$.

Although, as an example topology, in which the transmission element 231$_{qr}$ is provided at a position adjacent to the lower right site of the reception element 232$_{qr}$ is illustrated on the upper space in FIG. 18D, the reception elements can be allocated in a space of an octagon just under the reception element 232$_{qr}$. In a case that the reception element is arrayed in a space of an octagon just under the second reception element 232$_{qr}$ from the top, a topology in which transmission element is not arranged can be employed for a space of a lozenge, which allocates the second octagon at a site adjacent to the lower right of the lozenge. In the topology in which transmission element is not arranged in the site of the lozenge, as indicated in the third embodiment, the high-voltage driver (vibration-membrane driver) 34 can be arranged in the site of the lozenge, which allocates the second octagon at the site adjacent to the lower right of the lozenge. Because there is a case that the high-voltage driver 34 handling high voltages generates a large amount of heat, the heat dissipation efficiency of the high-voltage driver 34 can be improved by arranging the high-voltage driver 34 in the first chip 605 as indicated in the third embodiment.

Figures 18E, 19:
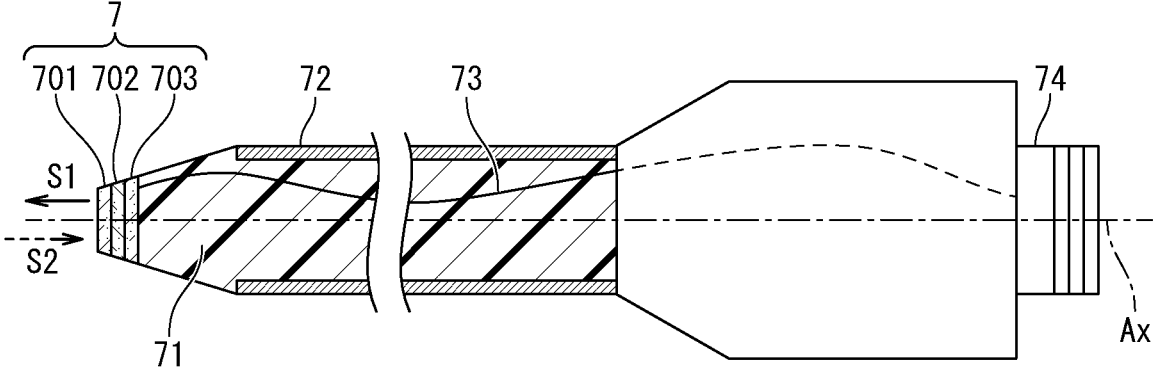
FIG. 18E is a plan view illustrating a still another example of an element array, in a case when both shape and size of the transmitting and reception elements differ from each other.
FIG. 19 is a schematic view exemplifying an outline of a structure of hydrophone, as an application example of an AEIC pertaining to the other embodiment.

Moreover, as illustrated in FIG. 18E, a shape of a transmission element 231$_{sta}$ can be pentagonal, and a shape of a reception element 232$_{st}$ can be octagonal. Pentagonal dummy patterns 231$_{stb}$ having the same size as the transmission elements 231$_{sta}$ are prepared in a fractal tiling topology illustrated in FIG. 18E. And, the transmission elements 231$_{sta}$ and the dummy patterns 231$_{stb}$ are paved with nonempty interior in the array of reception elements 232$_{st}$ that have large size. For example, in the AEIC pertaining to the third embodiment, a structure in which the high-voltage driver 34 is arranged in the first chip 605 is explained, as exemplified in FIG. 16 and FIG. 17. In the case in which the high-voltage drivers 34 can be arranged in the first chip 605, the high-voltage drivers 34 may be merged in the spaces of the dummy pattern 231$_{stb}$. The high-voltage driver 34 can be arranged in the first chip 605, such as the structure exemplified in the third embodiment. Although a heat dissipation efficiency of the high-voltage driver 34 can be improved by arranging the high-voltage driver 34 in the first chip, by using the fractal tilling topology illustrated in FIG. 18E, an area ratio between the transmission element 231$_{sta}$ and the reception element 232$_{st}$ and an area ratio between the transmission element 231$_{sta}$ and the dummy pattern 231$_{stb}$ can be adjusted, and therefore, an area utilization efficiency in the planar layout can be improved.

In the planar layout illustrated in FIG. 18D and FIG. 18E, although a case is exemplified in which the shape and size of the transmission element 231$_{qr}$ differ from those of the reception element 232$_{qr}$, spatial periods and pitches of the arrays of the transmission elements 231$_{sta}$ may be made larger than those of the reception element 232$_{qr}$ even in a case that the transmission element 231$_{qr}$ and the reception element 232$_{qr}$ are equal in shape and size. For example, in the planar layout exemplified in FIG. 9 and FIG. 18E, when the vertical directions on papers are defined as "column directions", a pitch of the arrays of the transmission elements 231$_{qr}$ in the column direction may be set to integer times of the pitch of the arrays of the reception elements 232$_{qr}$. Or alternatively, the pitch of the arrays of the transmission elements 231$_{qr}$ in the row direction may be set to the integer times of the pitch of the arrays of the reception elements 232$_{qr}$. Then, in both of column and the row direction, the pitch of the arrays of the transmission elements 231$_{qr}$ may be made larger than the pitch of the arrays of the reception elements 232$_{qr}$.

Considering the feature that the pitch of the arrays of the transmission elements 231$_{qr}$ is larger than the pitch of the arrays of the reception elements 232$_{qr}$ two kinds of the cells can be regarded to be mixed in the array of the cells constructing the 2D matrix deployed on the coplanar surface. That is, a first kind of the cells, in which each the acoustic-elements implemented by module embracing a pair of the transmission elements 231$_{qr}$ and the reception element 232$_{qr}$ are allocated as explained in the AEICs in the second and third embodiments, and a second kind of the cells, in which only the reception elements 232$_{qr}$ are arranged, are mixed in the respective cells, and thereby the respective cells constructing the 2D matrix. In the case that first and second kind of the cells are mixed, two kinds of intra-cell circuits for driving the module embracing the transmission element 231$_{qr}$ and the reception element 232$_{qr}$ and for driving the cell in which only the reception elements 232$_{qr}$ are arranged are mixed, thereby constructing non-uniform 2D matrix.

Especially, as explained in the AEICs pertaining to the first to third embodiments, since a chip in which large-signal circuits are merged and a chip in which small-signal circuits are merged are sorted based upon the voltage levels, the full-span swing output of the high-voltage signals as illustrated in FIG. 22A becomes possible without having influence on the circuits of small-signal levels. Therefore, it has a feature that as illustrated in FIG. 22B, the vibration close to the full-span swing becomes possible, which increases the output intensity of the ultrasonic waves from each of the transmission elements. If the output intensity of the ultrasonic waves of each of the transmission elements becomes large, the number of the arrays of the transmission elements can be made smaller than the number of the arrays of the reception element, relatively. Thus, a non-uniform 2D matrix can be constructed.

Also, although the AEICs have been assumed to be mainly applied to medical fields in the first to third embodiments, the AEICs can be used in the other fields such as underwater hydrophones, from a viewpoint of acoustic impedance. That is, the AEICs explained in the first to third embodiments indicate the excellent pulse response properties because the acoustic impedances are close to the intrinsic impedance of water. Thus, the capacitive acoustic-elements do not require the packing architecture. And, the capacitive acoustic-elements, since having the properties that has high sensitivity, wide band and low output impedance, is preferable for the application as the hydrophone.

An AEIC 7 is fixed to a tip of a resin horn illustrated as a truncated-cone shape on the left space in FIG. 19. In the same ways to the explanations in the first and second embodiments, for example, the AEIC 7 in FIG. 19 can encompass a first chip 701, a second chip 702 and a third chip 703. In an architecture illustrated in FIG. 19, corresponding to the shape of the horn, in an order starting from the left, the second chip 702 is larger in outer diameter than the first chip 701, and the third chip 703 is larger in outer diameter than the second chip 702. In a case of a stacked structure in which the outer diameter is gradually large as mentioned above, the layers of the interposers for performing the pitch conversion may be inserted between the first chip 701 and the second chip 702 and between the second chip 702 and the third chip 703, respectively.

For example, similarly to the illustrations in FIG. 5, FIG. 13 and FIG. 17, the second chip 702 can be grounded at the tip of the resin horn. A resin cylindrical portion is attached to be continuous on a side opposite to the left tip of the resin horn, at which the diameter of the resin horn is thick. As illustrated in FIG. 19, the resin horn, the resin cylindrical portion that are continuous to the resin horn and a cylindrical enclosure 72 accommodating the resin cylindrical portion in the cylindrical enclosure 72 are assembled, thereby constructing the main body (71, 72) of the hydrophone. In the hydrophone illustrated in FIG. 19, the first chip 701 transmits ultrasonic waves B1 to a target-to-be-inspected and detects ultrasonic waves s2 reflected from the target-to-be-inspected.

The cylindrical enclosure 72 of the hydrophone illustrated in FIG. 19 has an external-connection terminal 74 on the end side opposite to the tip side along an axial direction. The external-connection terminal 74 is a connector scheduled to be connected to a propagation path, such as a co-axial cable, and through propagation path, the external-connection terminal 74 is scheduled to be connected to an observation instrument, although the illustrations of the propagation path and the observation instrument are omitted. Since the AEIC 7 and the external-connection terminal 74 are connected through a lead line 73, the output of the AEIC 7 is introduced to the external-connection terminal 74. By including the propagation path connected to the external-connection terminal 74 on the other end side of the main body (71, 72) and the observation instrument connected to the propagation path, the 2D signals of the ultrasonic waves s2 reflected from the target-to-be-inspected can be observed. In the underwater application, a pressure balance structure to protect influences of water pressure is required. Thus, it becomes important to optimize the thickness of the vibration membrane and the size of the vibration-cavity, based upon working frequencies. Also, since the underwater application uses the ultrasonic waves of low frequencies as compared with the medical field, the size of the vibration-cavity becomes larger and an inter-electrode distance becomes wider, thereby requiring higher bias voltages.

In the explanations of the AEICs pertaining to the first to third embodiments, the shape of rectangular array based upon the X-Y orthogonal coordinate system (Descartes coordinate system) illustrated in FIG. 1 and FIG. 2 is explained as a benchmark. When the AEIC is placed at the tip of the horn, having the truncated-cone shape as illustrated in FIG. 19, there may be a case that a shape of the main surface of the AEIC 7 is circular is desired. When the outer shape of the main surface of the AEIC 7 is circular, instead of the Descartes coordinate system as the 2D array, a layout defined in polar coordinates is used, and a plurality of acoustic-elements may be arrayed concentrically. The polar coordinates in 2D Euclidean space are also called circular coordinates, and composed of one radial coordinates r and one angular coordinates 0. The polar coordinates (r,θ) and the orthogonal coordinates (x,y) can be mutually converted if one of the polar coordinates (r,θ) and the orthogonal coordinates (x,y) is known from the following relations:

$$x = r \cos \theta \tag{4}$$

$$y = r \sin \theta \tag{5}$$

$$r = x^2 + y^2 \tag{6}$$

$$\tan \theta = y/x \tag{7}$$

However, when the cells each having the same unit area are arrayed concentrically, the number of the cells arrayed along a circumference $2\pi r$ of a circle with radius r will be different, depending on a length of radius r, and the number of driving lines in radius directions also depends on the length of radius r. Also, when the cells are individually driven in the 2D layout on polar coordinates, by considering a feature that the number of the cells arrayed along the circumference $2\pi r$ is different depending radius r, some ingenuity is required to adjust the timings of a driving driver in radius directions and a driving driver in circumferential directions (argument directions). Each acoustic-elements in the cells concentrically arrayed in the orthogonal coordinate system may be driven by using Eq. (4) to Eq. (7) and converting the array in the polar coordinate system into the orthogonal coordinate system.

Moreover, the technical ideas of the AEICs pertaining to the first to third embodiments can be expanded to an architecture in which a plurality of acoustic-elements is 2D arrayed on the same curved surface such as a cylindrical surface, a spherical surface, an elliptical surface, a parabolic surface, or the like. When it is necessary to array a plurality of acoustic-elements on the inner wall of a partial cylindrical surface such as a half to a quarter of cylindrical surface, for the sake of imaging the blood vessels, cells, or the like of an arm, a cylindrical coordinate system may be used. When an array design of AEIC, in which a plurality of acoustic-elements is arrayed on an inner wall of a partial spherical surface, such as a one third to one seventh of spherical surface, is required for the sake of imaging abnormal cells of breast such as breast cancer, a spherical coordinate system may be used. Or, when a plurality of acoustic-elements is designed to be arrayed on an inner wall of elliptic or parabolic surface, there is a case that elliptic coordinate system or parabolic coordinate system is preferable. Even in the cylindrical, spherical, elliptical or parabolic coordinate system, the plurality of acoustic-elements arranged two-dimensionally on the same curved surface can be drove individually and respectively, by separating variables into two components equivalent to x and y used in the Descartes coordinate system.

For example, when the cylindrical, spherical, elliptical, or parabolic coordinate system is variable-separated into each corresponding two components, a driver for selecting the individual acoustic-element is prepared for each of the variable-separated components, and the wiring of the two components is designed in view of corresponding topology, the acoustic-elements can be two-dimensionally driven individually even in the cylindrical, spherical, elliptical, or parabolic coordinate system. Moreover, the technical ideas explained in the AEICs pertaining to the first to third embodiments can be applied to various coordinate systems in which Helmholtz decomposition pointed out by L. Eisenhart is possible, such as cylindrical elliptic, cylindrical parabolic, elongated spheroidal, oblate spheroidal, confocal ellipsoid, and conical coordinate system, depending on the symmetries inherent in the curved surfaces.

The delay circuits 33 illustrated in FIG. 3 to FIG. 5, FIG. 8, FIG. 12, FIG. 13, FIG. 16 and FIG. 17 may be replaced by waveform generators 33. By using the waveform generators 33 instead of the delay circuits 33 and delaying the timings of waveform generations by the waveform generator 33, the functions equivalent to the delay circuits 33 can be achieved. For example, a trigger for informing individual cells of transmission timings can be sent by selecting the rows and columns of the 2D matrix, and waveforms can be generated and sent to the individual cells immediately after the triggers are received. At current technical level, in a matrix of m×n=32×32, transmission of the waveforms to all cells simultaneously on the entire surface is difficult. However, if 1024 clocks are sequentially scanned, the scanning at sufficiently high speed as compared with the propagation velocities of the ultrasonic waves can be achieved.

The high-voltage drivers 34 illustrated in FIG. 3 to FIG. 5, FIG. 8, FIG. 12, FIG. 13, FIG. 16 and FIG. 17 may be configured such that the bias voltages can be changed for each of the 2D arrayed cells. For example, the transmission/ reception controllers 30 illustrated in FIG. 3 and FIG. 8 may be configured such that the transmission outputs of the acoustic-elements are made high to be able to change the bias voltages of the high-voltage drivers in each of the cells, while the receiving sensibilities of the acoustic-elements are also made high. Manufacturing variations exist in the membrane thicknesses of the vibration membranes of the acoustic-elements. When distributions or non-uniformities exist in the membrane thicknesses of the vibration membranes of the acoustic-elements, the bias voltages optimal for each of the 2D arrayed cells are different. Therefore, shipping processes are carried out so that shipped products have margins, and therefore the bias voltages of the shipped products are set lower values. And, if a user optimizes the individual bias voltages to a limit of the optimization of the shipped product, as functions of the transmission/reception controller 30, taking advantages of the structures incorporating high-voltage drivers in each of the cells, the transmitting intensities and receiving sensitivities of the acoustic-elements in each of the cells can be made high and uniform. The above principle of the optimization is same as the principles of the high-end products such as optical image sensors and liquid crystal displays. In optical image sensors and liquid crystal displays, the linearity data of light-receiving sensitivities and light-emitting intensities are acquired for each of units the high-end products in pre-shipment inspections, and calibration tables are created and stored in a controller of the high-end products. Then, a user may improve white balance, etc. anywhere on the entire screen by stored calibration tables.

In addition, regarding the thicknesses of the vibration membranes of the reception elements explained in the AEICs pertaining to the second and third embodiments, by making the center of the vibration membrane thick and making the outer circumference of the vibration membrane thin, the reception elements will become easy to vibrate, and the sensibility of the reception elements can be made high. For example, to cancel the thickness difference between the thick first sacrificial layer (105, 106a) and the thin second sacrificial layer 106b, the thickness of the reception lower-electrode 103b is deposited thicker than the transmission lower-electrode 103a, at the process step illustrated in FIG. 14A in advance. And, at the process step illustrated in FIG. 14B, the processing such as the selective etching is performed on the upper portion of the second sacrificial layer 106b, and regarding the thickness of the second sacrificial layer 106b, the center of the second sacrificial layer 106b is made thin and the outer circumference of the second sacrificial layer 106b is made thick as the structure of the of the second sacrificial layer 106b. After that, at the process step illustrated in FIG. 14D, in such a way that the thicknesses of the second vibration membranes 108 above the first sacrificial layer (105, 106a) and the thin second sacrificial layer 106b becomes equal in level by the method such as the CMP. Then, the structure in which the center thickness is thick and the outer circumference thickness is thin can be established as the shape of the vibration membrane 108 on the second sacrificial layer 106b.

In the capacitive acoustic-elements, hardnesses differ depending on the thicknesses of the vibration membranes. By making the thickness at the center of the vibration membrane of the acoustic-element thick, the deflection amount of the vibrating membrane is made different. When the thickness of the vibration membrane of the acoustic-element is locally changed, the amount of deflection is large in the thin portion of the outer periphery, and the thick portion in the center is changed to be relatively parallel to the lower portion of the cavity, so that the capacitance variation of the acoustic-element can be increased and the receiving sensitivity is improved. However, in the case of a structure in which the thickness of the vibration membrane of the reception element is increased at the center and decreased in the outer circumference, a new problem arises in that the manufacturing variations are increased as compared with the case when the thickness of the vibration membrane of the reception element is constant. Accordingly, if the bias voltages of the high-voltage drivers 34 shown in FIG. 3 to FIG. 5, FIG. 8, FIG. 12, FIG. 13, FIG. 16, FIG. 17, etc., are individually tuned to eliminate the problem of manufacturing variations as mentioned above, the transmission intensities and the reception sensitivities of the acoustic-elements of the respective cells can be made high and uniform.

In the AEIC pertaining to the third embodiment, the case is explained in which SiC or diamond is used for the first chip 605, and the vibration membranes of the transmission elements $231_{i(j-1)}$, $231_{ij}$ and $231_{i(j+1)}$ and the reception elements $232_{i(j-1)}$, $232_{ij}$ and $232_{i(j+1)}$ are replaced by hard material of SiC or diamond. Even in the AEICs pertaining to the first and second embodiments, if SiC or diamond is used in the first chips 501 and 601, the vibration membranes of the acoustic-elements can be changed to hard material of SiC or diamond. Also, even in a case that SiC or diamond is not used in the first chips 501 and 601, by including the material having a high Young's modulus and a high bending strength in the manufacturing step of the first chips 501 and 601, even when higher voltages are applied to the upper electrode and the lower electrode, by making the membrane thickness thin and making the breakdown-voltage high, it becomes easy to generate the strong vibration.

Moreover, in the present invention, parts of the technical ideas explained in the first to third embodiments as mentioned above can be appropriately combined. For example, a part of the technical idea of the AEIC of the first embodiment and a part of the technical idea of the AEIC pertaining to the third embodiment can be appropriately combined. That is, an architecture such that the bidirectional acoustic-element having the transmitting/reception function explained in the AEIC of the first embodiment is merged in the first chip 605 in the AEIC pertaining to the third embodiment together with the high-voltage driver 34 can be employed. In the architecture, the reception circuit may be merged in the second chip 606 together with the delay circuit or waveform generator constructing the exciting circuit.

Thus, it should be noted that the present invention is not limited to the description of the first to third embodiments described above, and various modifications can be made, which are also included within the scope of the invention. Therefore, the scope of the present invention is defined only by the technical features specifying the present invention, which are prescribed by claims.

What is claimed is:

1. An acoustic element integrated circuit including a plurality of cells, being arrayed two-dimensionally on a same curved surface, wherein capacitive acoustic-elements having vibration membranes are allocated by unit number in each of the cells, each of the cells comprising an intra-cell circuit including:

an exciting circuit configured to drive collectively portions by a set of the unit number, each of the portions having a transmitting function of each of the capacitive acoustic-elements, and a reception circuit configured to process collectively received signals transferred from portions by a set of the unit number, each of the portions having a reception function in each of the capacitive acoustic-elements, and wherein the exciting circuits are sorted into a chip in which high-voltage drivers for exciting the vibration membranes are merged and a chip in which circuits operated at voltages lower than the high-voltage drivers are merged, and the plurality of the cells are operated two-dimensionally, by individually controlling the intra-cell circuits so that the plurality of cells can be driven independently from each other.

2. The integrated circuit of claim 1, wherein the capacitive acoustic-elements are merged in a first chip, the high-voltage drivers are merged in a second chip, and circuits for the exciting circuits operating at voltages lower than the high-voltage driver and the reception circuits are merged in a third chip in a pattern corresponding to an array of the plurality of cells in the first chip.

3. The integrated circuit of claim 1, wherein the capacitive acoustic-elements and the high-voltage drivers are merged in a first chip, the circuits for the exciting circuits operated at voltages lower than the high-voltage drivers and the reception circuits are merged in a second chip in a pattern corresponding to an array of the plurality of cells in the first chip.

4. The integrated circuit of claim 2, wherein each of the capacitive acoustic-elements is an element having a single vibration-cavity and has the transmitting function and the reception function, and a switch for changing connections between the exciting circuit and the capacitive acoustic-elements and for changing connections between the capacitive acoustic-elements and the reception circuit are arrayed in the second chip, in correspondence with the two-dimensional array included in each of the cells.

5. The integrated circuit of claim 3, wherein each of the capacitive acoustic-elements is an element having a single vibration-cavity and has the transmitting function and the reception function, and a switch for changing connections between the exciting circuit and the capacitive acoustic-elements and for changing connections between the capacitive acoustic-elements and the reception circuit are arrayed in the second chip, in correspondence with the two-dimensional array included in each of the cells.

6. The integrated circuit of claim 2, wherein each of the capacitive acoustic-elements has a vibration-cavity for transmitting and another vibration-cavity for receiving ultrasonic waves.

7. The integrated circuit of claim 3, wherein each of the capacitive acoustic-elements has a vibration-cavity for transmitting and another vibration-cavity for receiving ultrasonic waves.

8. The integrated circuit of claim 2, wherein circuits of large-signal levels of 20 volts or more are merged in the second chip, and circuits of small-signal levels of less than 20 volts are merged in the third chip.

9. The integrated circuit of claim 2, wherein a delay circuit or a waveform generator constructing each of the exciting circuits, and the reception circuits are merged in the third chip.

10. The integrated circuit of claim 8, wherein a delay circuit or a waveform generator constructing each of the exciting circuits, and the reception circuits are merged in the third chip.

11. The integrated circuit of claim 2, wherein a transmission/reception controller for driving the plurality of cells to be operated independently from each other is merged in the third chip as a common circuit for the plurality of cells.

12. The integrated circuit of claim 8, wherein a transmission/reception controller for driving the plurality of cells to be operated independently from each other is merged in the third chip as a common circuit for the plurality of cells.

13. The integrated circuit of claim 10, wherein a transmission/reception controller for driving the plurality of cells to be operated independently from each other is merged in the third chip as a common circuit for the plurality of cells.

14. The integrated circuit of claim 3, wherein circuits of large-signal levels of 20 volts or more are merged in the first chip, and circuits of small-signal levels of less than 20 volts are merged in the second chip.

15. The integrated circuit of claim 14, wherein a delay circuit or a waveform generator constructing each of the exciting circuits, and the reception circuits are merged in the second chip.

16. The integrated circuit of claim 3, wherein a transmission/reception controller for driving the plurality of cells to be operated independently from each other are merged in the second chip as a common circuit for the plurality of cells.

17. The integrated circuit of claim 14, wherein a transmission/reception controller for driving the plurality of cells to be operated independently from each other are merged in the second chip as a common circuit for the plurality of cells.

18. A probe comprising:

an acoustic element integrated circuit including a plurality of cells, being arrayed two-dimensionally on a same curved surface, wherein capacitive acoustic-elements having vibration membranes are allocated in unit number in each of the cells, each of the cells comprising an intra-cell circuit including:

an exciting circuit configured to drive collectively portions by a set of the unit number, each of the portions having a transmitting function of each of the capacitive acoustic-elements, and a reception circuit configured to process collectively received signals transferred from portions by a set of the unit number, each of the portions having a reception function in each of the capacitive acoustic-elements; and a probe enclosure for accommodating the capacitive acoustic-elements integrated circuit, wherein the exciting circuits are sorted into a chip in which high-voltage drivers for exciting the vibration membranes are merged and a chip in which circuits operated at voltages lower than the high-voltage drivers are merged, and the plurality of the cells are operated two-dimensionally, by individually controlling the intra-cell circuits so that the plurality of cells can be driven independently from each other.

19. The probe of claim 18, further comprising a transmission/reception controller for operating the plurality of cells independently from each other in the probe enclosure as a common circuit for the plurality of the cells.

20. A diagnosis device comprising:

an acoustic element integrated circuit including a plurality of cells, being arrayed two-dimensionally on a same curved surface, wherein capacitive acoustic-elements having vibration membranes are allocated in unit number in each of the cells, each of the cells comprising an intra-cell circuit including:

an exciting circuit configured to drive collectively portions by a set of the unit number, each of the portions having a transmitting function of each of the capacitive acoustic-elements, and a reception circuit configured to process collectively received signals transferred from portions by a set of the unit number, each of the portions having a reception function in each of the capacitive acoustic-elements;

a transmission/reception controller for operating the plurality of cells independently from each other, as a common circuit for the plurality of cells; and a display for displaying an image based upon signals transferred from the transmission/reception controller, and wherein the exciting circuits are sorted into a chip in which high-voltage drivers for exciting the vibration membranes are merged and a chip in which circuits operated at voltages lower than the high-voltage drivers are merged, and the plurality of the cells are operated two-dimensionally, by individually controlling the intra-cell circuits so that the plurality of cells can be driven independently from each other.

* * * * *